US009887974B2

(12) United States Patent
Charan et al.

(10) Patent No.: US 9,887,974 B2
(45) Date of Patent: *Feb. 6, 2018

(54) METHOD FOR NETWORK COMMUNICATION PAST ENCRYPTION DEVICES

(71) Applicant: Architecture Technology Corporation, Minneapolis, MN (US)

(72) Inventors: Deborah K. Charan, Minneapolis, MN (US); Ranga Ramanujan, Hamel, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/931,620

(22) Filed: Nov. 3, 2015

(65) Prior Publication Data

US 2016/0057116 A1 Feb. 25, 2016

Related U.S. Application Data

(63) Continuation-in-part of application No. 14/165,192, filed on Jan. 27, 2014, now Pat. No. 9,191,377.

(60) Provisional application No. 61/909,839, filed on Nov. 27, 2013.

(51) Int. Cl.
*H04L 29/06* (2006.01)

(52) U.S. Cl.
CPC ...... *H04L 63/0471* (2013.01); *H04L 63/0485* (2013.01); *H04L 63/18* (2013.01)

(58) Field of Classification Search
CPC .. H04L 63/0471; H04L 63/0485; H04L 63/18
See application file for complete search history.

(56) References Cited

U.S. PATENT DOCUMENTS

| 6,628,670 B1 * | 9/2003 | Galand ............... H04L 12/5695 370/409 |
| 6,765,892 B1 | 7/2004 | Leung et al. |
| 6,975,647 B2 | 12/2005 | Neale et al. |
| 7,310,730 B1 | 12/2007 | Champagne et al. |

(Continued)

OTHER PUBLICATIONS

Burdin et al.. "Techniques for Enabling Dynamic Routing on Airborne Platforms," 2009 IEEE Military Communications Conference, The MITRE Corporation, Case# 09-3230, Oct. 18-21, 2009, 9 pp.

(Continued)

*Primary Examiner* — Harunur Rashid
*Assistant Examiner* — Wayne An
(74) *Attorney, Agent, or Firm* — Shumaker & Sieffert, P.A.

(57) ABSTRACT

This disclosure is directed to techniques for providing communication between devices in different networks wherein the communication must first pass through an encryption mechanism and the devices do not have the stand-alone capability to encrypt or decrypt the communication. According to these techniques, an adapter may determine certain fields in a data packet that remain unencrypted when the data packet passes through the encryption mechanism. The adapter may then process those fields in such a way that, when the data packets are received by a second adapter, the second adapter may read those fields and obtain information.

17 Claims, 33 Drawing Sheets

(56) References Cited

U.S. PATENT DOCUMENTS

| | | | |
|---|---|---|---|
| 7,324,552 B1* | 1/2008 | Galand | H04L 12/5602 370/468 |
| 7,360,083 B1 | 4/2008 | Ragireddy et al. | |
| 7,441,267 B1 | 10/2008 | Elliott | |
| 7,684,414 B2 | 3/2010 | Durst | |
| 7,964,624 B1 | 6/2011 | Cottrell et al. | |
| 8,311,049 B2 | 11/2012 | Roberts et al. | |
| 8,549,135 B1 | 10/2013 | Yazdani | |
| 9,054,911 B1 | 6/2015 | Glover et al. | |
| 2003/0018715 A1 | 1/2003 | O'Neill | |
| 2003/0072451 A1* | 4/2003 | Pimentel | H04L 63/08 380/270 |
| 2003/0108045 A1* | 6/2003 | Jayam | F04D 29/384 370/394 |
| 2003/0131079 A1 | 7/2003 | Neale et al. | |
| 2003/0131121 A1* | 7/2003 | Quittek | H04L 12/2602 709/232 |
| 2004/0090912 A1 | 5/2004 | Loo | |
| 2005/0102500 A1* | 5/2005 | Khangaonkar | H04L 63/0428 713/153 |
| 2009/0238367 A1 | 9/2009 | Pinder | |
| 2010/0265869 A1 | 10/2010 | Sarikaya | |
| 2011/0110286 A1 | 5/2011 | Lu | |
| 2012/0218998 A1 | 8/2012 | Sarikaya | |
| 2013/0318238 A1 | 11/2013 | Hall et al. | |
| 2014/0086133 A1 | 3/2014 | Zhang et al. | |
| 2014/0241352 A1 | 8/2014 | Kollipara et al. | |
| 2014/0307617 A1 | 10/2014 | Laitila et al. | |
| 2015/0215075 A1* | 7/2015 | Baek | H04L 1/1607 726/4 |
| 2016/0006646 A1 | 1/2016 | Lin et al. | |

OTHER PUBLICATIONS

Danilov et al., "MANET Multicast with Multiple Gateways," 2008 IEEE Military Communications Conference, Nov. 16-19, 2008, 8 pp.

Elmasry et al., "Reservation-Based QoS in an Airborne Network," 2009 IEEE Military Communications Conference, Oct. 18-21, 2009, 7 pp.

Estrin et al., Protocol Independent Multicast-Sparse Mode (PIM-SM): Protocol Specification, RFC 2362—The Internet Society, Jun. 1998, 55 pp.

Garcia-Luna-Aceves et al., "The Core-Assisted Mesh Protocol," IEEE Journal on Selected Areas in Communications, vol. 17, No. 8, Aug. 1999, 15 pp.

Jetcheva et al., "Adaptive Demand-Driven Multicast Routing in Multi-Hop Wireless Ad Hoc Networks," MobiHoc '01 Proceedings of the 2nd ACM international symposium on Mobile ad hoc networking & computing, Oct. 4-5, 2001, 12 pp.

Lee et al., "On-Demand Multicast Routing Protocol in Multihop Wireless Mobile Networks," Mobile Networks and Applications, vol. 7, No. 6, Dec. 2002, 16 pp.

Macker et al., "Simplified Multicast Forwarding in Mobile Ad hoc Networks," 2004 IEEE Military Communications Conference, vol. 2, Oct. 31-Nov. 4, 2004, 8 pp.

Moy, "Multicast Extensions to OSPF," RFC 1584, Mar. 1994, 101 pp.

Nakamoto et al., "High Assurance Internet Protocol Encryptor Multicast Discovery Service," MITRE Technical Report MTR110417, Sep. 2011, 7 pp.

Nakamoto et al., "Scalable HAIPE Discovery using DNS-like Referral Model," 2005 IEEE Military Communications Conference, vol, 4, Oct. 17-20, 2005, 14 pp.

Rangarajan et al.,"Performance Analysis of Multicast Protocols: ODMRP, PUMA and OBAMP," International Journal of Computer Science and Communication, vol. 2, No. 2, Jul.-Dec. 2011 5 pp.

Royer et al., "Multicast operation of the ad-hoc on-demand distance vector routing protocol," MobiCom '99 Proceedings of the 5th annual ACM/ICEEE international conference on Mobile computing and networking, Aug. 15-19, 1999, 12 pp.

Vaishampayan et al, "Efficient and Robust Multicast Routing in Mobile Ad Hoc Networks," Proceedings of the 1st IEEE international Conference on Mobile Ad-hoc and Sensor Systems, Oct. 24-27, 2004, 11 pp.

Wang et al, "An Intelligent On-Demand Multicast Routing Protocol in Ad Hoc Networks," 15th International Conference on Information Networking, Jan. 31-Feb. 2, 2001; 6 pp.

Wu et al., "AMRIS: A Multicast Protocol for Ad Hoc Wireless Networks," Proceedings of the IEEE Military Communications Conference, vol. 1, Oct. 31-Nov. 3, 1999, 5 pp.

Xie et al., "AM Route: Ad Hoc Multicast Routing Protocol," Mobile Networks and Applications, vol. 7, No. 6, Dec. 2002, 11 pp.

U.S. Appl. No. 61/909,854 by John Wu, filed Nov. 27, 2013.

Prosecution History from U.S. Appl. No. 14/165,192, dated May 14, 2015, through Jul. 15, 2015, 116 pp.

* cited by examiner

FIG. 24A

| Bit offset | 0-3 | 4-7 | 8-11 | 12-15 | 16-23 | 24-31 |
|---|---|---|---|---|---|---|
| 0 | Version=6 | Traffic Class = RSVP/PATH | | Flow Label (6 bits) | Flow Priority (6 bits) | Old DSCP Value (6 bits) / Resv |
| 32 | Payload Length | | | | Next Header | TTL/Hop Limit |
| 64-127 | Source IP Address = Red side PEP IPv6 address | | | | | |
| 128-195 | Destination IP Address = RBMC | | | | | |

| Bit offset | 0-3 | 4-7 | 8-11 | 12-15 | 16-23 | 24-31 |
|---|---|---|---|---|---|---|
| 0 | Version=6 | Traffic Class = DATA | | | Flow Bandwidth in KBps | |
| 32 | Payload Length | | | | Next Header | TTL/Hop Limit |
| 64-127 | Source IP Address = Red side PEP IPv6 address | | | | | |
| 128-195 | Destination IP Address = RBMC | | | | | |

2414

| Bit offset | 0-3 | 4-7 | 8-13 | 14-15 | 16-23 | 24-31 |
|---|---|---|---|---|---|---|
| 0 | Version=4 | Header Len | Traffic Class = DATA | | Total Length | |
| 32 | Identification | | | | Flags | Fragmentation ffset |
| 64 | TTL | | Protocol | | Chec sum | |
| 96 | Source IP Address = Red-side PEP IPv4 address | | | | | |
| 128 | Destination IP Address = Variable Address | | | | | |

| Bit offset | 0 - 8 | 8 – 15 | 16 – 31 |
|---|---|---|---|
| 0 | Message Type | Sub Type | Message length |

FIG. 26A

| Bit offset | 0 - 8 | 8 – 15 | 16 – 31 | |
|---|---|---|---|---|
| 0 | QoS | Enable RSVP | 8 bytes | |
| 32 | 1158 kbps | | 2 | |
| 64 -127 | Ethernet 0 | | Ethernet 1 | |

FIG. 26B

| Bit offset | 0 - 8 | 8 – 15 | 16 – 31 |
|---|---|---|---|
| 0 | QoS | Set Path | 12 bytes |
| 32 | Source address =1.1.1.1 | | |
| 64-127 | Destination address =1.1.2.2 | | |
| 128 - | Next hop=10.10.10.2 | | |

FIG. 26C

METHOD FOR NETWORK COMMUNICATION PAST ENCRYPTION DEVICES

This application is a continuation-in-part application of U.S. patent application Ser. No. 14/165,192, filed Jan. 27, 2014, which claims priority from U.S. Provisional Application Ser. No. 61/909,839, filed Nov. 27, 2013, the entire content of which is incorporated herein by reference.

STATEMENT REGARDING FEDERALLY SPONSORED RESEARCH OR DEVELOPMENT

This invention was made with Government support under Contracts FA8750-13-C-0047, FA8750-14-C-0181, and FA8750-15-C-0162 with the United States Department of Defense. The Government may have certain rights in this invention.

TECHNICAL FIELD

The disclosure relates to communication between devices in different networks.

BACKGROUND

One technique for transferring data from one trusted (Red) Internet Protocol (IP) network enclave to another trusted network enclave is to use an IP packet encryption device to encrypt the data leaving an enclave, send the data in packets through an untrusted (Black) network interconnecting the enclaves, receive the data on a decryption device at the target Red IP network enclave, and decrypt those packets before reassembling the data packets into the original message. This is helpful in the event that the data packets carry sensitive or classified content in some way, as the encrypted content would be inaccessible and unreadable to an outsider in the Black network who may eavesdrop on the communication.

SUMMARY

In general, the disclosure is directed to communicating between devices in different IP network enclaves when all transmissions must pass through a packet encryption device before they leave an enclave and the communication devices do not have the standalone capability to encrypt or decrypt the message. For example, according to the techniques of this disclosure, a Crypto-Partitioning Aware Protocol adapter for Tactical Networks (CAPTAIN) allows this communication to occur. CAPTAIN may do this by intercepting data packets, determining what fields in an IP data packet will remain unencrypted when passed through an IP packet encryption device and then populating those fields in such a way that a coherent message may be read by a second communication adapter implementing CAPTAIN, where the second communication device is connected to the output of the IP packet encryption device.

In one embodiment, the disclosure is directed to a method in which devices communicate amongst themselves in a network. A first protocol adapter may process a data packet including one or more pass-through fields, wherein the one or more pass-through fields are located in a portion of the data packet that remains unencrypted when the data packet is processed by an encryption device. The first protocol adapter may send the data packet to the encryption device. A second protocol adapter may receive the data packet from the encryption device. The second protocol adapter may then read the one or more pass-through fields.

In another embodiment, the disclosure is directed to a communication apparatus that works within a network or set of networks. The communication apparatus may comprise a first protocol adapter, wherein the first protocol adapter may process a data packet including one or more pass-through fields, wherein the one or more pass-through fields are located in a portion of the data packet that remains unencrypted when the data packet is processed by an encryption device, and wherein the first protocol adapter may send the data packet to the encryption device. The communication apparatus may also comprise a second protocol adapter, wherein the second protocol adapter may receive the data packet from the encryption device and read the one or more pass-through fields.

In another embodiment, the disclosure is directed to a computer-readable medium containing instructions. The instructions may cause a programmable processor to process, with a first protocol adapter, a data packet including one or more pass-through fields, wherein the one or more pass-through fields are located in a portion of the data packet that remains unencrypted when the data packet is processed by an encryption device. The instructions may then cause the programmable processor to send, with the first protocol adapter, the data packet to the encryption device. The instructions may then cause the programmable processor to receive the data packet from the encryption device at a second protocol adapter. The instructions may then cause the programmable processor to read the one or more pass-through fields at the second protocol adapter.

In another embodiment, the disclosure is directed to a method in which a first protocol adapter positioned in a first network processes a first data packet to insert a first message within a set of one or more pass-through fields of the first packet. The first network is separated from a second network by a first encryption device and a second encryption device that securely communicate packets through an intermediate network in encrypted form. The one or more pass-through fields are located in a portion of the first data packet that remains unencrypted when the data packet is processed by the first encryption device. The first protocol adapter is configured to send the first data packet to the first encryption device. A second protocol adapter positioned within the intermediate network and between the first encryption device and the second encryption device receives the first data packet in encrypted form. The second protocol adapter reads the first message from the set of one or more pass-through fields. The second protocol adapter then performs, responsive to the first message, an end-to-end quality of service admission protocol.

In another embodiment, the disclosure is directed to a system configured to communicate between devices in a network. The system comprises a first protocol adapter positioned within a first network configured to process a first data packet to insert a first message within a set of one or more pass-through fields of the first packet. The first network is separated from a second network by a first encryption device and a second encryption device that securely communicate packets through an intermediate network in encrypted form. The one or more pass-through fields are located in a portion of the first data packet that remains unencrypted when the data packet is processed by the first encryption device. The first protocol adapter is configured to send the first data packet to the first encryption device. A second protocol adapter positioned within the intermediate network and between the first encryption device and the second encryption device receives the first data packet in encrypted form. The second protocol adapter reads the first message from the set of one or more pass-through fields. The second protocol adapter then performs, responsive to the first message, an end-to-end quality of service admission protocol.

In another embodiment, the disclosure is directed to a method in which a first protocol adapter positioned in a first network processes a first data packet to insert a first message within a set of one or more pass-through fields of the first packet. The first network is separated from a second network by a first encryption device and a second encryption device that securely communicate packets through an intermediate network in encrypted form. The one or more pass-through fields are located in a portion of the first data packet that remains unencrypted when the data packet is processed by the first encryption device. The first protocol adapter is configured to send the first data packet to the first encryption device. A second protocol adapter positioned within the intermediate network and between the first encryption device and the second encryption device receives the first data packet in encrypted form. The second protocol adapter reads the first message from the set of one or more pass-through fields. The second protocol adapter then performs, responsive to the first message, an inline network encryptor security protocol.

In another embodiment, the disclosure is directed to a system configured to communicate between devices in a network. The system comprises a first protocol adapter positioned within a first network configured to process a first data packet to insert a first message within a set of one or more pass-through fields of the first packet. The first network is separated from a second network by a first encryption device and a second encryption device that securely communicate packets through an intermediate network in encrypted form. The one or more pass-through fields are located in a portion of the first data packet that remains unencrypted when the data packet is processed by the first encryption device. The first protocol adapter is configured to send the first data packet to the first encryption device. A second protocol adapter positioned within the intermediate network and between the first encryption device and the second encryption device receives the first data packet in encrypted form. The second protocol adapter reads the first message from the set of one or more pass-through fields. The second protocol adapter then performs, responsive to the first message, an inline network encryptor security protocol.

The details of one or more embodiments of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 24A-24C are conceptual diagrams showing the bit address of different fields in an end-to-end quality of service admission protocol and data packets sent over the INE devices according to one aspect of this disclosure.

FIGS. 26A-26C are conceptual diagrams showing packet configurations for the distribution of RSVP packets according to one aspect of this disclosure.

DETAILED DESCRIPTION

Figure 1:
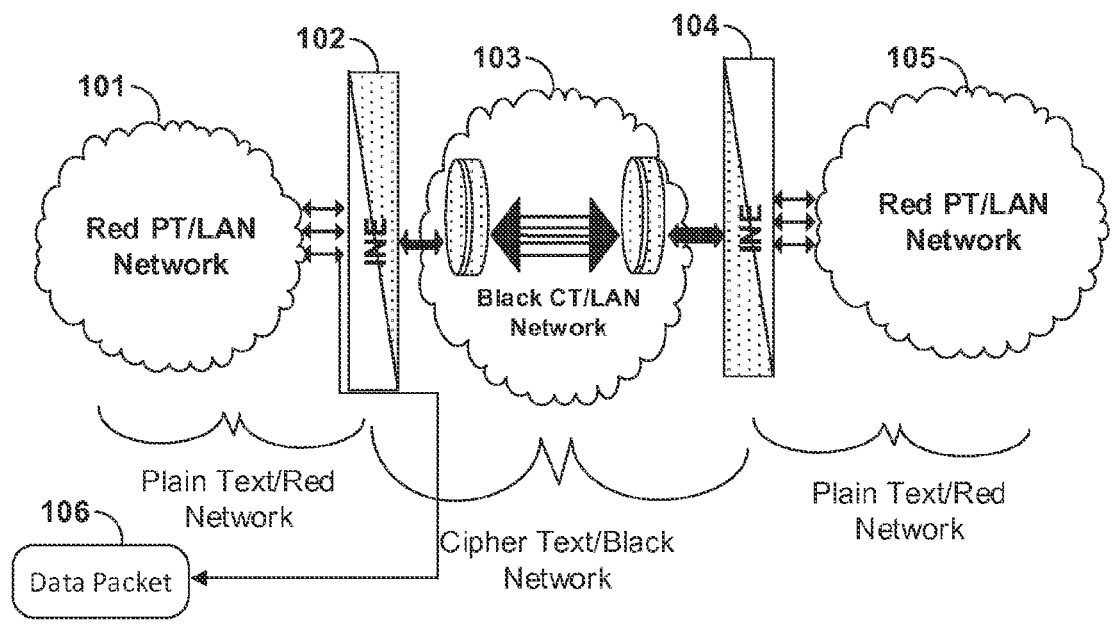
FIG. 1 is a system diagram illustrating an In-Line Network Encryptor (INE) based network.

Many entities, including the United State Air Force and other military services, are upgrading their tactical networks to an Internet Protocol-based (IP-based) tactical network based on the use of end-to-end Internet Protocol Security-based (IPSEC-based) encryption of network traffic using In-Line Network Encryptor (INE) devices. An INE is typically a secure gateway that allows two separate trusted, internal networks (or red networks) to exchange data over an untrusted or lower-classification network (or black network). An INE accepts a data packet, typically in either IPv4 or IPv6 form. Each of these forms has certain fields defined by a particular bit offset amount. Most of these fields are encrypted by the INE device, but three of these fields will stay unencrypted. The fields that stay unencrypted are moved to an outer wrapper, or a header, of the new encrypted data packet, allowing those pass-through fields to be easily read at other protocol adapters. The fields that are encrypted are encrypted using a preplaced or dynamically-generated key, allowing the two separate trusted, internal networks (or red enclaves) to efficiently send and receive encrypted data, as each red network has access to the preplaced or dynamically-generated key.

End-to-end IPSEC-based INEs, such as a High Assurance Internet Protocol Encryptor (HAIPE®), benefit from requiring only one INE per trusted network. Further, INE devices offer a remote keying and rekeying process that is less cumbersome than traditional link layer encryption devices. Finally, traditional link layer encryption devices force a stove pipe configuration of the wide-area network where network links cannot be shared between traffic belonging to different classification levels as is possible with IPSEC-based INE devices. The use of INE devices typically saves costs compared to traditional link layer encryption for implementing needed Communications Security (COMSEC) capabilities due to the need for fewer encryption devices. INEs typically also have lower operation costs than link layer encryption. Link layer encryption does not allow network links to be shared between traffic belonging to different classification levels, as is possible with INE-based COMSEC. For organizations where COMSEC is crucial, such as the Department of Defense, the Department of Homeland Security, and law enforcement agencies, the use of IPSEC-based INEs yields significant cost savings.

While IPSEC-based INEs are cost-effective, the INE in its current form has drawbacks that limit the widespread use of this technology in tactical networks, especially those used by entities such as the Department of Homeland Security and the United States Military. INEs in their current state impair, and can even completely preclude, the operation of networking protocols and network optimization/acceleration techniques that are critical to the functioning of mission applications. Transmission Control Protocol Performance Enhancing Proxy (TCP PEP) operations are impaired by INEs in networks with dynamically varying link characteristics and networks with multiple Cypher Text-side (CT-side) asymmetric links with load balancing. A CT-side means that the link is located in the untrusted Black networks and only sees data packets that have been encrypted. Asymmetric links are links that have different speeds for uploading data packets than they have for downloading data packets. Multicast operations such as Source Selective Multicast (SSM) and Protocol Independent Multicast-Source Specific Multicast (PIM-SSM) sessions are precluded by INEs. Disruption tolerant networking (DTN) operations, which are used in networks with episodic connectivity between endpoints, cannot operate through INEs. Certain signaling protocols may be precluded by INEs. Cyber security is also rendered less effective by INEs, as the current mitigation techniques of deep packet inspection are not available in an INE-based end-to-end encryption. While these drawbacks are seen prominently in INE devices, these same disadvantages can be seen across other encryption devices and methods.

In view of these drawbacks, this disclosure proposes techniques for enabling unimpeded operation of existing protocols and services functions across INEs. In one example of the disclosure, Crypto-Partitioning Aware Protocol adapters for Tactical Networks (CAPTAIN) are proposed. The CAPTAIN techniques allow devices to communicate across INEs, thus allowing for the implementation of protocol adapters.

Certain IPSEC-based INEs isolate fields in a data packet that the INE will leave unencrypted. The INE will take those fields and make them part of the header of an encrypted data packet. The CAPTAIN protocol of the disclosure utilizes the fields that will be isolated from encryption based on the type of data packet being sent and the INE being used. CAPTAIN uses a protocol adapter to intercept those packets and populate those isolated fields with bits that equate to a message readable by other protocol adapters in different networks. By making these fields readable in both plain-text and cypher-text networks, the techniques of this disclosure allows for the implementation of PEP functions across INEs (e.g., HAIPE® devices). In place of a protocol adapter, the techniques of this disclosure could also use software components, routers, Wide-Area Network (WAN) optimization appliances, or radios, among other things.

FIG. 1 is a system diagram illustrating an example communication path between two trusted, plain-text network enclaves (Red networks) through an untrusted, cypher-text network (Black network). A Red network deals with data packets that are not encrypted, i.e. plain-text data packets, usually because all devices in that network are trusted sources. These networks may comprise a single entity or these networks may comprise multiple trusted entities. These networks are commonly used in military and government communications, though they can also be found in corporate networks, virtual private networks (VPNs), or other home networks, among other networks. Conversely, Black networks may comprise any number of entities, including internet service providers, routers outside of the Red networks, or intermediary contacts, among other things. As such, users of Red networks may use encrypted text, or cypher texts to communicate over Black networks.

In the system shown in FIG. 1, when a first Red network 101 wants to communicate with a second Red network 105, the first Red network 101 creates IP data packet 106. The first Red network 101 sends data packet 106 to INE 102 for encryption. INE 102 may be a HAIPE® device or some other sort of IPSEC-based INE. The bits in data packet 106 are encrypted during this process, but some configurations of INE 102 may keep certain bits unencrypted in the header before sending the data packet into Black network 103. Data packet 106 arrives at INE 104 and is decrypted, finally arriving at second Red network 105 in its original form. INE 104 may be a HAIPE® device or some other sort of IP-based INE.

As mentioned above, some configurations of an INE, namely a HAIPE® encryption device in bypass mode, although other INEs could also be used, will leave some bits of IPv4 and IPv6 data packets unchanged. These unchanged bits are also called pass-through fields. The techniques of this disclosure (referred to here as CAPTAIN Signaling Protocol (CSP)) will make use of these bit fields to transfer data across the INE. In this disclosure, the one or more fields of a data packet that are bypassed by an INE will be generically referred to as "pass-through fields." If a CAPTAIN-enabled protocol adapter is placed on each side of each INE, the unchanged pass-through fields can be read across networks and unencrypted signaling messages between protocol adapters and networks can be sent. When one of these messages needs to be sent between protocol adapters, a start of signal (SOS) packet will be sent, followed by relevant data packets, and then an end of signal (EOS) packet. These unencrypted bits in the pass-through fields may be used to implement PEP functions, thus alleviating many of the issues keeping INEs from being a more commonly used INE in IP-based tactical networks.

For example, the unencrypted messages placed in the pass-through fields may allow protocol adapters to distinguish individual TCP flows and to perform per-flow load balancing by disaggregating individual TCP flows. These messages may also allow networks to determine if communications are being blocked by a denial of service attack by allowing protocol adapters to communicate with other protocol adapters to determine the number of packets seen on the Red-side of an INE and the amount of packets sent through the Black-side of an INE. DTN proxy functions will be able to designate the bundle boundaries of a DTN flow over an INE, ensuring that bundles are buffered and transferred appropriately until they eventually emerge again into a Red-side enclave. Protocol adapters already have built-in network sensing functionality, meaning that Black-side protocol adapters can report bandwidth and bit error rate information to the Red-side protocol adapters. QoS management also become viable, as protocol adapters can now communicate with one another in a way that allows the reservation of bandwidth to occur across Red and Black networks. In multicast systems, bandwidth is saved in Black networks by tagging individual flows, allowing the receiving side to subscribe to individual streams within the larger multicast tunnel including source-selective subscriptions. If there is congestion in a multicast system, CSP will tag data flows and assign flows to a-priori defined priorities, later using decision logic to add and drop flows on a dynamic basis. Other benefits from the use of CSP and the protocol adapters in an INE IP-based tactical network are certainly possible, as the above functionalities are only examples of what a CAPTAIN-enabled protocol adapter would add to an INE network. Specific examples of PEP functions that may be enabled by using the techniques of this disclosure will be discussed below with reference to the following figures.

Figure 2:
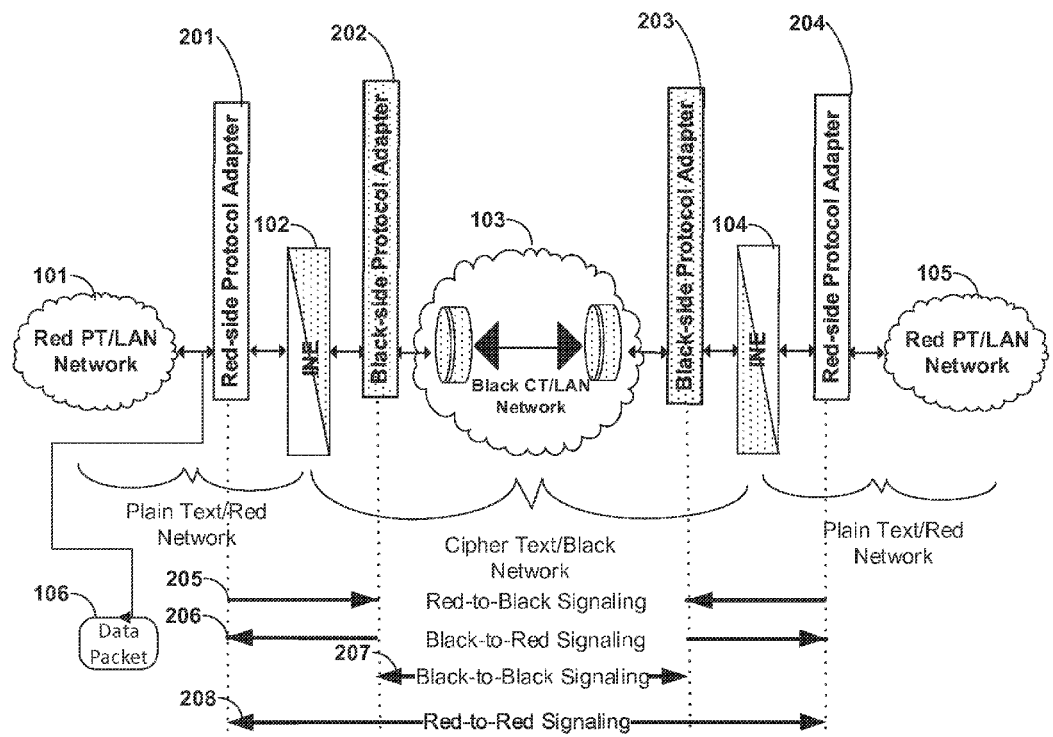
FIG. 2 is a system diagram illustrating an INE-based network with protocol adapters according to one example of the disclosure.

FIG. 2 is a system diagram illustrating an INE-based network with CAPTAIN-enabled protocol adapters combined with four possible signals that could be sent in the system. This system introduces two pairs of protocol adapters enabled with CAPTAIN, as well as shows the various signals that could be sent in this particular configuration. These protocol adapters could be performance-enhancing proxy (PEP) adapters, among other things.

In FIG. 2, a first Red network 101 creates data packet 106. Data packet 106 is then sent to a first Red-side protocol adapter 201 in first Red network 101. The first Red-side protocol adapter 201 processes data packet 106 in order to populate certain fields in data packet 106, or creates a signaling packet to send prior to the data packet, so that the first Red-side protocol adapter 201 can communicate with other protocol adapters in the system.

The data packet 106 is sent from first Red-side protocol adapter 201 to INE 102. INE 102 may be a HAIPE® device or some other sort of IPSEC-based INE. Most of the bits in data packet 106 are encrypted during this process, but some configurations of INE 102 may keep certain bits unencrypted within the header of the packet before the data packet 106 is received by a first Black-side protocol adapter 202 in the Black network 103. These unencrypted bits are pass-through fields.

The first Black-side protocol adapter 202 can read the signaling and/or data packet 106, functionally receiving a message from the first Red-side protocol adapter 201. The first Black-side protocol adapter 202 can either process data packet 106 in order to populate certain fields in data packet 106, or it can forward the data packet 106 into Black network 103. Black network 103 then forwards the data packet 106 to a second Black-side protocol adapter 203 located in the Black network 103. Processing data packet 106 comprises intercepting the data packet 106 and inserting information into the one or more pass-through fields.

The second Black-side protocol adapter 203 can read the one or more pass-through fields in the data packet 106, functionally receiving a message from the first Red-side protocol adapter 201 or the first Black-side protocol adapter 202. Reading the one or more pass-through fields comprises extracting the inserted information from the one or more pass-through fields. The second Black-side protocol adapter 203 can then either process data packet 106 in order to populate certain fields in data packet 106, or it can forward the data packet 106 to a second INE 104. The second INE 104 may be a HAIPE® device or some other sort of IP-based INE. The second INE 104 may then forward the data packet 106 to a second Red-side protocol adapter 204.

The second Red-side protocol adapter 204 can read the data packet 106, functionally receiving a message from the first Red-side protocol adapter 201 or the second Black-side protocol adapter 203. The second Red-side protocol adapter 204 can then either process data packet 106 in order to populate certain fields in data packet 106, or it can forward the data packet 106 to a second Red network 105, or it can send the packet back to first Red-Side protocol adapter 201.

Although this is one enumeration of how data packet 106 can travel along the system, it could also move entirely in reverse from Red network 105 to Red network 101, or it could travel back and forth between any of the protocol adapters, among other things. The first Red-side protocol adapter 201 can send data packets 106 to a first Black-side protocol adapter 202 using Red-to-Black Signaling 205 or to a second Red-side protocol adapter 204 using Red-to-Red signaling 208. The first Red-side protocol adapter 201 can receive data packets 106 from a first Black-side protocol adapter 202 using Black-to-Red Signaling 206 or from a second Red-side protocol adapter 204 using Red-to-Red signaling 208. The first Black-side protocol adapter 202 can send data packets 106 to a first Red-side protocol adapter 201 using Black-to-Red Signaling 206 or to a second Black-side protocol adapter 203 using Black-to-Black signaling 207. The first Black-side protocol adapter 202 can receive data packets 106 from a first Red-side protocol adapter 201 using Red-to-Black Signaling 205 or from a second Black-side protocol adapter 203 using Black-to-Black signaling 207. The second Black-side protocol adapter 203 can send data packets 106 to a second Red-side protocol adapter 204 using Black-to-Red Signaling 206 or to a first Black-side protocol adapter 202 using Black-to-Black signaling 207. The second Black-side protocol adapter 203 can receive data packets 106 from a second Red-side protocol adapter 204 using Red-to-Black Signaling 205 or from a first Black-side protocol adapter 202 using Black-to-Black signaling 207. The second Red-side protocol adapter 204 can send data packets 106 to a second Black-side protocol adapter 203 using Red-to-Black Signaling 205 or to a first Red-side protocol adapter 201 using Red-to-Red signaling 208. The second Red-side protocol adapter 204 can receive data packets 106 from a second Black-side protocol adapter 203 using Black-to-Red Signaling 206 or from a first Red-side protocol adapter 201 using Red-to-Red signaling 208.

Figure 3A:
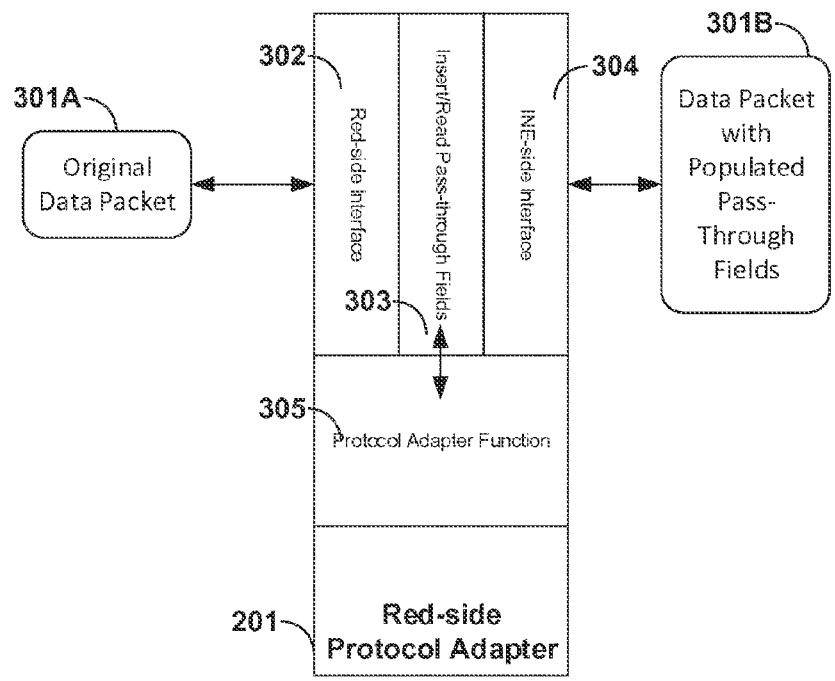
FIG. 3A is a block diagram showing a red-side protocol adapter in more detail.

FIG. 3A is a block diagram showing a CAPTAIN Red-side performance enhancing proxy (PEP or red-side protocol) adapter in greater detail. An original data packet 301A arrives at red-side protocol adapter 201 at Red-side interface 302. Red-side protocol adapter 201 can be software and/or instructions stored on a computer-readable storage medium that may be read and executed by one or more processors on an INE, hardware that can be coupled with an INE, or a standalone device that acts as an intermediary between a trusted network and an INE, among other things. Data packet 301A could be either an IPv4 data packet or an IPv6 data packet. Original data packet 301A is sent to interface 303, which either populates one or more pass-through fields in the original data packet 301A to form a data packet with populated pass-through fields 301B or reads the already populated pass-through fields of data packet 301B. These fields can be populated in various ways according to the techniques of this disclosure depending on which proxy function is being performed. This data packet with populated pass-through fields 301B is sent to INE-side interface 304 where it is further sent to an INE device for encryption. The data packet with populated pass-through fields 301B could also be sent to a protocol adapter port 305, where a proxy function is executed according to the techniques of this disclosure based on the contents of the pass-through fields. Data packets can also be sent from Red-side interface 302 to a trusted network.

Figure 3B:
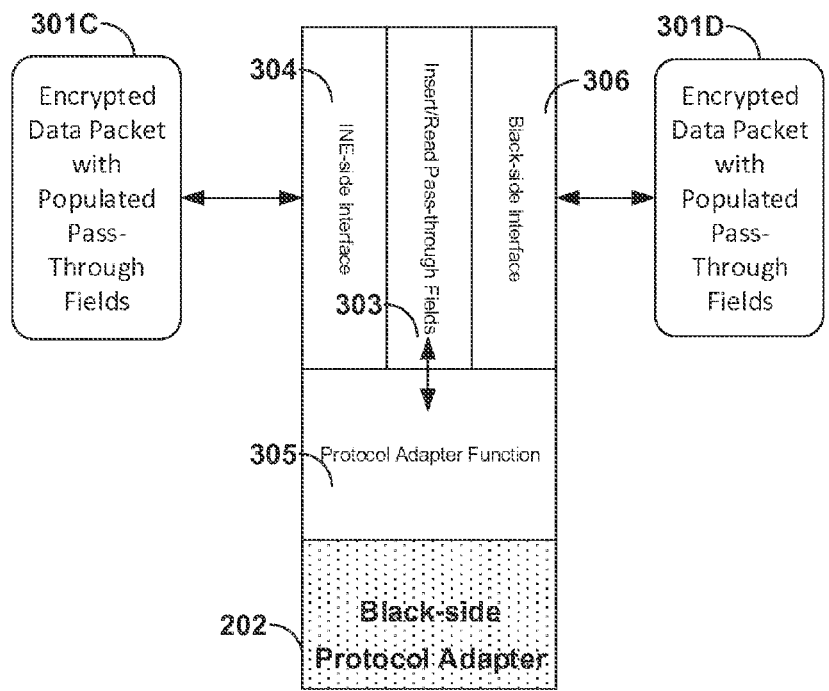
FIG. 3B is a block diagram showing a black-side protocol adapter in more detail.

FIG. 3B is a block diagram showing a CAPTAIN Black-side PEP (or black-side protocol) adapter in greater detail. Encrypted data packet with populated pass-through fields 301C is sent to black-side protocol adapter 202 where it is received by INE-side interface 304. Black-side protocol adapter 202 can be software and/or instructions stored on a computer-readable storage medium that may be read and executed by one or more processors on an INE, hardware that can be coupled with an INE, or a standalone device that acts as an intermediary between a trusted network and an INE, among other things. The encrypted data packet with populated pass-through fields 301C is sent to interface 303, which either populates one or more pass-through fields in the data packet 301C to form a new encrypted data packet with populated pass-through fields 301D or reads the already populated pass-through fields of data packet 301C. These fields can be populated in various ways according to the techniques of this disclosure depending on which proxy function is being performed. This encrypted data packet with populated pass-through fields 301D is then either dropped or sent out Black-side interface 306, where it can be further sent to an untrusted network. The encrypted data packet with populated pass-through fields 301C or 301D could also be sent to a proxy function port 305, where a proxy function is executed according to the techniques of this disclosure based on the contents of the pass-through fields. Data packets can also be sent from INE-side interface 304 to an INE device.

Figure 4A:
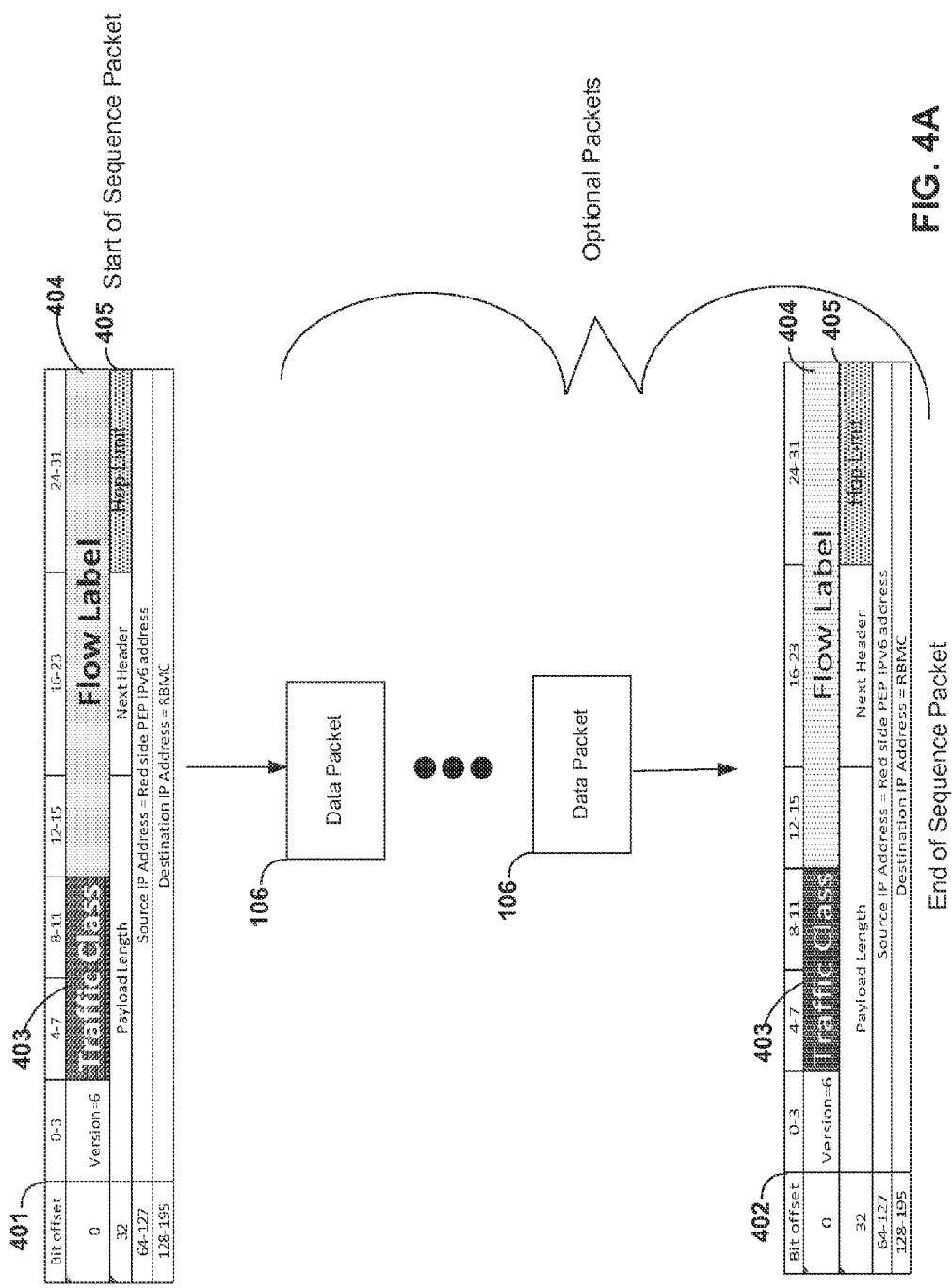
FIGS. 4A-4C are conceptual diagrams showing the bit address of different fields in a Start of Sequence/End of Sequence and data packets sent over the INE devices.

FIG. 4A is a diagram with tables showing the bit address of different items on a data packet sent over the INEs. Specifically, the table shows one embodiment of a data packet that could be used in accordance with the techniques of this disclosure. One type of data packet that could be sent is a Start of Sequence (SoS) indication 401. SoS packet 401 is an IPv6 packet in FIG. 4a. SoS packet 401 has three pass-through fields, which are fields that will remain unencrypted when passing through an INE. For example, these pass-through fields are the traffic class field 403, located at bits 4-11, and the flow label field 404, located at bits 12-31. These pass-through fields 403 and 404 can also be populated to read as an End of Sequence (EoS) indication 402 or to represent some other type of message.

Figure 4B:
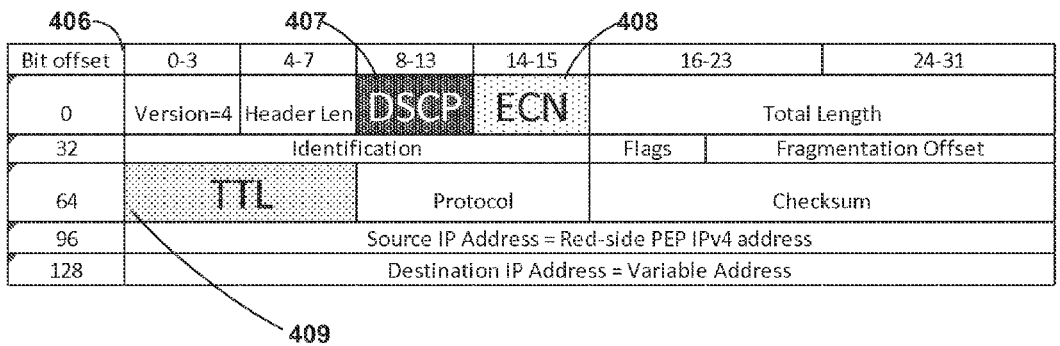

FIG. 4B is an example of an IPv4 data packet. The pass-through fields of IPv4 data packet 406 are located at bit 8-13 and 14-15. The Differentiated Services Code Point (DSCP) field 407 is located at bits 8-13. The Explicit Congestion Notification (ECN) field 408 is located at bits 14-15. These two pass-through fields are not encrypted when passing through certain INEs, such as a HAIPE® device in bypass mode.

Figure 4C:
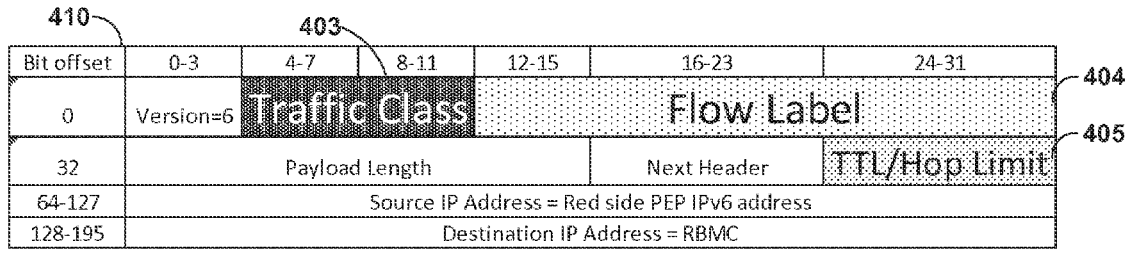

FIG. 4C is an example of an IPv6 data packet. The pass-through fields of IPv6 data packet 410 are located at bits 4-11 and 12-31. The traffic class field 403 is located at bits 4-11. The flow label field 404 is located at bits 12-31. These two pass-through fields are not encrypted when passing through certain INEs, such as a HAIPE® device in bypass mode.

One example method of this disclosure involves a first protocol adapter processing a data packet including one or more pass-through fields. The first protocol adapter then sends the data packet to an INE. A second protocol adapter receives the data packet from the INE. The second protocol adapter reads the pass-through fields. A protocol adapter function is then performed using information in the one or more pass-through fields.

The first protocol adapter could be situated in a trusted network and the second protocol adapter could be situated in an untrusted network. The data packet could be one of an IPv4 packet or an IPv6 packet. The one or more pass-through fields could be any of a traffic class field, a flow label field, an explicit congestion notification field, or a differentiated services code point field. The INE could be a High Assurance Internet Protocol Encryptor (HAIPE®) device. The first protocol adapter and the second protocol adapter could be performance-enhancing proxy (PEP) adapters.

Figure 5:
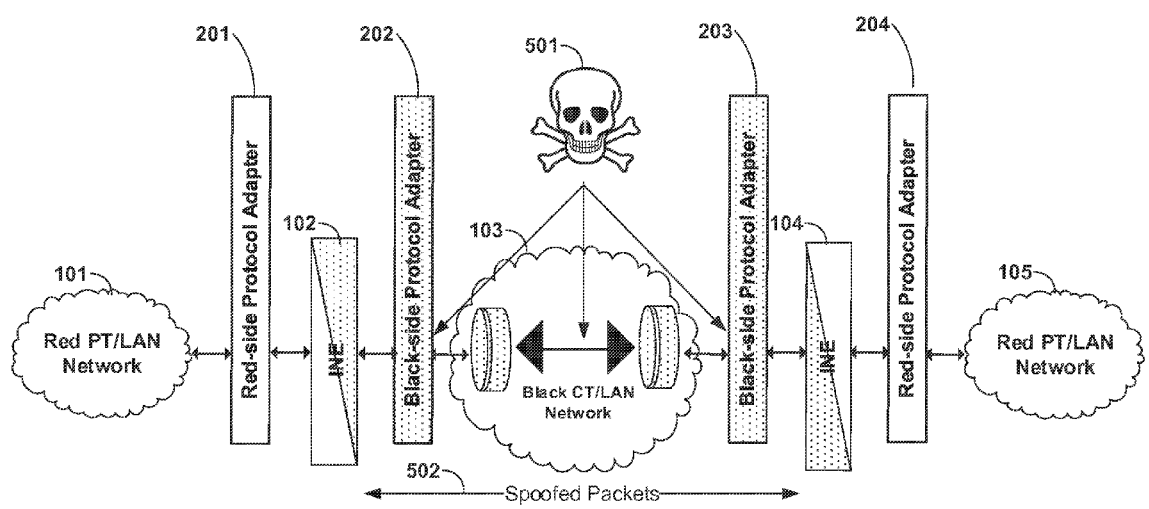
FIG. 5 is a system diagram illustrating an INE-based network with paired protocol adapters configured to detect and mitigate a denial of service attack in accordance with one aspect of the disclosure.

FIG. 5 is a system diagram illustrating an INE-based network with CAPTAIN-enabled protocol adapters configured to perform a performance enhancement function for detecting and/or mitigating a denial of service attack. This is the system of FIG. 2 with the added element of a denial of service attack 501.

A common form of network attack is a "volumetric denial of service" (DoS) attack in which a node is flooded with arbitrary traffic in an attempt to overwhelm its processing resources and saturate its network link. In a crypto-partitioned network this traffic will largely be discarded as it passes from the Black-side of the INE 102 to the Red-side, as spoofed "flood" traffic 502 will not pass any authentication or integrity checks in the INE. However, the fact that the INE 102 (and, thus, the Red-side protocol adapter 201) is under attack is unknown on either side of the INE. It is desirable for the Black-side of the INE to determine when a DoS attack is underway as it may be able to take corrective steps, such as invoking/notifying a Computer Network Defense (CND) service.

To accomplish this, both the first Red-side protocol adapter 201 and the first Black-side protocol adapter 202 are configured to maintain counters of the number of bytes or frames that each protocol adapter has received. Periodically, the first Red-side protocol adapter 201 will send a command sequence to the first Black-side protocol adapter 202 containing the traffic counts at the first Red-side protocol adapter 201, followed by the first Red-side protocol adapter 201 resetting its counter. Upon receipt of this command sequence the first Black-side protocol adapter 202 will compare the traffic counts at the first Red-side protocol adapter 201 to the counter at the first Black-side protocol adapter 202. If the first Red-side protocol adapter 201 is receiving substantially less traffic than the first Black-side protocol adapter 202, then it is likely that a DoS attack 501 is present. If the system detects that a DoS attack 501 is present, Black network 103 can take corrective steps. These corrective steps could be any number of cyber defense proxy functions, including invoking a Computer Network Defense (CND) service or notifying a CND service. Otherwise, the counter at the first Black-side protocol adapter 202 will reset, and the overall system continues to run. While this description applies to the first Red-side protocol adapter 201, the first Black-side protocol adapter 202, the first Red network 101, and the Black network 103, this same process could be run on the second Red-side protocol adapter 204, the second Black-side protocol adapter 203, the second Red network 105, and the Black network 103.

As discussed above, in one example of the disclosure, the performance enhancing proxy function is a cyber defense proxy function. In this example, the techniques of this disclosure may further include measuring, at a first protocol adapter (e.g. red-side protocol 201) with a first counter, an amount of data received by the first protocol adapter. A second proxy (e.g. black-side protocol 202) adapter measures an amount of data received by the second protocol adapter with a second counter. The first protocol adapter sends the amount of data measured by the first protocol adapter to the second protocol adapter in one or more pass-through fields of a data packet. The second protocol adapter reads the one or more pass-through fields that contain the amount of data measured by the first counter in the first protocol adapter. The second protocol adapter then compares the amount of data measured by the first counter to the amount of data measured by the second counter by the second protocol adapter. A cyber defense proxy function may be implemented in the case that the amount of data measured by the first counter differs from the amount of data measured by the second count by a threshold.

Figure 6:
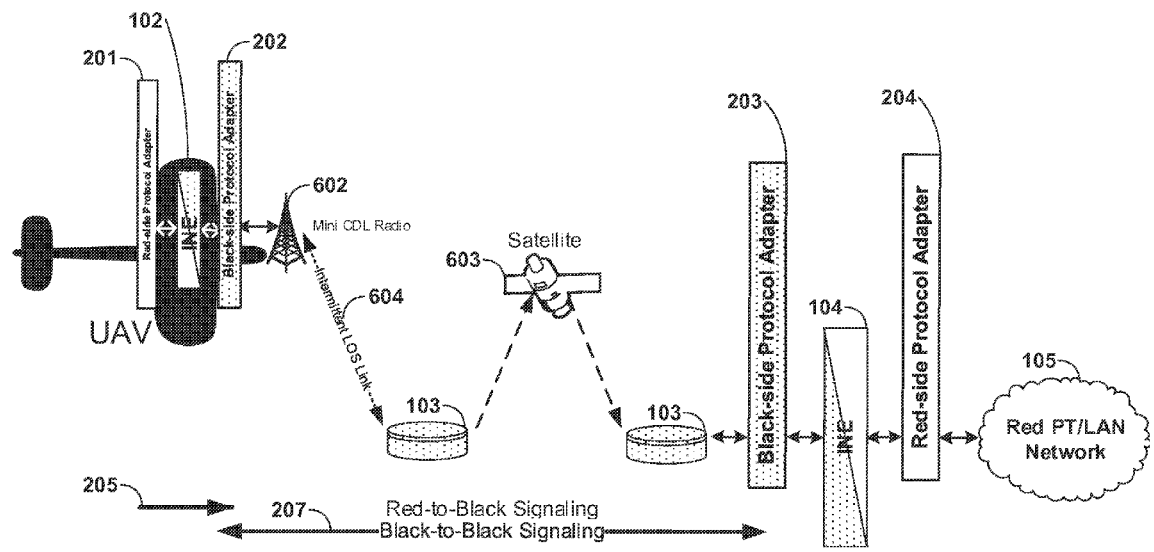
FIG. 6 is a system diagram illustrating an INE-based network with paired protocol adapters configured to implement a disruption tolerant network proxy function according to one aspect of the disclosure.

FIG. 6 is a system diagram illustrating an INE-based network with CAPTAIN-enabled protocol adapters configured to implement disruption tolerant network PEP functions. Disruption Tolerant Networking (DTN) protocols are extremely useful in cases where network connections are known a priori to be intermittent or episodic in nature. An application wishing to transfer application data (for instance, a large data file) can employ a DTN protocol to divide this application data into discrete "bundles" which are each small enough to be reliably transferred during expected network "up-time" periods or episodes. The application data and, where necessary, individual data bundles in transit, are buffered during network "down-time", and may even be moved to secondary/disk storage for extended disruptions or very large buffer sizes.

DTN Bundling protocols are problematic within traditional crypto-partitioned network environment. The protocols rely on the transfer of "bundles", but a Red-side DTN application is typically unable to determine whether a bundle has been successfully transferred to the "next hop" on the Black network. As far as a Red-side DTN application is concerned, the "next hop" is also on the Red-side in another enclave—the Black network is "invisible." Thus, DTN applications on the Red-side network cannot operate correctly in the face of network disruptions within the Black network. For disruptions/delays on the Black network on the order of 30 seconds or more TCP-based flows break down completely, rendering many DTN Bundling protocols totally inoperable in such an environment. In essence DTN applications must treat the entire Black-side network as a single hop. Thus, disruptions in the Black-side network which DTN itself could handle can break the DTN flows.

The techniques of this disclosure may overcome this problem by using the CSP to designate the bundle boundaries of a Red-side DTN flow to DTN agents on the Black-side. Once the Black-side is aware of the bundle-structure of the DTN flow, the Black-side protocol adapters (black-side protocols) and routers within the Black network can use DTN protocols to ensure that bundles are buffered and transferred appropriately until they eventually emerge again into a Red-side protocol adapter.

In one example, the first Red-side protocol adapter 201 processes a data packet to become a start of sequence packet. The data packet is sent from the first Red-side protocol adapter 201 to the INE 102 and forwarded to the first Black-side protocol adapter 202 along Red-to-Black signaling line 205, where it is held. The first Red-side protocol adapter 201 then sends at least one additional data packet to the INE 102. The first Black-side protocol adapter 202 then receives the at least one additional data packet from the INE 102 along Red-to-Black signaling line 205, where they are again held in the order that they are received by the first Black-side protocol adapter 202. The data packets could also be processed in such a way that the data packets contain a counter in one of the pass-through fields, such that the counter represents the order in which the data packets should be sent. When the first Black-side protocol adapter 202 receives the marked data packets, the first Black-side protocol adapter 202 encapsulates each packet into a DTN bundle which are individually forwarded to the next destination in the chain, such as the second Black-side protocol adapter 203 along the Black-to-Black signaling line 207. This process could be repeated between the first Black-side protocol adapter 202 and the second Black-side protocol adapter 203, as well as the second Black-side protocol adapter 203 and the second Red-side protocol adapter 204.

As discussed above, in one example of the disclosure, the performance enhancing proxy function is a disruption tolerant networking (DTN) proxy function. In this example, the techniques of this disclosure may further include inserting in at least one of the one or more pass-through fields, by a first protocol adapter (e.g. red-side protocol 201), a start of sequence indication. The first protocol adapter then sends at least one additional data packet to an INE (e.g. INE 102), which is then received by a second protocol adapter (e.g. black-side protocol 202), where all received data packets are stored and forwarded using DTN protocols running in the Black network. A chain of black side protocol adapters may exist between 201 and 202 on the black network. These intermediate protocol adapters serve to buffer and forward the packets along the network path from 201 to 202 despite link disruptions in that path. Eventually, the receiving Red-side protocol adapter 204 receives all the data and sends an acknowledgement back to the sending Red-side protocol adapter 201, at which point the transfer is complete. If the acknowledgement is not received at 201 within the specified timeout, the whole transfer is redone.

Figure 7:
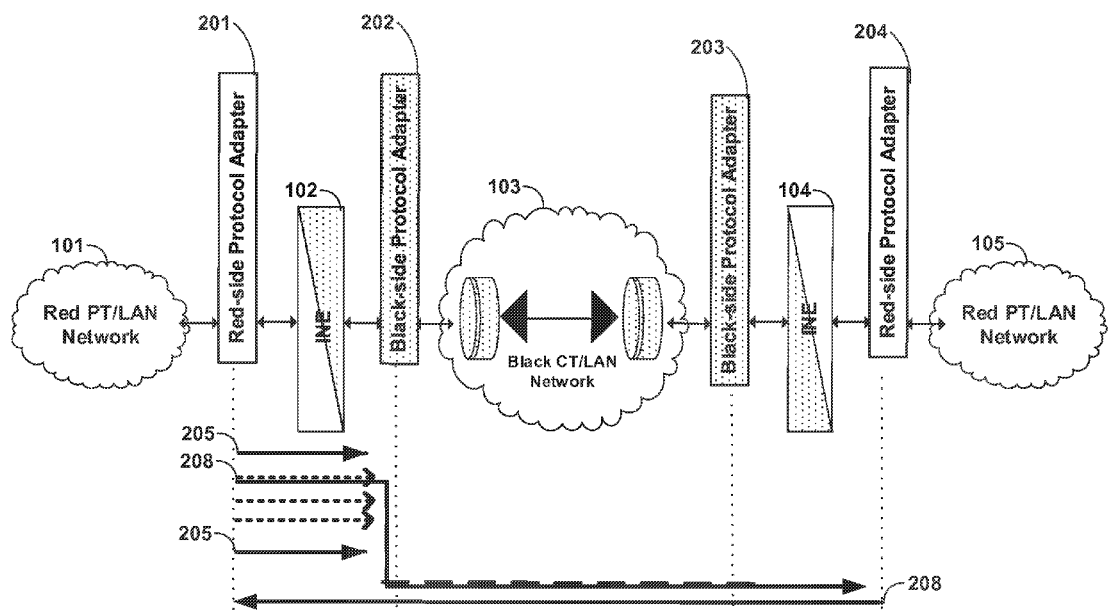
FIG. 7 is a system diagram illustrating an INE-based network with paired protocol adapters configured to implement an on-demand signal sequence of events according to one aspect of the disclosure.

FIG. 7 is a system diagram illustrating an INE-based network with CAPTAIN-enabled protocol adapters configured to implement an on-demand signaling protocol. The general approach of on-demand signaling is that the Red-side protocol adapters generate a group of packets on-demand, with each packet representing a particular "outcome" for some operation. The Black-side protocol adapters are configured to pass on only one packet to indicate the desired state or outcome. The selected packet is forwarded across the Black network to a particular Red-side protocol adapter, which echoes it back for delivery to the Red-side protocol adapter on the originating side.

On-Demand Black-to-Red signal packets would be in response to a request from a Red-side protocol adapter, all part of a Red-to-Black "On-Demand" signal sequence, i.e., any Red-to-Black sequence that requires a detailed Black-to-Red response. A source Red-side protocol adapter would issue a sequence of data packets within its start/end of sequence packets, each having a meaning to the SOS indications being issued. The Black-side protocol adapter on the originating side would intelligently link those X packets to information that it would like the source Red-side protocol adapter to have. The source Black-side protocol adapter would forward the chosen data packet through the network. The receiving Red-side protocol adapter would see the indication that passed through the network from the originating Red-side protocol adapter and respond by echoing the packet back.

For example, in FIG. 7, first Red-side protocol adapter 201 issues the "On-Demand" SOS with a fixed number of data packets along Red-to-Black signaling line 205. For instance, the first Red-side protocol adapter 201 might issue 5 data packets with (by prior agreement) the first data packet corresponding to 1 GBps, the second to 100 MBps, the third to 10 MBps, the fourth to 1 MBps, and the fifth to 100 KBps. Although bandwidth is being requested in this example, the network metric being requested could be a variety of different network metrics, including latency, reliability, or hop count, among other things. The first Black-side protocol adapter 202 will read the SOS packet to determine which network metric is being requested. This first Black-side protocol adapter 202 will be configured to measure a variety of network metrics, including bandwidth. So long as the first Black-side protocol adapter 202 is configured to measure the requested network metric, the first Black-side protocol adapter 202 will determine the actual value of the requested network metric. The first Black-side protocol adapter 202 chooses one of the five data packets that most closely corresponds to the measured network metric and lets that single data packet go through to the second Red-side protocol adapter 204 along the Red-to-Red signaling line 208. The second Red-side protocol adapter 204 echoes the originating packet back to first Red-side protocol adapter 201 along Red-to-Red signaling line 208. The first Red-side protocol adapter 201 gets back a single packet that has been chosen by the first Black-side protocol adapter 202 to indicate its current state. If the current bandwidth was 100 MBps, the first Black-side protocol adapter 202 would select the second packet as the one sent towards the second Red-side protocol adapter 204.

In another example, instead of sending a plurality of data packets from the first Red-side protocol adapter 201 to the first Black-side protocol adapter 202, the first Black-side protocol adapter 202 could store the plurality of data packets and perform a stored signaling function. According to a schedule, the first Black-side protocol adapter 202 could measure or determine a network metric. Once the network metric is measured, the first Black-side protocol adapter 202 could send a data packet that corresponds to the value of that network metric to a second Red-side protocol adapter 204.

As discussed above, in one example of the disclosure, the performance enhancing proxy function is a stored signaling function. In this example, the techniques of this disclosure may further include storing, at the second protocol adapter (e.g. black-side protocol 202), a plurality of data packets, wherein a value of a network metric is included in the one or more pass-through fields for each of the plurality of data packets. The second protocol adapter would then read, in accordance with a schedule, the network metric indicated by the values in the one or more pass-through fields for each of the plurality of data packets. The second protocol adapter then forwards one of the plurality of data packets that corresponds to the correct value of the network metric to a third protocol adapter (e.g. red-side protocol 204) located in a second trusted network (e.g. Red network 105).

Figure 8:
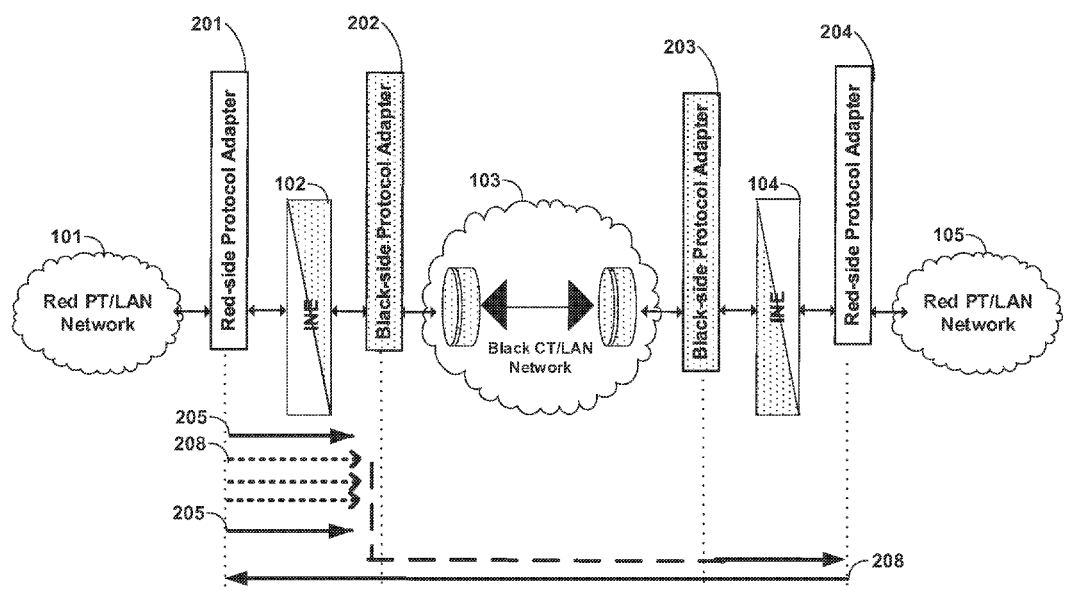
FIG. 8 is a system diagram illustrating an INE-based network with paired protocol adapters configured to implement a function that reports network statistics.

FIG. 8 is a system diagram illustrating an INE-based network with CAPTAIN-enabled protocol adapters configured to detect bandwidth and/or bit error rates and to implement network sensing proxy functions. In one example of the disclosure, CSP along with multi-function paired protocol adapters may be configured to provide Black-side network sensing to applications on the Red-side. This task will also incorporate implementing the messaging format for a third party protocol adapter to gather the network sensing information. Determination of the perceived bandwidth and/or the BER will enable a Red-side protocol adapter to invoke various measures such as forward error-correction, routing decisions or traffic prioritization to achieve desired performance when links are degraded. In crypto-partitioned networks knowledge of network characteristics such as bandwidth, bit error rates (BER) and latency in the Black network are invisible to the Red-side. CAPTAIN signaling would give the Red enclaves control that they don't currently have in a crypto-partitioned network.

Periodically, the first Red-side protocol adapter 201 will send a data sequence along the Red-to-Black signaling line 205 to the first Black-side protocol adapter 202 which instructs the first Black-side protocol adapter 202 to report the available bandwidth on a particular path. The first data packet sent would indicate a start of sequence indication. The "intermediate" data packets of the data sequence will each be addressed to the desired endpoint of the path to be sensed and could consist of 10 frames, corresponding to the 10 increments (1 to 10 Mbps). The final data packet sent would indicate an end of service indication. The first Red-side protocol adapter 201 may be configured to insert a data item into one of the one or more pass-through fields within each frame, indicating which type of data they pertain to. These frames will be received by the first Black-side protocol adapter 202, but it will only forward the frame corresponding to the correct bandwidth value through to the desired endpoint, a second Red-side protocol adapter 204. The second Red-side protocol adapter 204 will then echo the data packet, which contains the correct value of the measured network metric, back to the first Red-side protocol adapter 201 along the Red-to-Red signaling line 208 which will read the data item within the frame and thus determine the available bandwidth. Although bandwidth is measured in this example, the network metric could be a different network metric, including latency, bit-error rate, reliability, or hop count, among other things.

As discussed above, in one example of the disclosure, the performance enhancing proxy function is a network sensing proxy function. In this example, the techniques of the disclosure may further include sending, with a first protocol adapter (e.g. red-side protocol 201), a data sequence including a plurality of data packets to a second protocol adapter (e.g. black-side protocol 202), wherein a value of a network metric is included in the one or more pass-through fields for each of the plurality of data packets. The first data packet of the plurality of data packets will always indicate a start of sequence indication, and the final data packet of the plurality of data packets will always indicate an end of sequence indication, while all of the intermediate data packets will include a possible value of a network metric. In response to receiving the data sequence, the second protocol adapter determines an actual value for the requested network metric. The second protocol adapter then forwards the one of the plurality of data packets to a third protocol adapter (e.g. red-side protocol 204) that corresponds to the actual value of the network metric. The third protocol adapter then sends a data packet back to the first protocol adapter. Optionally, the first protocol adapter can then perform a network management function in the case that the actual value of the network metric indicates a degraded link.

Figure 9:
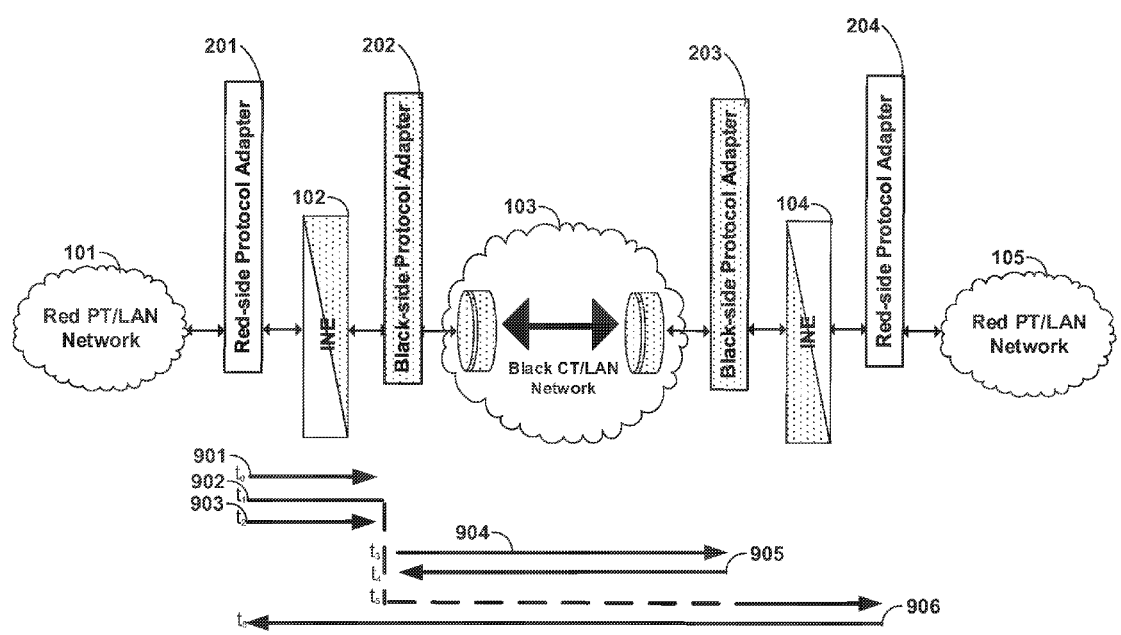
FIG. 9 is a system diagram illustrating an INE-based network with paired protocol adapters configured to ensure quality of service (QoS) sequencing.

FIG. 9 is a system diagram illustrating an INE-based network with CAPTAIN-enabled protocol adapters that demonstrates quality of service (QoS) provisioning. Red-side applications may need to reserve bandwidth over the Black network on a per-security association basis, essentially providing a bandwidth guarantee for the IPSEC tunnel connecting two Red protocol adapters. Even if such a Red-Red reservation is made, the Black-side network has no way of knowing about or honoring the reservation. Practically, the presence of the Black network negates the ability of the Red enclaves to make meaningful QoS reservations between each other, as congestion or bandwidth limitations in the Black network can limit performance unbeknownst to the Red-side.

The CAPTAIN multi-function proxy, using both the Red-side and Black-side protocol adapters around the INEs, will allow for a reservation to be made validly and accepted across both the Red and Black networks. The Black-side protocol adapters in conjunction with the Red-side protocol adapters will use their processing to indicate back to the reserving Red-side protocol adapter if the requested reservation passed or failed.

At a high level, the CSP for QoS will allow the first Red-side protocol adapter to make a matching Black-to-Black reservation for each desired Red-to-Red reservation. The second Red-side proxy will have received notice from second Black-side proxy as to whether the Black reservation passed or failed. The second Red-side protocol adapter will then issue a Red-to-Red response packet to the source, the first Red-side protocol adapter.

Referencing FIG. 9, the first red-side protocol adapter 201 sends an SOS data packet to the first Black-side protocol adapter 202 via the INE 102 to initiate a bandwidth reservation request along red-to-black signaling line 901. The first red-side protocol adapter 201 then sends a second data packet to a second red-side protocol adapter 204 along red-to-red signaling line 902, wherein the second data packet indicates a desired bandwidth. The first red-side protocol adapter 201 then sends a third data packet to the first black-side protocol adapter 202 along red-to-black signaling line 903, wherein the third data packet indicates an end of sequence packet. The first black-side protocol adapter 202 then attempts to reserve the requested bandwidth in Black network 103 according to a reservation protocol. This reservation protocol could be Resource Reservation Protocol (RSVP), among other things. The Black network 103 will send a response to the first black-side protocol adapter 202, wherein the response is an indication of one of success or failure in reserving the bandwidth. The first black-side protocol adapter 202 then encapsulates the second data packet to the second black-side protocol adapter 203. During this encapsulation process, information regarding the success or failure in reserving bandwidth indicated by the response to the request sent by the Black network 103 is added to an outer wrapper of the second data packet. The second black-side protocol adapter 203 then unencapsulates the second data packet. The second black-side protocol adapter 203 then sends the unencapsulated second data packet to a second INE 104. The second INE 104 then copies the outer wrapper's unencapsulated explicit congestion notification bits of the second data packet into a set of explicit congestion notification bits. After all of these events have occurred, the second data packet is received and read by the second red-side protocol adapter 204. The second red-side protocol adapter 204 then reads the explicit congestion notification bits in the data packet. Finally, the second red-side protocol adapter 204 sends a fourth data packet to the first red-side protocol adapter 201 along red-to-red signaling line 906, wherein the fourth data packet is an indication of acceptance or denial of the bandwidth reservation request.

As discussed above, in one example of the disclosure, the performance enhancing proxy function is a quality-of-service management proxy function. In this example, the techniques of the disclosure further include sending a first data packet from a first protocol adapter (e.g. red-side protocol 201) to a second protocol adapter (e.g. black-side protocol 202), wherein the first data packet includes a bandwidth reservation request. The first protocol adapter then sends a second data packet to the second protocol adapter, wherein information in the header of the second data packet indicates a desired destination. The first protocol adapter then sends a third data packet to the second protocol adapter, wherein information in the one or more pass-through fields in the third data packet indicates an end-of-sequence packet. After receiving these three packets, the second protocol adapter will attempt to reserve the requested amount of bandwidth within an untrusted network (e.g. Black network 103) according to a reservation protocol. At this point, the untrusted network sends a response of success or failure back to the second protocol adapter. The second protocol adapter then encapsulates the second data packet at the second protocol adapter to the third protocol adapter, wherein the encapsulating further comprises adding information regarding the success or failure in reserving bandwidth indicated by the response to the request sent to the untrusted network to an outer wrapper of the second data packet. The third protocol adapter then unencapsulates the second data packet before delivering the unencapsulated second data packet to a second INE (e.g. INE 104). The second INE copies the outer wrapper of the unencapsulated second data packet into a set of explicit congestion notification bits at the second INE. A fourth protocol adapter (e.g.

red-side protocol 204) located in a second trusted network (e.g. Red network 105) then reads the explicit congestion notification bits of the data packet. Finally, the fourth protocol adapter sends a fourth data packet from the fourth protocol adapter to the first protocol adapter, wherein the packet's data is an indication of acceptance or denial of the bandwidth reservation request.

The CAPTAIN multi-function protocol adapter will provide the capability to conserve bandwidth by pruning unnecessary multicast traffic in the Black core. It will also provide functionality that can be used or leveraged to implement PIM-SSM across INEs.

Figure 10:
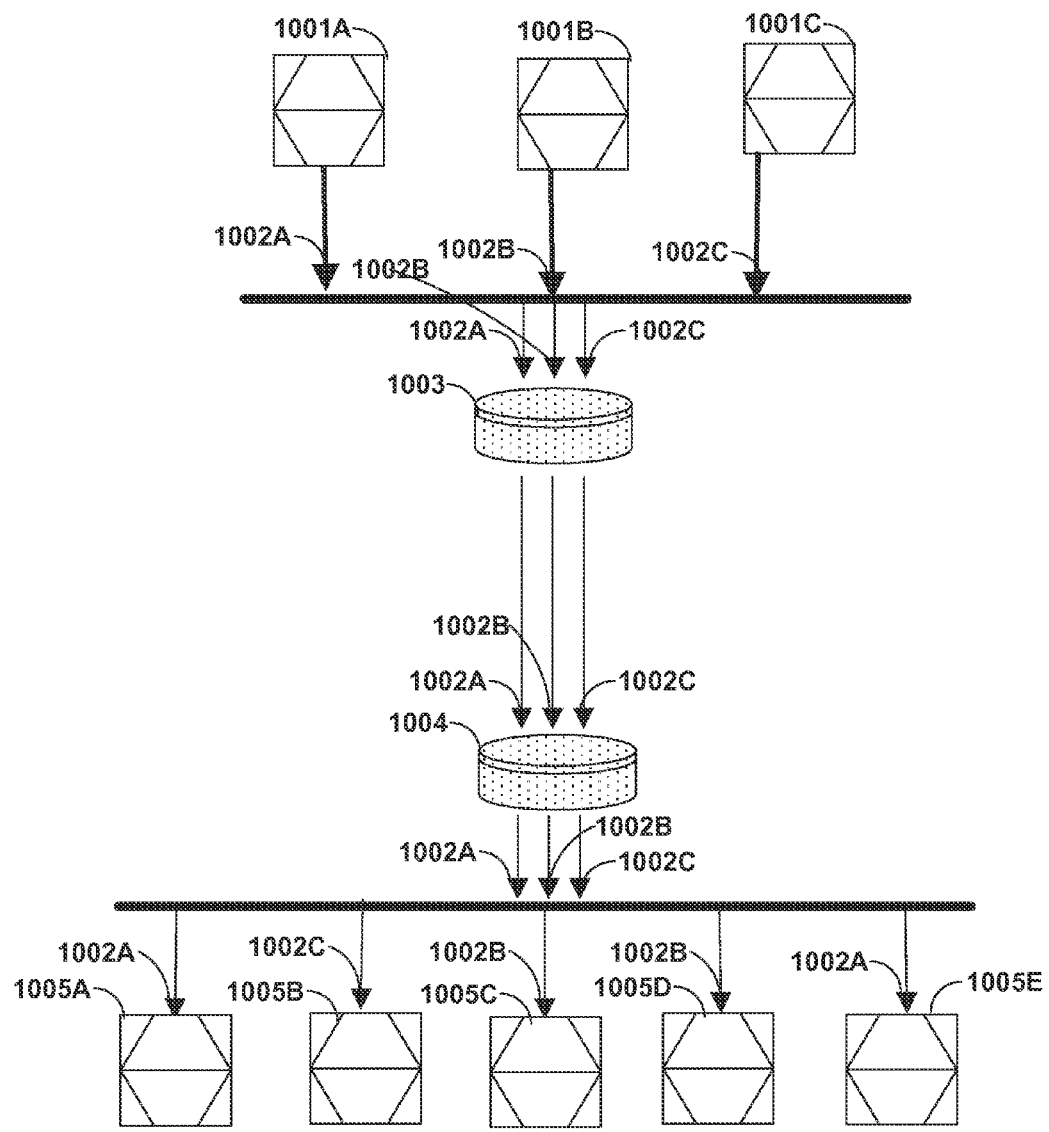
FIG. 10 is a system diagram illustrating a multicast network.

FIG. 10 is a system diagram illustrating a multicast network. In a multicast network, each one of the sources 1001A, 1001B, and 1001C (collectively, "the sources 1001") is situated within a local-area network (LAN). If this is used in a tactical network, these sources may represent video cameras on a surveillance platform, among other things. These could also be used in non-tactical networks. Each one of the sources 1001 transmits IP multicast packets and streams to an associated flow 1002A, 1002B, and 1002C (collectively, "the flows 1002"). The flows 1002 go through a first router 1003 and a second router 1004, each of which is in a wide-area network (WAN). These routers could be connected by communications links such as satellite communication (SATCOM) links, among other things. The IP multicast flows finally go to a second LAN site with receivers 1005A, 1005B, 1005C, 1005D, and 1005E (collectively, "the receivers 1005). If used in a tactical network, the receivers 1005 could represent workstations used by intelligence analysts to monitor the surveillance video streams in real time, among other things, though it is not necessary for these to be in a tactical network.

The receivers 1005 must "Join" and "Leave" each multicast flow that they wish to subscribe to. Using a pre-defined multicast protocol, such as PIM-SSM, a specific receiver 1005A-E would communicate with second router 1004 of its desire to "Join" or "Leave" a specific flow 1002A-C. The second router 1004 communicates this operation to the first router 1003, which handles the traffic management of the flows 1002. If none of the receivers 1005 are subscribing to a given flow 1002A, 1002B, or 1002C, the first router 1003 does not send that flow across the black network, conserving bandwidth in the system.

Figure 11:
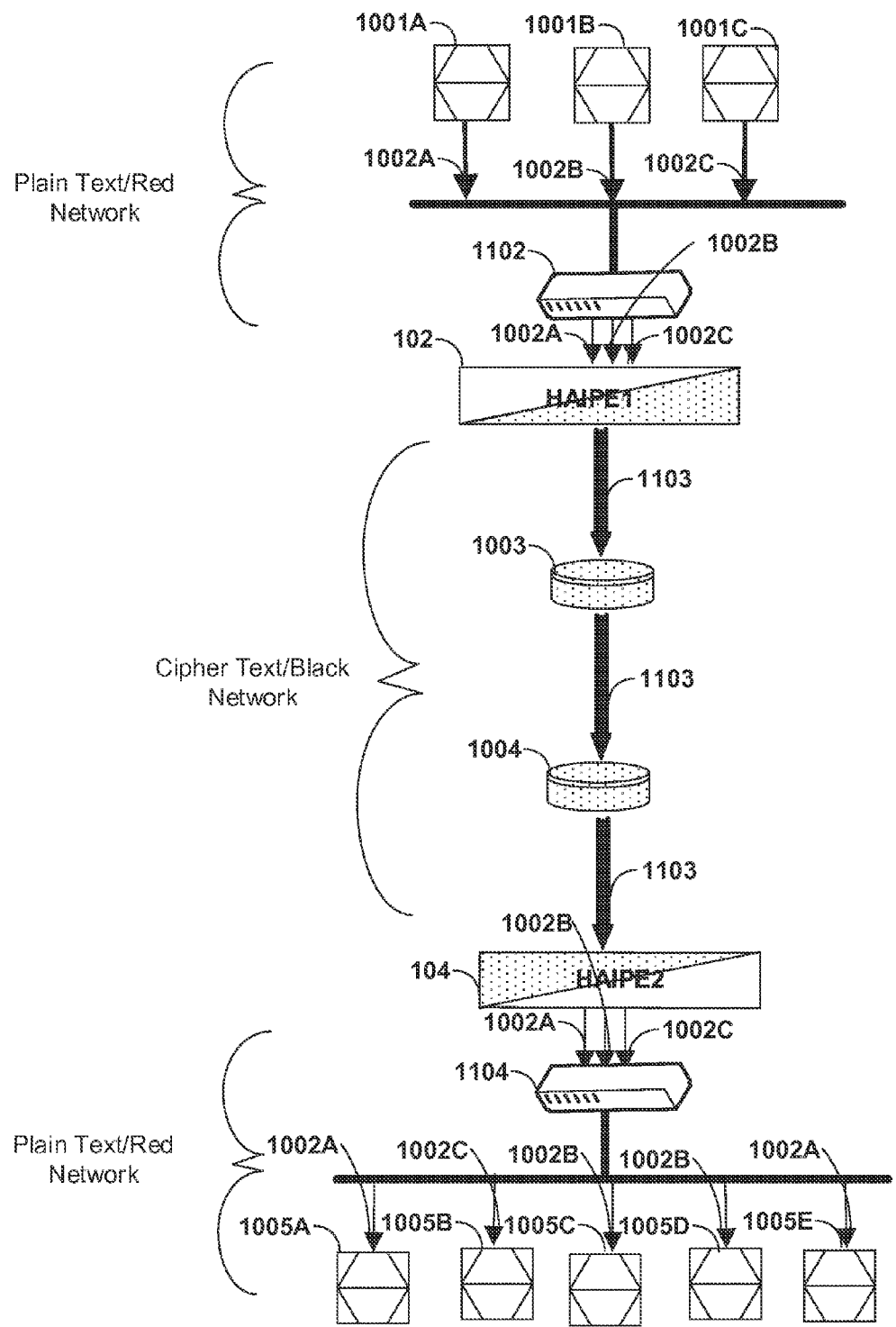
FIG. 11 is a system diagram illustrating an INE-based multicast network.

FIG. 11 is a system diagram illustrating an INE-based multicast network. In a multicast network, each one of the sources 1001A, 1001B, and 1001C (collectively, "the sources 1001") is situated within a local-area network (LAN). If this is used in a tactical network, these sources may represent video cameras on a surveillance platform, among other things. These could also be used in non-tactical networks. Each one of the sources 1001 transmits IP multicast packets and streams to an associated flow 1002A, 1002B, and 1002C (collectively, "the flows 1002"). The flows 1002 are funneled through a first switch 1102 before being sent to a first INE 102. The flows 1002 go through encrypted multicast tunnel 1103 then go to a first router 1003 and a second router 1004, each of which is in a wide-area network (WAN). These routers could be connected through communication links such as satellite communication (SATCOM) links, among other things. The encrypted multicast tunnel 1103 then goes through a second INE 104, where it is decrypted back into flows 1002A-C. The flows 1002 are sent through a second switch 1104 to allow for multicast distribution. Finally, the flows 1002 go to a second LAN with receivers 1005A, 1005B, 1005C, 1005D, and 1005E (collectively, "the receivers 1005). If used in a tactical network, the receivers 1005 could represent workstations used by intelligence analysts to monitor the surveillance video streams in real time, among other things, though it is not necessary for these to be in a tactical network.

These multicast networks can lead to inefficiency. The multicast network of FIG. 10 is not a secure multicast network, as no encryption takes place. In the multicast network of FIG. 11, when the flows 1002 are encrypted and combined into multicast tunnel 1103, the source address of each individual flow 1002A, 1002B, and 1002C can no longer be read. Therefore, if one of the receivers 1005 wishes to leave a subscription, and no other receivers are subscribing to a particular flow 1002A, 1002B, or 1002C, that particular flow is still sent through the black network 103, using valuable bandwidth unnecessarily.

Figure 12:
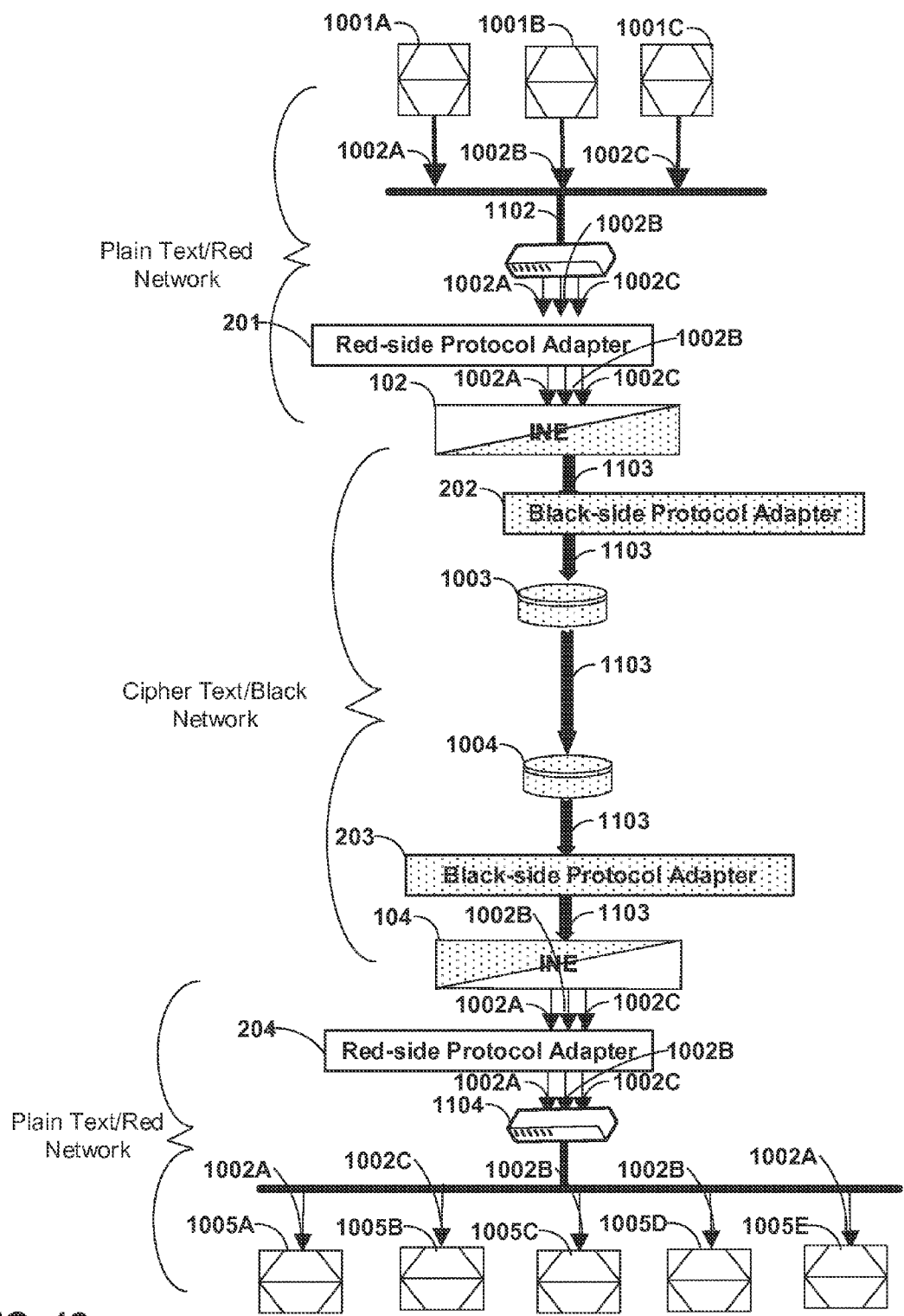
FIG. 12 is a system diagram illustrating an INE-based multicast network with paired protocol adapters.

FIG. 12 is a system diagram illustrating an INE-based multicast network with CAPTAIN-enabled protocol adapters. In a multicast network, each one of the sources 1001A, 1001B, and 1001C (collectively, "the sources 1001") is situated within a local-area network (LAN). If this is used in a tactical network, these sources may represent video cameras on a surveillance platform, among other things. These could also be used in non-tactical networks. Each one of the sources 1001 transmits IP multicast packets and streams to an associated flow 1002A, 1002B, and 1002C (collectively, "the flows 1002"). The flows 1002 go through a first red-side protocol adapter 201 before going through a first INE 102. Encrypted multicast groups 1103 then go to a first black-side protocol adapter 202 before going to a first router 1003 and a second router 1004, each of which is in a wide-area network (WAN). These routers could be connected by communications links such as satellite communication (SATCOM) links, among other things. The encrypted multicast tunnel 1103 then goes through a second black-side protocol adapter 203. The encrypted multicast tunnel 1103 then gets sent to a second INE 104, where it is decrypted back into individual flows 1002A, 1002B, and 1002C. A second red-side protocol adapter 204 receives the decrypted flows 1002 from the second INE 104. Finally, the flows 1002 go to a second LAN with receivers 1005. If used in a tactical network, the receivers 1005 could represent workstations used by intelligence analysts to monitor the surveillance video streams in real time, among other things, though it is not necessary for these to be in a tactical network.

Using the setup in FIG. 12, a variety of proxy functions can be performed. One such function is a multicast traffic management proxy function. This will provide functionality that allows the Red-side protocol adapter from which multicast flows are being sent to tag the individual flows. Its companion Black-side can then use a Network Address Translation (NAT) operation on the Black-side, assigning each multicast flow a unique source address on the Black network. This "Source NAT" function will allow the Red-side and Black-side protocol adapters on the receiving end of the multicast flows to subscribe using Source-Specific Multicast. This allows disaggregation of the flows in the tunnel whose destination is multicast address M, since each flow addressed to M has its own unique source address. By disaggregating the flows and allowing individual subscriptions on the Black-side, the disclosure will allow for much more efficient usage of network resources, since only the multicast traffic desired or subscribed to in a particular Red-side network will be forwarded to the enclave.

Referring to FIG. 12, the first Red-side protocol adapter 201 distinguishes multicast flows by tagging individual packets based on either the source address, the multicast destination, or a combination of the two. This tagging information is sent to both the first Black-side protocol adapter 202 and to the second Red-side protocol adapter 204 which subscribes to the multicast. The first Black-side protocol adapter 202 uses this tagging information in a NAT operation to assign a unique source address to the data packets with a given tag. The second Red-side protocol adapter 204 will send subscription information to its companion Black-side protocol adapter 203, which will perform a source-specific "Join" operation on the mapped source address, which correspond to traffic from one of the senders 1001A-C. When there are no receivers 1005A, 1005B, 1005C, 1005D, and 1005E (collectively, "the receivers 1005) left subscribing to an individual flow 1002A, 1002B, and 1002C (collectively, "the flows 1002"), the second Red-side protocol adapter 204 will send a notice to its companion Black-side protocol adapter 203 to perform a "Leave" operation on the specified source. These "Join" and "Leave" operations are communicated to the second router 1004 and the first router 1003 using a pre-defined multicast protocol, such as PIM-SSM. The first Black-side protocol adapter 202 will receive notice of these "Leave" operations from the first router 1003, which will notify the first Black-side protocol adapter 202 of the address of the specific flow 1002A, 1002B, or 1002C that has no receivers 1005 subscribing to it. If this occurs, the first Black-side protocol adapter 202 will stop any packets containing source address corresponding to the specific flow with no subscriptions from traversing the black network, conserving bandwidth within the network.

Another protocol adapter function that can be performed in this setup is a multicast congestion control function. Using the multicast traffic management proxy function above, this technique further involves giving priorities to each individual multicast flow. Each router 1003 and 1004 is configured to provide Explicit Congestion Notification (ECN) functionality. If congestion is encountered, the ECN bits in the IP packet header will be set to a value that indicates congestion for packets traversing a congested link on the router. If these bits are set to a value that indicates congestion, the ECN bits of a data packet traversing the network will be set by the routers 1003 and/or 1004. These bits will be read at the second Black-side protocol adapter 203. If congestion is detected, the second Black-side protocol adapter will notify the second Red-side protocol adapter 204 of the congestion. The second Red-side protocol adapter 204 contains a listing of priorities associated with each of the individual flows 1002A, 1002B, and 1002C. The second Red-side protocol adapter will then issue a "Leave" operation for whichever of the flows has the lowest priority, following the same protocol for a "Leave" operation as described above. This process is repeated until the network is no longer considered "congested". The second Black-side protocol adapter 203 will continue to monitor the ECN bits set by the routers 1003 and 1004, and will forward a notification to the second Red-side protocol adapter 204 when the ECN bits are set to not congested.

Figure 13:
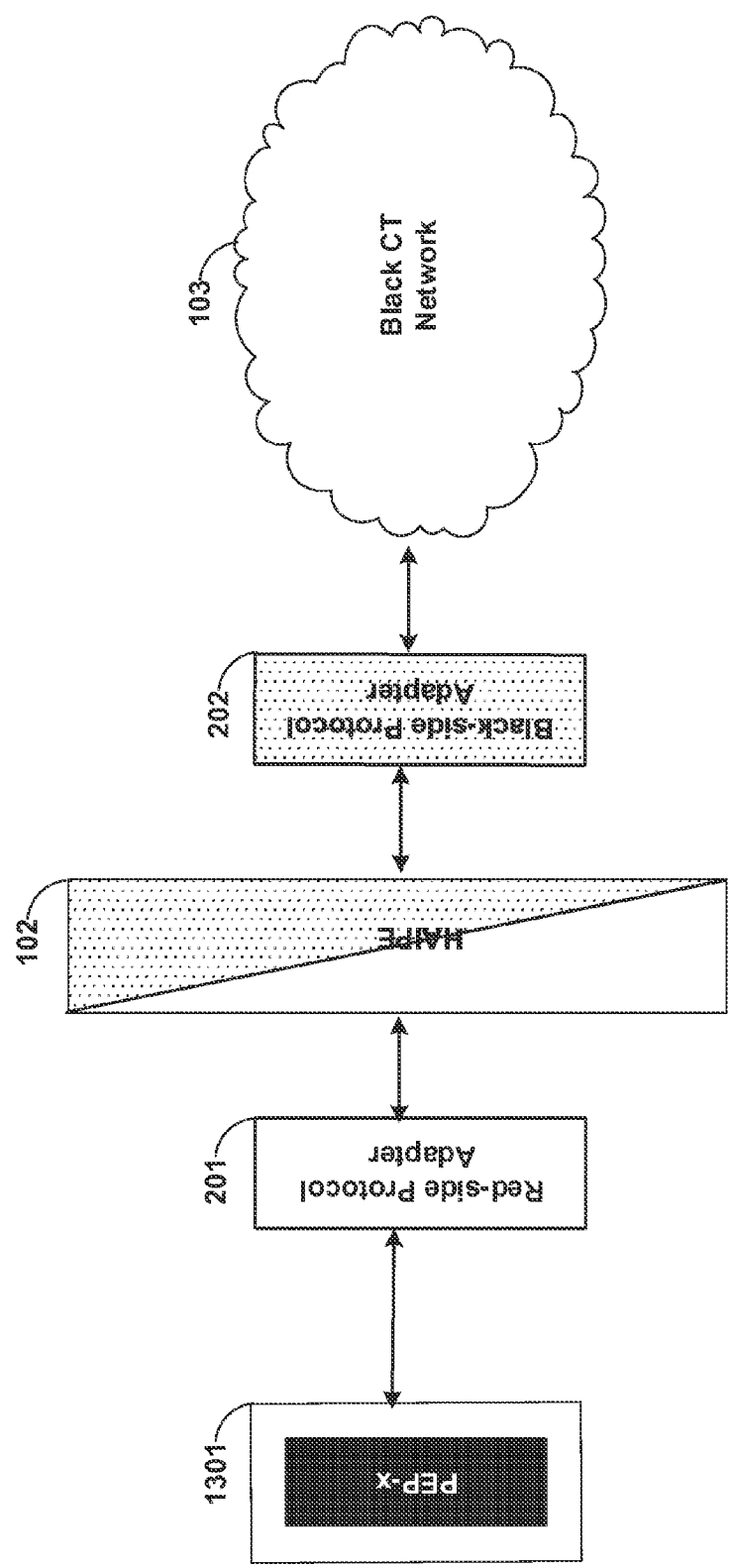
FIG. 13 is a system diagram illustrating protocol adapters.

FIG. 13 is a system diagram illustrating the use of CSP and paired protocol adapters as a protocol adapter. CAPTAIN is intended as a multi-function implementation, which may operate as a stand-alone protocol adapter for the functions that we have defined, or as an adapter for existing protocol adapters that need to exploit extra knowledge about the communications taking place and/or the structure of the underlying network to improve performance. Unfortunately, in traditional encryption techniques, the information they use to enhance performance is removed from the network traffic by the encryption process employed in the Black network. This stripping of information from the traffic makes many existing protocol adapters unusable in a crypto-partitioned network. The CSP, in conjunction with red-side and black-side protocol adapters around the INEs will act as a proxy to existing protocol adapters, to provide them the network information that they need to operate.

An existing Red-side performance enhancing proxy (PEP) 1301 in the figure uses a separate CAPTAIN-enabled Red-side protocol adapter 201 to facilitate communication with, and across, INE 102 into the black network 103 via the first black-side protocol adapter 202 and to gain access to the extra information it needs to perform its network optimizing functions. This approach allows for the full power of CAPTAIN and the CSP to be made available to existing protocol adapters. In order to allow existing protocol adapters, such as existing Red-side protocol adapter 1301, to communicate with CAPTAIN-enabled protocol adapters, such as Red-side protocol adapter 201, a definition of a messaging protocol could be provided to vendors of non-CAPTAIN-enabled PEPs.

Figure 14:
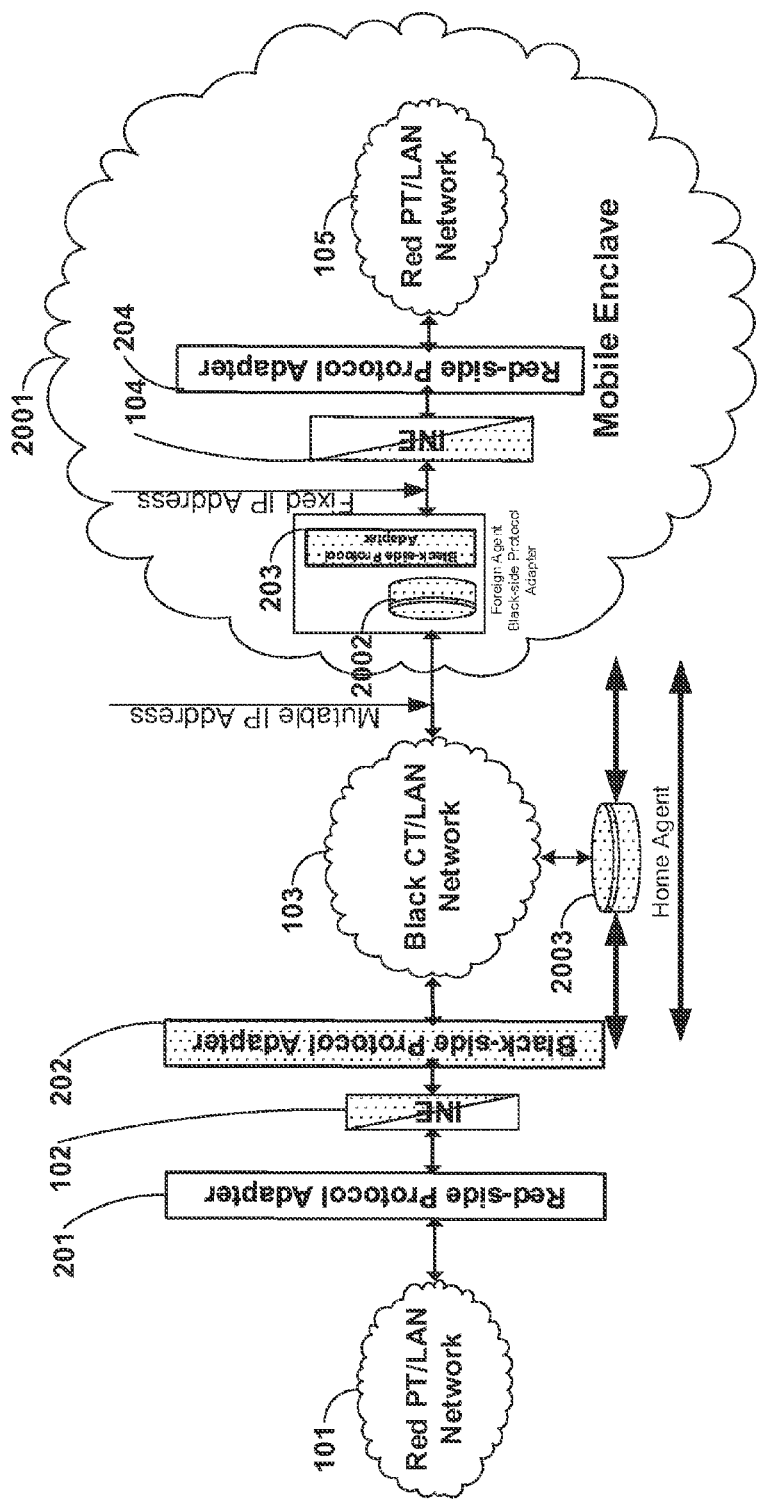
FIG. 14 is a system diagram illustrating a mobile INE-based network with paired protocol adapters configured to implement a mobility management proxy function.

FIG. 14 is a system diagram illustrating a mobile INE-based network with paired protocol adapters configured to implement a mobility management proxy function. The Black-side address of the INE is fixed when the security association is established. If the address later changes due to mobility, then all security associations will need to be re-established leading to connection disruption. The CAPTAIN solution utilizes a pure Black-side proxy with no requirements for Red-to-Black or Black-to-Red signaling. The black-side protocol adapter would incorporate plug-ins to handle various mobility management protocols, such as Mobile IPv4 or Mobile IPv6. For example, in the Mobile IPv4 case the black-side protocol adapter will implement the functions of a Mobile IPv4 "foreign agent". Even though new "care-of" addresses may be assigned by Mobile IP, the black-side protocol adapter will become the router for the INE. This ensures that security associations remain constant even though the Black-side's routed IP address may change.

Since Black-side protocol adapters 202 and 203 manage the destination addresses for all data packets, any movement or mobility of the mobile enclave 2001 can be handled at the Black-side protocol adapter level without wasting traffic by notifying the Red network 105. A Black-side protocol adapter 203 is coupled with a "foreign agent" 2002 to handle the mobility functions necessary. If the destination of mobile enclave 2001 is changed, the encapsulated packets received via the foreign agent 2002 will be routed through the Black-side protocol adapter 203. Alternatively, the destination address of directly received packets could be replaced with the Black-side protocol adapter's permanent home address. The Black network 103 also incorporates home agent 2003 to handle mobility functions on the Black-side, including updating the mutable IP address of the coupled foreign agent 2002 and Black-side protocol adapter 203.

Figure 15:
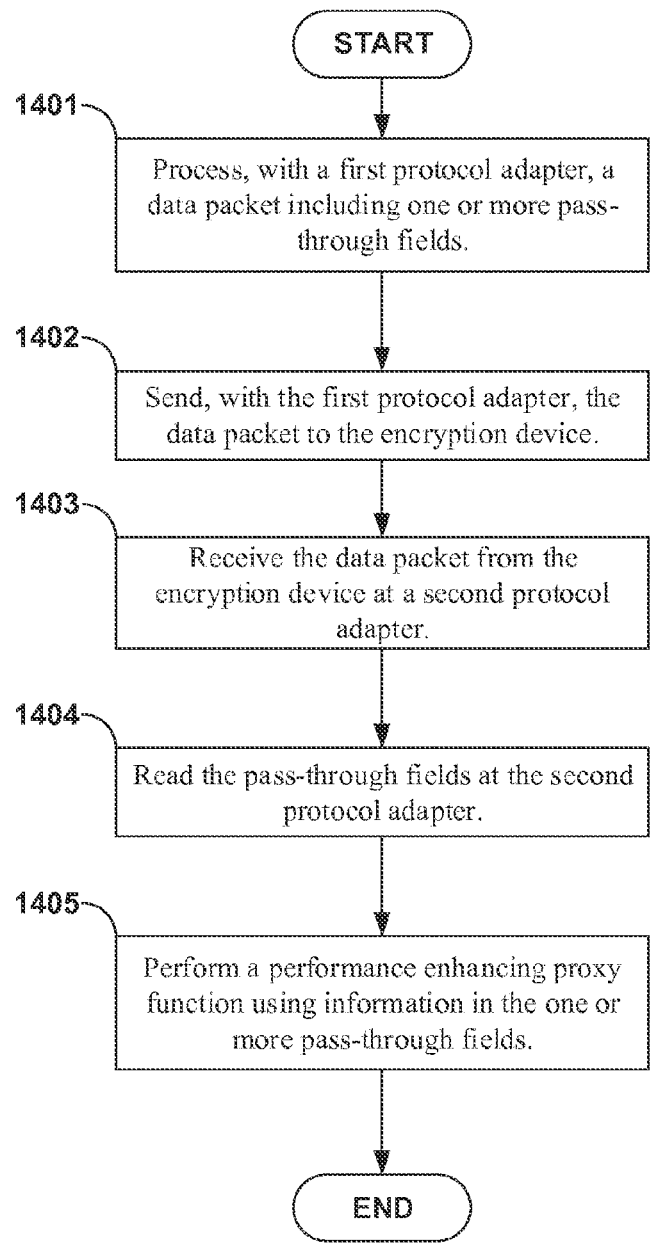
FIG. 15 is a flow diagram illustrating an example method of the disclosure.

FIG. 15 is a flow diagram illustrating an example method of the disclosure. In this process, in step 1401, a first protocol adapter processes a data packet including one or more pass-through fields. This processing step involves intercepting the data packet and inserting information into the one or more pass-through fields. In step 1402, the first protocol adapter sends the data packet to an INE. Step 1403 involves the second protocol adapter receiving the data packet from the INE. In step 1404, the second protocol adapter reads the pass-through fields. This reading step involves extracting the inserted information from the one or more pass-through fields. In step 1405, a performance enhancing proxy function is performed using information in the one or more pass-through fields.

Figure 16:
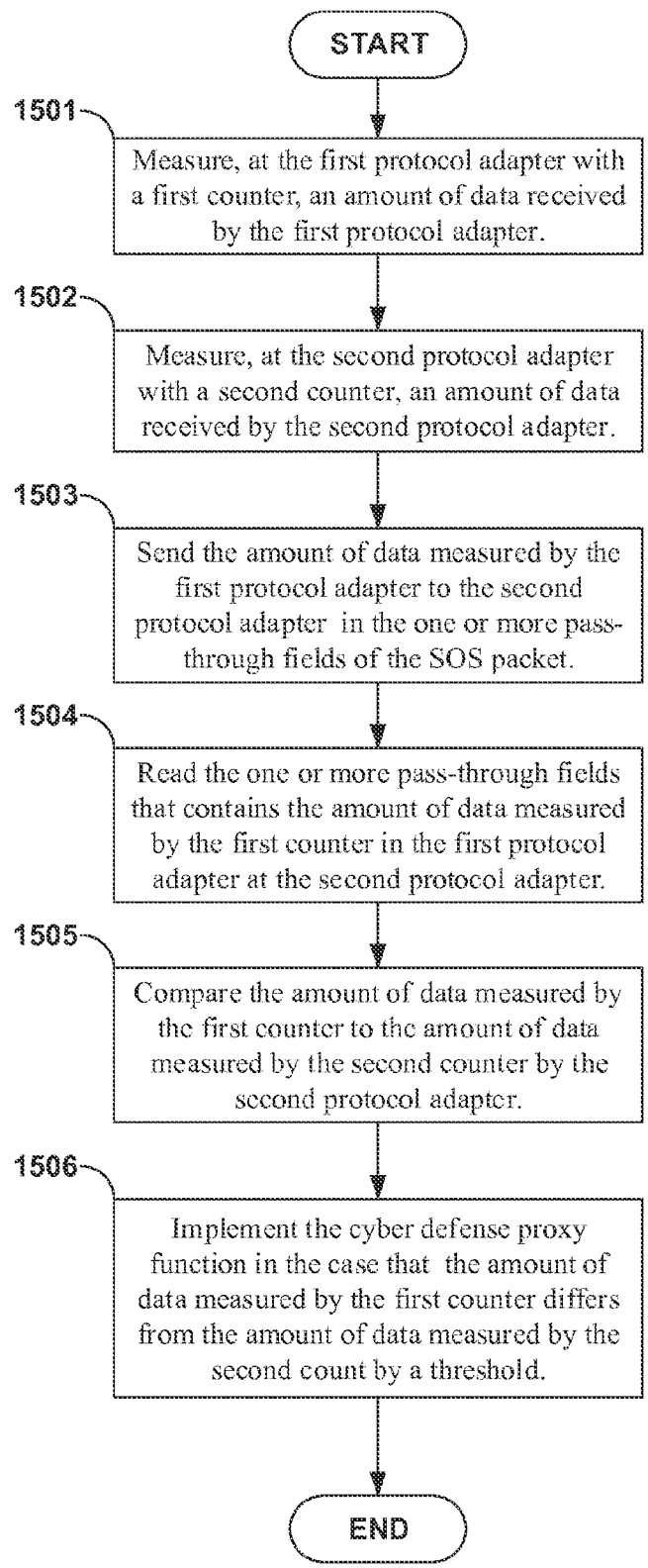
FIG. 16 is a flow diagram illustrating a cyber defense proxy function.

FIG. 16 is a flow diagram illustrating a cyber defense proxy function. In step 1501, the first protocol adapter measures, with a first counter, an amount of data received by the first protocol adapter from the INE. In step 1502, the second protocol adapter measures, with a second counter, an amount of data received by the second protocol adapter. In step 1503, the first protocol adapter sends the amount of data measured by the first protocol adapter to the second protocol adapter in the one or more pass-through fields of the SOS packet. In step 1504, the second protocol adapter reads the one or more pass-through fields that contain the amount of data measured by the first counter in the first protocol adapter. In step 1505, the second protocol adapter compares the amount of data measured by the first counter to the amount of data measured by the second counter. In step 1506, the cyber defense proxy function is implemented in the case that the amount of data measured by the first counter differs from the amount of data measured by the second count by a threshold.

Figure 17:
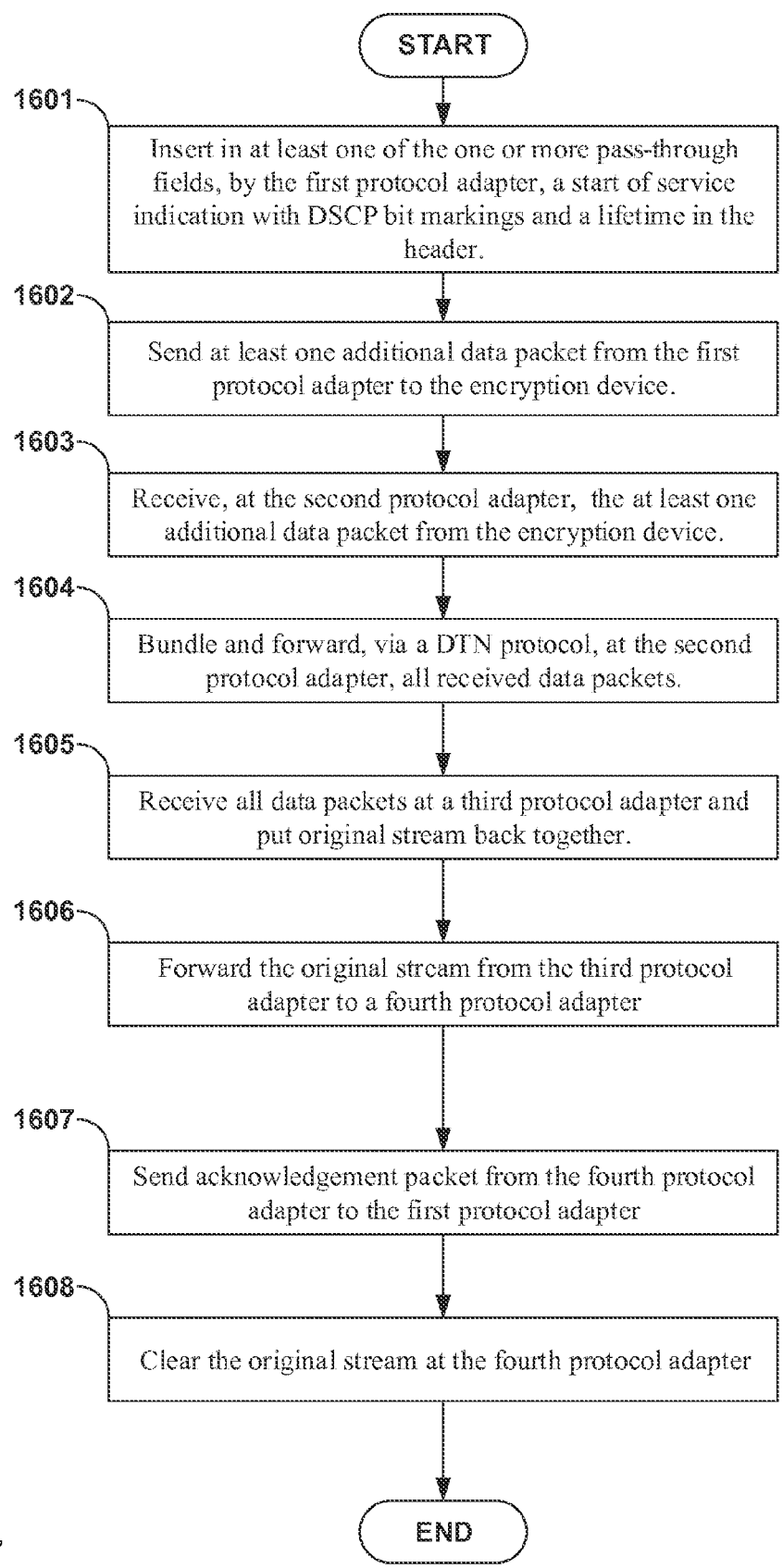
FIG. 17 is a flow diagram illustrating a disruption tolerant network proxy function.

FIG. 17 is a flow diagram illustrating a disruption tolerant network proxy function. In step 1601, the first protocol adapter inserts into at least one of the one or more pass-through fields a start of sequence indication. In step 1602, the first protocol adapter sends at least one additional data packet to the INE. In step 1603, the second protocol adapter receives the at least one additional data packet from the INE. In step 1604, the second protocol adapter bundles each data packet, and forwards using a DTN protocol. In step 1605, a third protocol adapter receives all of the data packets and assembles the original stream back together in order. In step 1606, the third protocol adapter forwards the original stream from the third protocol adapter to a fourth protocol adapter. In step 1607, the fourth protocol adapter sends an acknowledgement packet to the first protocol adapter. In step 1608, the fourth protocol adapter clears the original stream.

Figure 18:
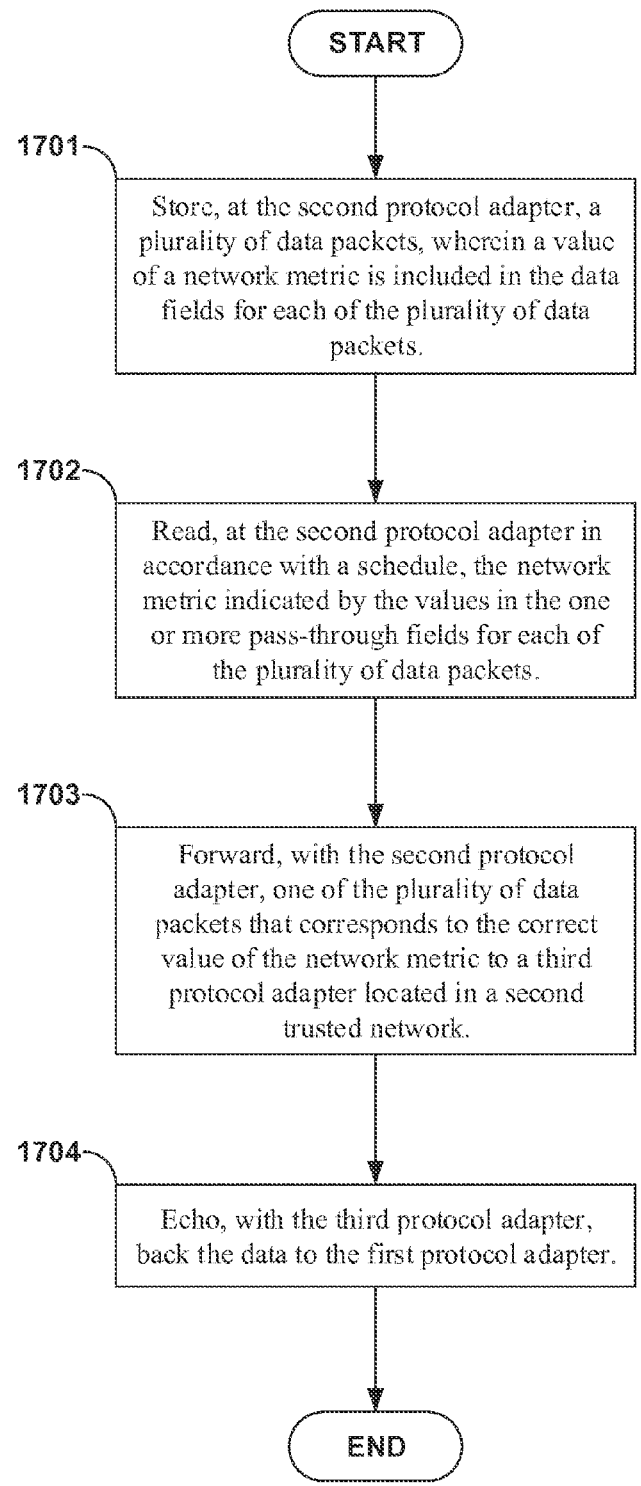
FIG. 18 is a flow diagram illustrating a stored signaling proxy function.

FIG. 18 is a flow diagram illustrating a stored signaling proxy function. In step 1701, after an SOS packet is sent, the second protocol adapter stores a plurality of data packets, wherein a value of a network metric is included in the data for each of the plurality of data packets. In step 1702, the second protocol adapter reads, in accordance with a schedule, the network metric indicated by the values in the one or more pass-through fields for each of the plurality of data packets. In step 1703, the second protocol adapter forwards one of the plurality of data packets that corresponds to the correct value of the network metric to a third protocol adapter located in a second trusted network. In step 1704, the third protocol adapter echoes back the data to the first protocol adapter.

Figure 19:
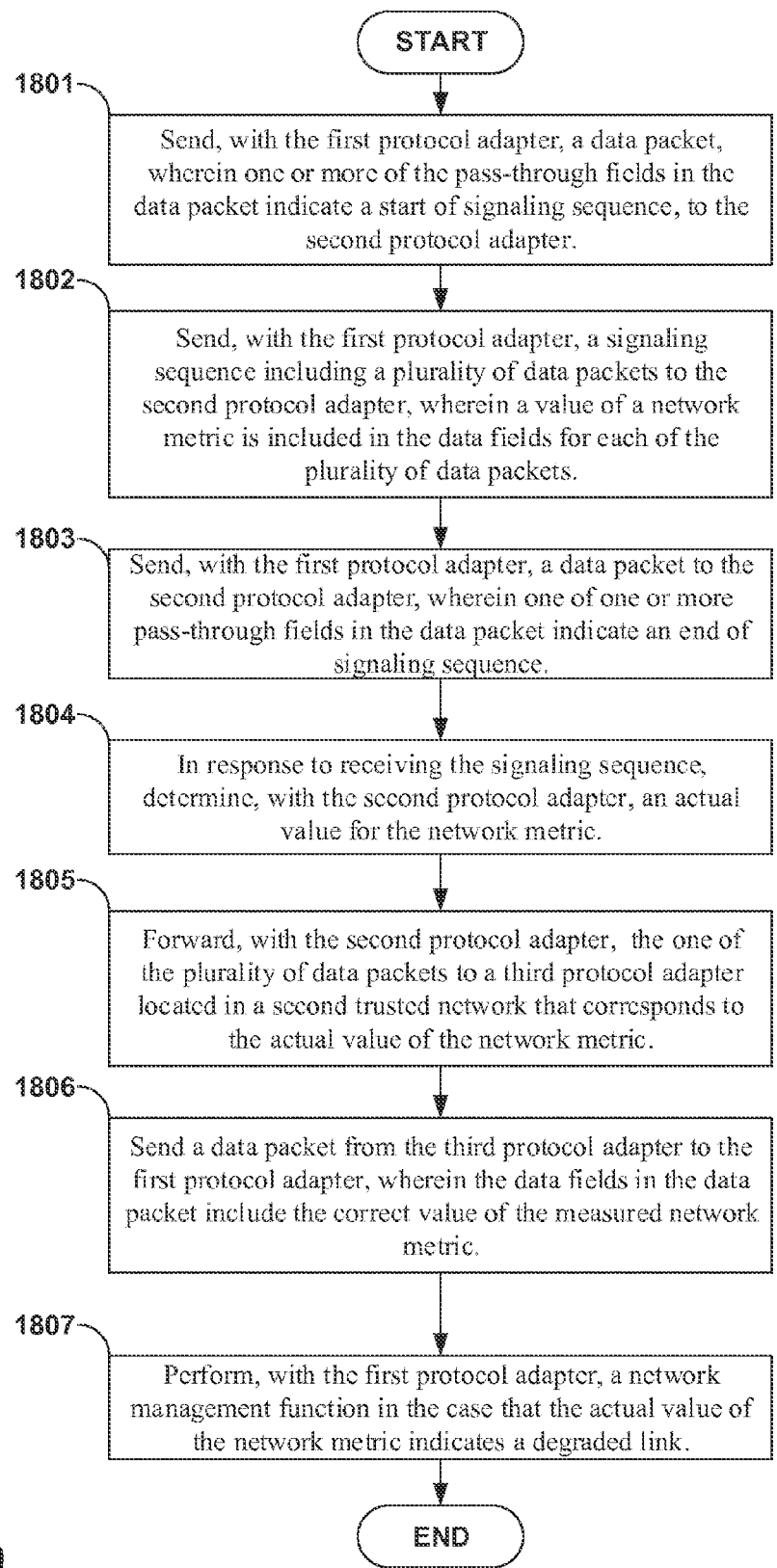
FIG. 19 is a flow diagram illustrating a network sensing proxy function using on-demand signaling.

FIG. 19 is a flow diagram illustrating a network sensing proxy function using on-demand signaling. In step 1801, the first protocol adapter sends a data packet, wherein one or more of the pass-through fields in the data packet indicate a start of sequence indication, to the second protocol adapter. In step 1802, the first protocol adapter sends a data sequence including a plurality of data packets to the second protocol adapter, wherein a value of a network metric is included in the data fields for each of the plurality of data packets. In step 1803, the first protocol adapter sends a data packet, wherein one of one or more pass-through fields in the data packet indicate an end of sequence indication, to the second protocol adapter. In step 1804, the second protocol adapter, in response to receiving the data sequence, determines an actual value for the network metric. In step 1805, the second protocol adapter forwards the one of the plurality of data packets that corresponds to the actual value of the network metric to a third protocol adapter located in a second trusted network. In step 1806, the third protocol adapter echoes back the passed through data packet to the first protocol adapter, wherein the data fields in the data packet include the correct value of the measured network metric. In optional step 1807, the first protocol adapter performs a network management function in the case that the actual value of the network metric indicates a degraded link.

Figure 20:
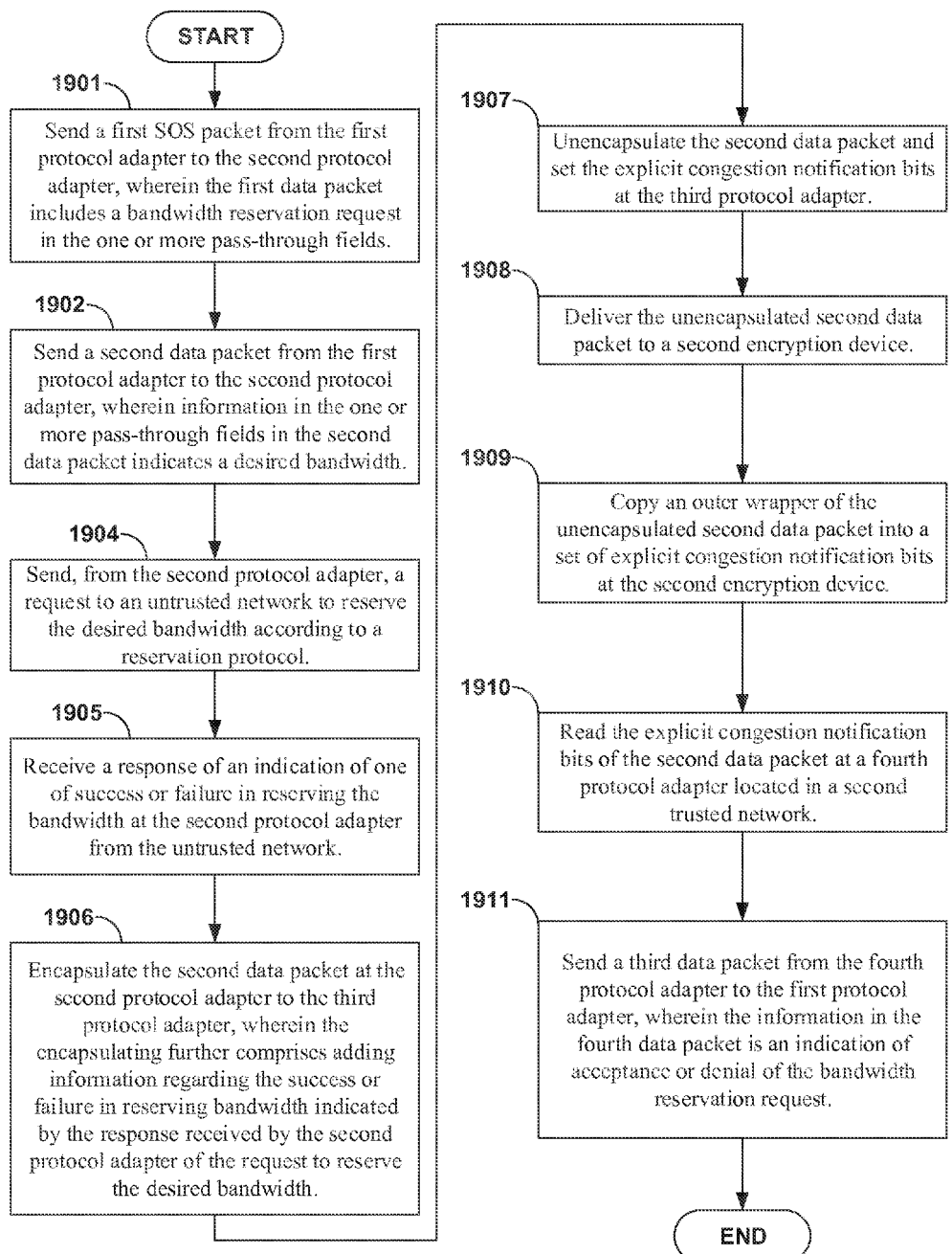
FIG. 20 is a flow diagram illustrating a quality of service proxy function.

FIG. 20 is a flow diagram illustrating a quality of service proxy function. In step 1901, the first protocol adapter sends a first data packet to the second protocol adapter, wherein the first data packet includes a bandwidth reservation request in the one or more pass-through fields. In step 1902, the first protocol adapter sends a second data packet to the second protocol adapter, wherein information in the one or more pass-through fields in the second data packet indicates a desired bandwidth. In step 1904, the second protocol adapter sends a request to an untrusted network to reserve the desired bandwidth according to a reservation protocol. In step 1905, the second protocol adapter receives a response of an indication of one of success or failure in reserving the bandwidth from the untrusted network. In step 1906, the second protocol adapter encapsulates the second data packet to the third protocol adapter, wherein the encapsulating further comprises adding information regarding the success or failure in reserving bandwidth indicated by the response received by the second protocol adapter of the request to reserve the desired bandwidth. In step 1907, the third protocol adapter unencapsulates the second data packet and sets the explicit congestion notification bits in an outer wrapper of the data packet. In step 1908, the third protocol adapter delivers the unencapsulated second data packet to a second INE. In step 1909, the second INE copies an outer wrapper of the unencapsulated second data packet into a set of explicit congestion notification bits at the second INE. In step 1910, a fourth protocol adapter located in a second trusted network reads the explicit congestion notification bits of the data packet. In step 1911, the fourth protocol adapter sends a fourth data packet to the first protocol adapter, wherein the information in the fourth data packet is an indication of acceptance or denial of the bandwidth reservation request.

Figure 21:
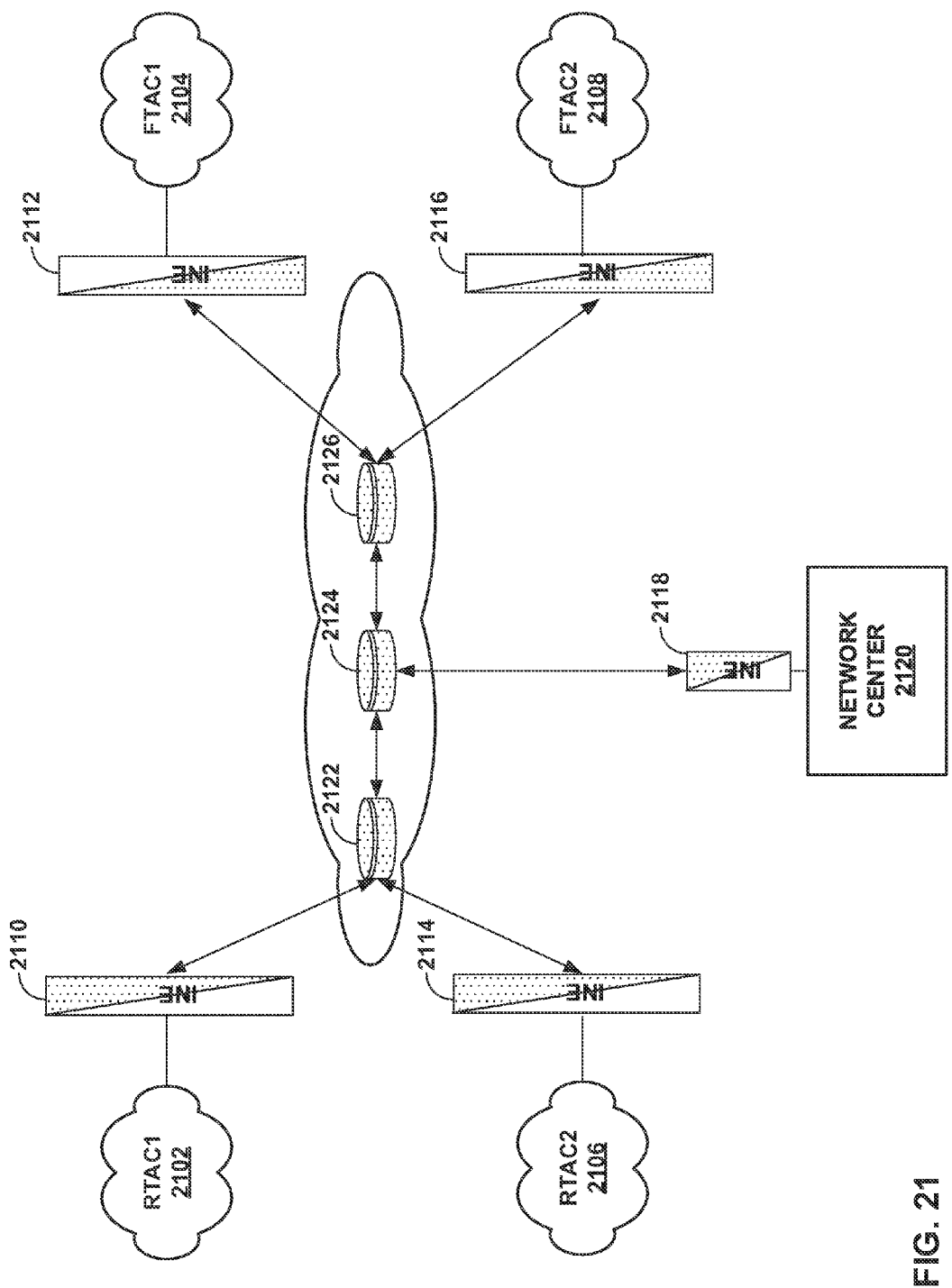
FIG. 21 is a system diagram illustrating an INE based network with multiple domains.

In further accordance with techniques of this disclosure, FIGS. 21-31 describe another performance-enhancing proxy device used in conjunction with the encryption-bypassing messaging techniques described above. FIG. 21 is a system diagram illustrating an INE-based network with multiple domains. FIG. 21 shows four geographically separated network enclaves, i.e., Forward Tactical Network 1 (FTAC1) 2104, Forward Tactical Network 2 (FTAC2) 2108, Rear Tactical Network 1 (RTAC1) 2102, and Rear Tactical Network 2 (RTAC2) 2106, each of which is fronted by an inline network encryptor (INE) 2112, 2116, 2110, and 2114, respectively. In one example, the INEs may be a HAIPE. In one example, assume that FTAC1 2104 and RTAC1 2102 belong to a first security domain and FTAC2 2108 and RTAC2 2106 belong to a second security domain. Interconnecting these enclaves is a shared "black" MANET core consisting of IP routers 2122, 2124, and 2126 that could potentially be resident on aerial platforms implementing an aerial backbone network (e.g., as in a Joint Aerial Layer Network (JALN)) transporting encrypted IPSEC traffic generated by the INEs 2110-2116.

In one example, each forward tactical network 2104 and 2108 may be configured to send one or more of the following IP packet flows to its corresponding rear tactical network, i.e., FTAC1 2104 to RTAC1 2102 and FTAC2 2108 to RTAC2 2106: two real-time full motion video (FMV) streams (e.g., from a surveillance unmanned aerial vehicle (UAV) controlled by that FTAC), time-sequenced images using TCP, e.g., from a UAV imaging sensor, voice over IP (VoIP) flow from FTAC unit commander to RTAC unit commander, and fire control messages (using TCP) from FTAC unit commander to the RTAC unit commander. Also, assume that each FTAC unit commander downloads mission-critical data files when needed from a server on its corresponding rear tactical network. Besides these six mission-critical IP packet flows, each FTAC may also generate other non-critical IP packet flows of different kinds, e.g., VoIP, FMV, chat traffic, web traffic, and/or any other type of traffic. In this example, the black MANET core composed of routers R1, R2, and R3 is an IPv4 network implemented by tactical IP radios.

In the network environment of FIG. 21, the capacity of the tactical links, such as the link between IP routers 2122 and 2124 and the link between IP routers 2124 and 2126, may vary dynamically over time. For example, the capacity of the link connecting 2122 and 2124 (i.e., 2122-2124) may drop significantly so that only a small fraction of the offered traffic flowing from FTAC1 2104 and FTAC2 2108 to RTAC1 2102 and RTAC2 2106 can be transported over the link. In some examples, there may be no explicit prioritization of the traffic flows on the network. In this case, the network congestion at 2124 will result in the traffic flows experiencing significant packet loss, increased delays, and increased jitter. The impact of this congestion event on mission applications varies by the type of traffic flow in the example scenario. Thus, VoIP applications that expect low-loss, low-delay, and low jitter transport of packets will experience severe degradation and will be unable to provide acceptable service to users. Real-time FMV applications that demand low-loss transport will also suffer undesirable, and in some instances unacceptable, degradation in the quality of the delivered video. These applications are termed "inelastic" since they demand a minimum QoS from the network in terms of packet loss, latency, and jitter and cannot gracefully handle any QoS degradation. In contrast, the TCP-based image transfer application is "elastic" in that TCP will automatically sense network congestion and reduce the transmit rate. Thus, although such elastic applications may see a significant decrease in the throughput for data transfer, the image files will get delivered reliably, albeit slowly.

One approach for accommodating IP traffic with different QoS needs is to configure the routers 2122, 2124, and 2126 with separate queues for each of these traffic types or service classes, i.e., VoIP, video, fire control, TCP-based data transfer, etc., along with a queue management policy defining how each queue will be serviced by the router. For instance, for the example above, the routers 2122, 2124, and 2126 may be configured with 4 separate queues (one each for VoIP, FMV, fire control, and image transfer) using a "strict priority" queue servicing discipline with VoIP getting the highest priority followed by FMV, fire control, and image transfer traffic. For this technique to operate correctly, the packets belonging to the different traffic classes are marked with different DSCP values in the IP headers of the packets. Routers 2122, 2124, and 2126 can then classify incoming packets based on their DSCP markings and place them in the appropriate queue.

With such strict priority queuing, VoIP traffic will preferably receive low-loss, low-jitter, and low-latency service assuming the offered load of VoIP traffic is less than the capacity of the output link at the router. Furthermore, the QoS will be less likely to be impacted negatively by the other traffic classes competing for that link. However, excessive VoIP traffic could starve the other traffic classes and unacceptably degrade those mission applications. To help prevent this, upper limits can be placed on the amount of bandwidth that can be used by each of these priority queues. For instance, the VoIP queue may be limited to no more than 30% of the capacity of the output link. However, this may require that admission control be performed at the network entry point for some inelastic traffic flows, i.e., voice and video, to ensure that the network path for the voice or video flow can support the needed bit rate before the traffic is placed on the network. In FIG. 21, routers 2122 and 2126 are the network entry points for the voice and video traffic flows. In addition to performing admission control on a per-flow basis for real-time traffic such as VoIP and FMV, the black network of FIG. 21 may also factor the mission priority of the traffic flow seeking admission. This may be helpful to enable a packet flow with high mission priority to be admitted by pre-empting competing lower priority flow (or flows) that may have been admitted previously.

Example techniques of this disclosure describe a Mission-Based Agile Network Traffic Reprioritization (MANTRA) system. The MANTRA system is designed to accommodate existing IP routers in the black core (e.g., network 103) and the red networks (e.g., networks 101 and 105 of FIG. 22). Using the techniques of this disclosure, an aerial IP network (or other network) may be improved by the capability to shed mission functions in accordance with the intent of the commander when network congestion occurs. Such congestion events are expected to be prevalent in tactical wireless networks because of two major factors: (1) the increasing use of bandwidth-hungry applications, such as FMV; and (2) dynamic changes in the capacity of wireless links, caused by node movement and environmental factors, which could dramatically shrink the available capacity of a link to a small fraction of its advertised maximum.

Prioritization of IP packet flows associated with mission applications (e.g., VoIP, FMV, fire control, chat, web), in accordance with a commander's current mission priorities, will enable the network to preempt or discard packet flows with lower priorities to preserve unimpeded operation of high-priority mission-critical applications, under network congestion events. Since mission priorities may change over time, dynamic or on-the-fly reprioritization of IP packet flows is imperative for aerial IP networks. Also, such traffic reprioritization must be accomplished easily and rapidly (i.e., in an agile manner) by the network command authority, in response to changing mission priorities and needs, without the need to manually configure network elements such as routers. Furthermore, this capability preferably operates in a crypto-partitioned IP network environment. This is accomplished by including priority information in the unencrypted pass-through fields, allowing devices in network 103 to read the priority information and prioritize flows between trusted networks 101 and 105. By including priority information in the pass-through fields, routers and PEP devices in the untrusted network 103 may be able to efficiently and accurately prioritize flows through network 103 without sacrificing security, as devices in network 103 may not be able to read the entirety of the contents of the transferred data packets.

This disclosure also describes a Crypto-Aware Admission (CAC) Protocol that helps ensure that a traffic flow seeking admission into the network is only allowed to proceed if the end-to-end path from source enclave to the destination enclave, which includes the CT side (or black) network path between the enclaves, has the capacity to accommodate that flow. If not, the flow is denied entry at the source. One aspect of the MANTRA CAC protocol is its ability to provide positive acknowledgement for admission of mission-prioritized traffic into a crypto-partitioned network on a per-flow basis.

Figure 22:
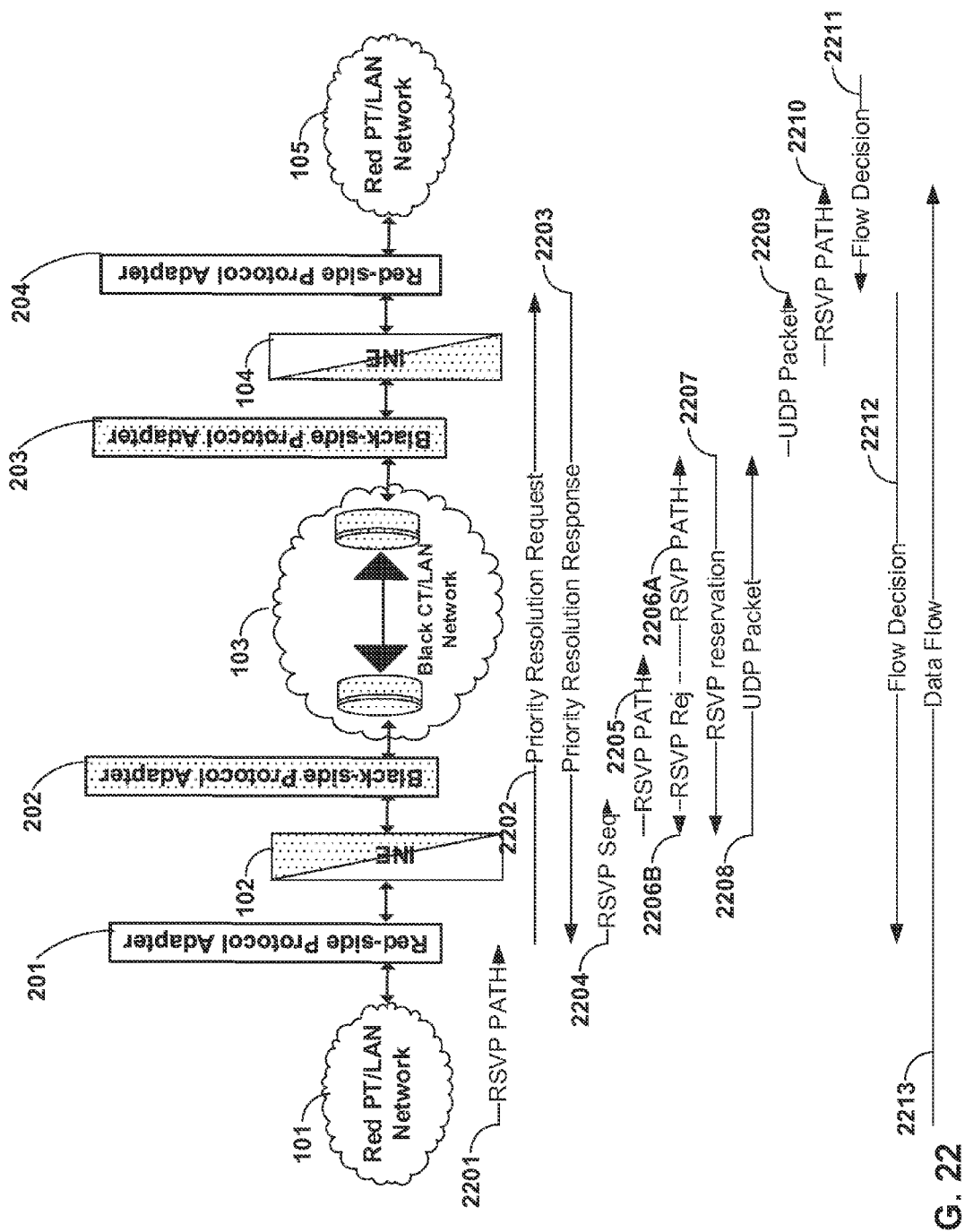
FIG. 22 is a system diagram illustrating an INE-based network with paired protocol adapters configured to implement an end-to-end quality of service admission protocol according to one aspect of this disclosure.

FIG. 22 is a system diagram illustrating an INE-based network with paired protocol adapters configured to implement an end-to-end quality of service admission protocol according to one aspect of this disclosure. The MANTRA red-side protocol adapters 201 and 204 and black-side protocol adapters 202 and 203 may straddle INEs 102 and 104. A data packet may be sent from Red-side protocol adapter 201 to INE 102. INE 102 may be a HAIPE® device or some other sort of IPSEC-based INE. Most of the bits in data packet 106 are encrypted during this process, but some configurations of INE 102 may keep certain bits unencrypted within the header of the packet before the data packet 106 is received by a first Black-side protocol adapter 202 in the Black network 103. These unencrypted bits are pass-through fields.

The first Black-side protocol adapter 202 can read the signaling and/or the data packet, functionally receiving a message from the first Red-side protocol adapter 201. The first Black-side protocol adapter 202 can either process the data packet in order to populate certain fields in the data packet, or it can forward the data packet into Black network 103. Black network 103 then forwards the data packet to a second Black-side protocol adapter 203 located in the Black network 103. Processing the data packet comprises intercepting the data packet and/or inspecting and/or inserting information into the one or more pass-through fields, and/or encapsulating the entire packet and sending it to protocol adapter 203.

The second Black-side protocol adapter 203 can read the one or more pass-through fields in the data packet, functionally receiving a message from the first Red-side protocol adapter 201 or the first Black-side protocol adapter 202. Reading the one or more pass-through fields comprises extracting the inserted information from the one or more pass-through fields. The second Black-side protocol adapter 203 can then either process the data packet in order to populate certain fields in the data packet, or it can forward the data packet to a second INE 104. The second INE 104 may be a HAIPE® device or some other sort of IP-based INE. The second INE 104 may then forward the data packet to a second Red-side protocol adapter 204.

The second Red-side protocol adapter 204 can read the data packet, functionally receiving a message from the first Red-side protocol adapter 201 or the second Black-side protocol adapter 203. The second Red-side protocol adapter 204 can then either process data packet 106 in order to populate certain fields in the data packet, or it can forward the data packet to a second Red network 105, or it can send the packet back to first Red-Side protocol adapter 201, or it can generate a new packet based on the contents of the data packet.

Red-side protocol adapters 201 and 204 and black-side protocol adapters 202 and 203 may be built using the encryption-bypassing messaging functions. Red-side protocol adapters 201 and 204 receive messages from a host device in the respective networks 101 and 105, translate the message using the CAC, defined in more detail below, and send information to black-side protocol adapters 202 and 203 with minimal overhead.

FIG. 22 shows the steps that are taken by protocol adapters implementing the CAC protocols for establishing an end-to-end QoS reservation for a flow using a resource reservation protocol (RSVP) designed to reserve resources across a network for an integrated services Internet. The numbered arrows denote the time-sequence for processing the CAC signaling messages. FIG. 22 shows various network entities associated with admission control for a traffic flow (say a VoIP call) from a host in network 101 to a host in the destination network 105. Interconnecting these two networks 101 and 105 is a multi-hop CT-side network 103 path consisting of transit routers. Networks 101 and 105 are fronted by INEs 102 and 104, respectively. Straddling these INEs are PT-side and CT-side MANTRA agents, i.e., protocol adapter 201, protocol adapter 202, protocol adapter 203, and protocol adapter 204.

A host in network 101 may send signal 2201 that includes an RSVP PATH packet to protocol adapter 201. In some examples, the RSVP PATH packet includes an indication of a path state from the host. The path state may include one or more of the IP address of the host, a sender template to describe the format of the sender data, a sender tspec to describe the traffic characteristics of the data flow, and adspec that carries advertising data. Upon receiving the RSVP PATH message, the protocol adapter 201 determines the mission priority for this traffic flow. Protocol adapter 201 first consults a local Enterprise Policy Service that protocol adapter 201 maintains to determine if flows from the particular host are assigned a default priority. In some examples, the Enterprise Policy Service includes records of information, including priorities, of various networks, hosts, and flows in the system of networks. Sometimes, protocol adapter 201 may resolve the priority of a call only after determining the priority of that flow from the perspective of the destination and then assigning the higher of the priorities of the two end points of the flow. If that is the case, then the priority resolution process of steps 2202 and 2203 are executed. Otherwise, the protocol adapter 201 proceeds to step 2204.

Protocol adapter 201 may send signal 2202 that includes a Priority Resolution Request to protocol adapter 204 with information about the traffic flow (i.e., IP addresses of the host in network 101 and the subscriber in network 105, as well as source and destination port numbers). Upon receiving a Priority Resolution Request for a traffic flow, protocol adapter 204 may look up its local priority registry to determine the priority of this incoming flow and respond to protocol adapter 201 with signal 2203 that includes Priority Resolution Response containing this priority.

After resolving the mission priority of the traffic flow seeking admission, protocol adapter 201 translates the RSVP message into three packets. Protocol adapter 201 may then send signal 2204 including the packets to its paired protocol adapter 202 residing on the black side of INE 102. MANTRA will use the CAPTAIN Signaling Protocol (CSP) described herein to translate RSVP PATH messages across INEs, such as INE 102 and INE 104, by placing the information in the RSVP PATH messages into pass-through fields of other data packets. INEs 102 and 104 can be configured to bypass the TOS/DSCP and ECN bits (8 bits in all) in the header of IPv4 packets, and the Traffic Class (8 bits) and the Flow ID field (20 bits) in the IPv6 packet header.

RSVP translation protocol consists of protocol adapter 201 sending signals that include a sequence of packets to its peer protocol adapter 202. The first packet may be an IPv6 packet sent to a reserved PT-side multicast address that is mapped to a reserved CT multicast address using INE security associations. This multicast address will be referred to as the RBMC (Red-Black Multicast Address). The first packet indicates the type of signal in the traffic class bits, with optional additional information in the Flow Label. For a multiple-frame signaling sequence consisting of a variable number of packets, IPv6 packets that follow the initial packets are marked as data packets in their traffic class bits while IPv4 packets are marked as data in their TOS bits. The CSP packets are consumed by protocol adapter 202 and do not get propagated further in network 103.

To enable protocol adapter 202 to construct the RSVP PATH message, the protocol adapter 201 may pass the message's flow bandwidth and flow priority to protocol adapter 202 via pass-through fields of other data packets. Also, protocol adapter 202 may determine the message's corresponding source and destination addresses in network 103 using the pass-through fields, which will correspond to the flow address in network 103.

For each RSVP PATH message, protocol adapter 201 generates two data packets and modifies the RSVP PATH message to be a data packet. The first packet holds the DSCP label that will identify the flow's packets, the flow priority, and the original DSCP value, as formatted in FIG. 24A. The second packet holds the flow bandwidth in KBps (see FIG. 24B). The source address of the second packet will be set to the RSVP path message's source address in network 101. INE 102 translates the second packet source address to its corresponding black address, thus enabling protocol adapter 202 to identify the flow's source address in network 103. The third packet is the original RSVP PATH message with its DSCP bits set to a fixed DATA Packet type (0x3F) to indicate that the packet is part of the CSP signaling sequence, as in FIG. 24C. Also, the destination address of the last packet will be set to the RSVP path message's destination address in network 105. INE 102 will translate the last packet destination address to its corresponding black address, thus enabling protocol adapter 202 to identify the flow's destination address in network 103. Protocol adapter 202 will interpret all three packets to get the flows DSCP labeling, the original value of the DSCP bits, and the bandwidth of the data that is desired. Future packets for that flow will be identified by the DSCP bit markings and their source and destination addresses.

After receiving the signaling packets from protocol adapter 201, protocol adapter 202 composes an RSVP PATH message in network 103 using the information in the three packets received from protocol adapter 201. Protocol adapter 202 may send signal 2205, which includes an RSVP PATH message, towards INE 104 with the parameters of the traffic flow seeking admission. When an intermediate Transit Router (TR) in network 103 receives this request, it forwards the RSVP PATH message towards protocol adapter 203 via signal 2206A if bandwidth is available. If not, the TR may send signal 2206B, which includes a RSVP Rejection back, towards Protocol adapter 202.

If all transit routers in network 103 on the PATH from protocol adapter 202 to protocol adapter 203 are able to admit the flow, and the RSVP-PATH message is received by protocol adapter 203, protocol adapter 203 may then send signal 2207, which may include a RSVP reservation message, towards protocol adapter 202.

When protocol adapter 202 receives the RSVP reservation message, protocol adapter 202 encapsulates the third signaling packet received from protocol adapter 201 (in signal 2204) within a user diagram protocol (UDP) packet addressed to protocol adapter 203. Protocol adapter 202 sets the ECN bits in the header of the encapsulated packet to 00 if the Flow Setup Confirmation was received for that flow. Conversely, protocol adapter 202 sets these ECN bits to 11 if a Flow Setup Rejection was received instead. Protocol adapter 202 then transmits the UDP packet (encompassing the encapsulated RSVP packet) via signal 2208 to protocol adapter 203.

When protocol adapter 203 receives the UDP packet from protocol adapter 202, protocol adapter 203 de-capsulates the UDP packet and sends the original encrypted RSVP packet, with the ECN bits set by protocol adapter 202, to INE 104 via signal 2209. INE 104 decrypts the packet, copying the ECN bits into the header of the decrypted packet that is then presented to protocol adapter 204.

Protocol adapter 204 examines the ECN bits on the packet that it receives from INE 104, which is the RSVP path messaged that was received by the protocol adapter 204. If the ECN bits are 00, protocol adapter 204 forwards the PATH message towards the subscriber in network 105 via signal 2210. If the PATH message succeeds in reserving network resource of the flow, protocol adapter 204 sends back to protocol adapter 201 the reservation message generated by the subscriber in network 105 indicating that the flow is admissible via signals 2211 (between network 105 and protocol adapter 204) and 2212 (between protocol adapter 204 and protocol adapter 201). If the ECN bits were set to 11 or the RSVP PATH message fails, protocol adapter 204 generates a PATH Error or RESV Error message indicating that the flow admission request for this flow has been rejected, and sends the error back towards protocol adapter 201 via signal 2212.

After receiving a definitive acknowledgement of the success or failure of the admission control request for the traffic flow (i.e., positive acknowledgement based flow admission), protocol adapter 201 will either deny or allow the data flow associated with the mission traffic to proceed through the tunnel, or squelch it at the source. The choice in what to do with the data may be a configuration option. If the data flow is allowed, protocol adapter 201 may forward the data flow to the subscriber device in network 105 via signal 2213.

For simplicity of exposition, the CAC protocol description above focused on the path from the edge of network 101 to the edge of network 105. The protocol, however, may further work end-to-end from the source host in network 101 to the destination subscriber in network 105 with admission control performed on any intermediate red routers in these enclaves.

Figure 23:
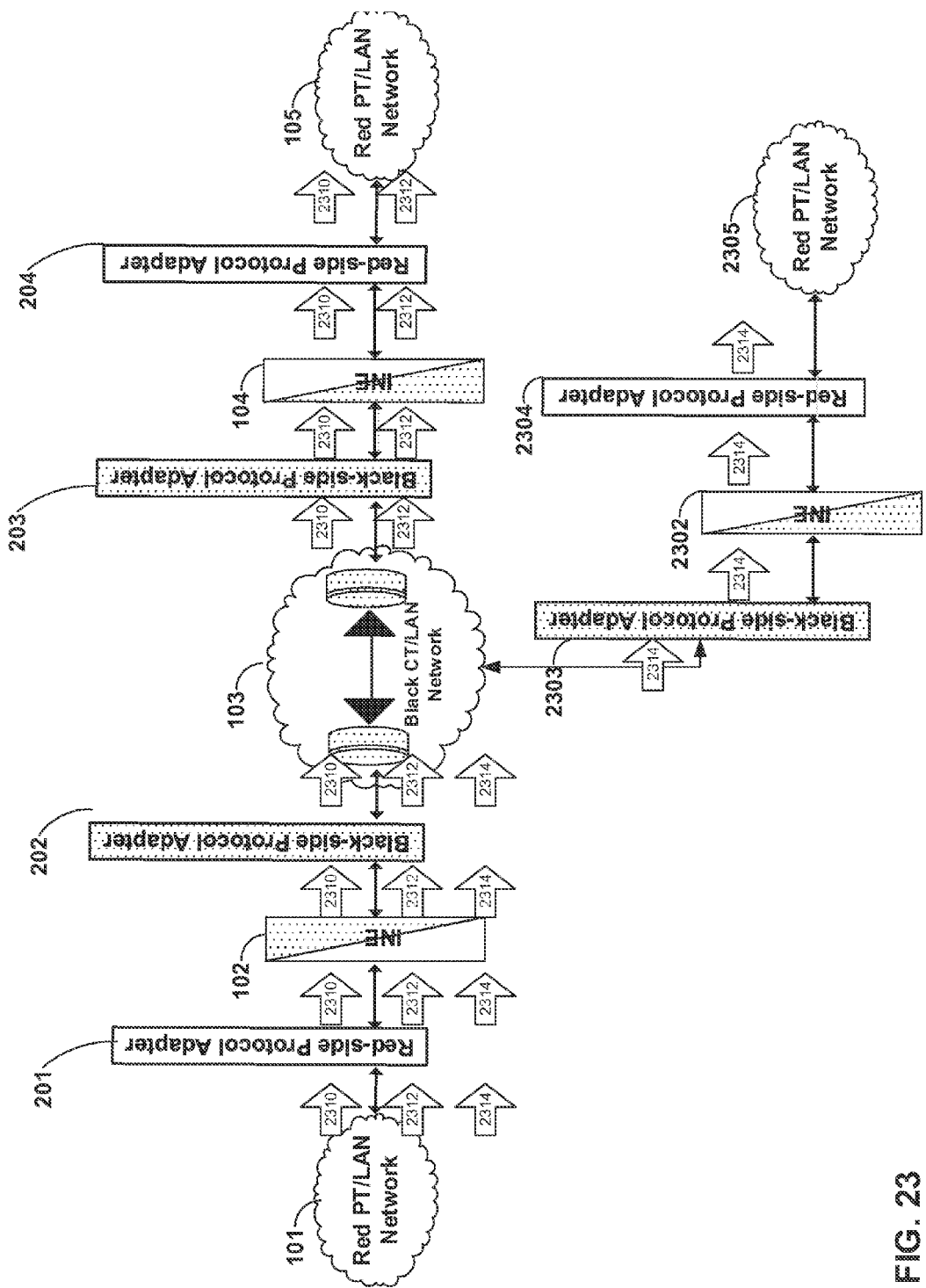
FIG. 23 is a system diagram illustrating an INE-based network with paired protocol adapters configured to conduct end-to-end address mapping according to one aspect of this disclosure.

FIG. 23 is a system diagram illustrating an INE-based network with paired protocol adapters configured to conduct end-to-end address mapping according to one aspect of this disclosure. Each security enclave will establish an IPSEC tunnel with its peer. The tunnel will have a fixed source and destination address. For instance, in the example of FIG. 23, flows 2310, 2312, and 2314 originating in network 101 will be transported to peer networks 105 and 2305 via an established IPsec tunnel in network 103, thus flows 2310 and 2312 will have the same source and destination address.

Techniques of this disclosure allow protocol adapters, such as protocol adapters 201-204, to distinguish between flows that belong to a tunnel by their packet DSCP values, as described below. For each tunnel, network 103 will be able to provide QoS reservations for multiple flows, such as up to 63 flows, concurrently. If the number of flows between two peers exceeds 63, the remaining flows will be supported based on best-effort. Network 103 may give preference for higher priority flows over low priority flows. Thus the 63 DSCP values may be assigned to the higher priority flows.

Protocol adapter 201 may assign each flow 2310-2314 a unique DSCP value. The new DSCP value is sent as part of the RSVP Translation Mechanism, described above with respect to step 2204 of FIG. 22. Protocol adapter 202 may map the flow's DSCP value to a new label (e.g., source, destination and port numbers), which is used to route and allocate QoS resources to the flow in network 103. Also, protocol adapter 202 may assign each flow 2310-2314 its original DSCP value (i.e., the value assigned in network 101).

FIG. 23 shows a representative example of the operations of the CAC address mapping mechanism. In FIG. 23, network 101 establishes a first IPsec tunnel to network 105 and establishes a second IPsec tunnel to network 2305. Three flows are initiated from network 101, i.e. flow 2310, flow 2312, and flow 2314. Protocol adapter 201 may assign flow 2310 DSCP value 20, flow 2312 DSCP value 30 and flow 2314 DSCP value 30. INE 102 tunnels flows 2310 and 2312 via the first IPsec tunnel to network 105 and flow 2314 via the second IPsec tunnel to network 2305. Three distinct RSVP Translations may be initiated by protocol adapter 201. Protocol adapter 202 may be able to distinguish the three flows 2310, 2312, and 2314 based on their Tunnel labels and DSCP values. Protocol adapter 202 may assign each flow 2310, 2312, and 2314 a unique routable address, thus enabling the routers in network 103 to assign a QoS resource to each individual flow by initializing the flow with a data packet that contains the QoS resource in the pass-through field of the data packet. Protocol adapter 202 may also assign each flow 2310, 2312, and 2314 its original DSCP values. In FIG. 23, protocol adapter 201 may assign flow 2310 source address B1 and DSCP 11, flow 2312 source address B2 and DSCP 8, and flow 2314 source address B3 and DSCP 30. When protocol adapter 202 uses RSVP to allocate resources to flows 2310, 2312, and 2314, protocol adapter 202 may use their network 103 addresses (i.e., B1, B2 and B3) in the RSVP PATH and RESV messages inserted in pass-through fields of data packets. When the packets belonging to flows 2310, 2312, and 2314 reach their destination enclaves (i.e., network 105 and 2305), protocol adapters 203 and 2303 may use network address translations (NATs) to map flows 2310, 2312, and 2314 network 103 addresses to their original tunnel addresses. Protocol adapter 203 may map B1 and B2 label to T1 label, and protocol adapter 2303 may map B3 label to T2 label. INEs 104 and 2302 may decrypt the packets, resulting in their original labels.

Multicast flow handling is an extrapolation of unicast routing. The flows may still be assigned labels and priorities. RSVP PATH messages will go towards all the current, registered receivers. RSVP merges all the RESV messages coming back from multiple receivers that subscribe to the multicast group by taking the maximum value requested.

For asymmetric route handling, RSVP RESV messages are sent from the receiver towards the previous-hop PATH messages. Asymmetric routing should not be an issue, since the return path follows the original sender's path. The route and tunnels are all soft-state, meaning they need to be kept current. If the route does change, the original routes will time-out after a short period and the new routes will be generated, using the same admission control as for the original routes.

FIGS. 24A-24C are conceptual diagrams showing the bit address of different fields in an end-to-end quality of service admission protocol and data packets sent over the INE devices according to one aspect of this disclosure. For each RSVP PATH message, protocol adapter 201 generates two IPv6 packets and modifies the RSVP PATH message to be a data packet. The first packet holds the DSCP label that will identify the flow's packets 2404, the flow priority 2406, and the original DSCP value 2408, as formatted in FIG. 24A. The second packet holds the flow bandwidth in KBps 2414 (see FIG. 24B). The source address of the second packet will be set to the RSVP path message's source address in network 101. INE 102 translates the second packet source address to its corresponding black address, thus enabling protocol adapter 202 to identify the flow's source address in network 103. The third packet is the original RSVP PATH message with its DSCP bits set to a fixed DATA Packet type 2422 (0x3F) to indicate that the packet is part of the CSP signaling sequence, as in FIG. 24C. Also, the destination address of the last packet will be set to the RSVP path message's destination address in network 105. INE 102 will translate the last packet destination address to its corresponding black address, thus enabling protocol adapter 202 to identify the flow's destination address in network 103. Protocol adapter 202 will interpret all three packets to get the flows DSCP labeling, the original value of the DSCP bits, and the bandwidth of the data that is desired. Future packets for that flow will be identified by the DSCP bit markings and their source and destination addresses.

Figure 25:
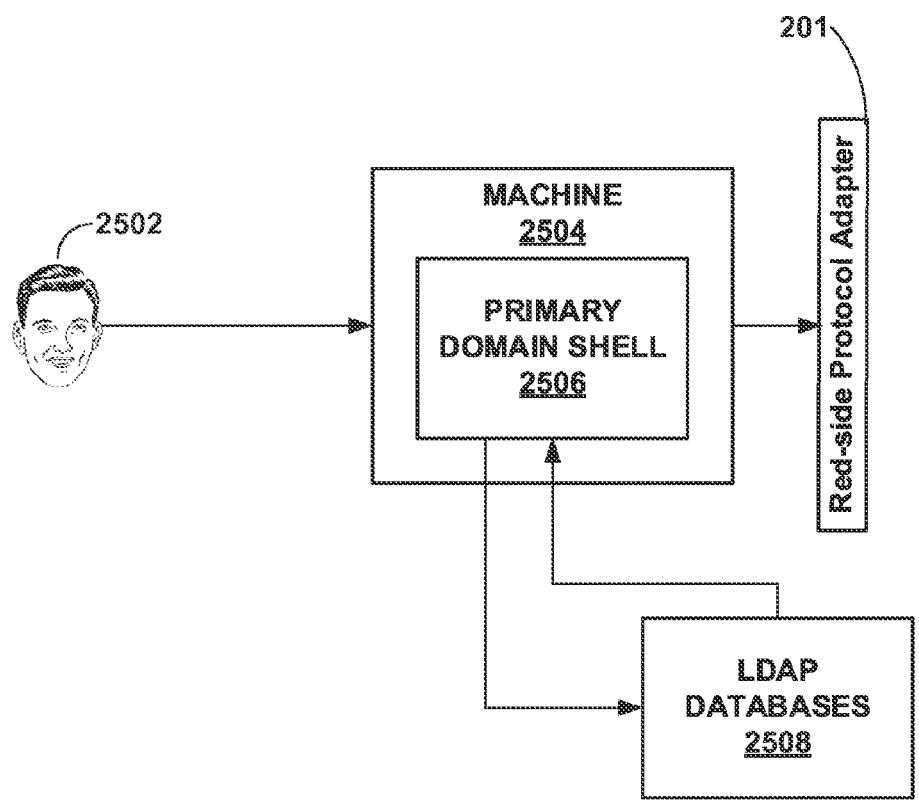
FIG. 25 is a system diagram illustrating a single sign-on example of an end-to-end quality of service admission protocol in an INE-based network according to one aspect of this disclosure.

FIG. 25 is a system diagram illustrating a single sign-on example of an end-to-end quality of service admission protocol in an INE-based network according to one aspect of this disclosure. The techniques of this disclosure may support two types of mission authentication: user-level authentication and machine-level authentication. In both cases, it may be assumed that an Enterprise Policy Service that holds the users and machines roles is available. The below table shows examples of Enterprise Policy Service records:

| Type | ID | Role | Flow type | Direction | Source Port | Destination Port | Priority |
| --- | --- | --- | --- | --- | --- | --- | --- |
| Machine | "10.10.10.20" | UAV | Video | Ingress | 1020 | 5000 | 1 |
| User | Certificate | Unit1 Commander | VOIP | Ingress | 6020 | * | 2 |
| User | Certificate | Unit2 Commander | VOIP | Egress | * | 7766 | 1 |

In the case of user-level authentication, when user 2502 logs into machine 2504, user 2502 will authenticate with its domain in a red-side network. As a result, protocol adapter 201 will be able to map user 2502's machine IP address to its mission role. Protocol adapter 201 will associate the flows that are originated from machine 2504 or that are destined to machine 2504 with the user 2502's mission role.

A Single Sign-On (SSO) service could be utilized to automatically authenticate user 2502 with its domain in the red-side network. This is typically achieved using the Lightweight Directory Access Protocol (LDAP) and stored LDAP databases 2508 on servers. Several proprietary and open source SSO services are available, such as Active Directory and Central Authentication Service (CAS).

FIG. 25 depicts an example of user 2502 registering with its domain via a SSO service. User 2502 authenticates himself/herself to machine 2504 using his/her primary credentials (e.g. password). After user 2502 is authenticated, machine 2504 requests user 2502's secondary credentials from LDAP databases 2508. Then machine 2504, using user 2502's secondary credentials, registers user 2502 with its domain. As a result of this process, the domain is able to map the machine IP address to user 2502. Next, the domain determines user 2502's mission role by consulting its Enterprise Policy Service. In the case of machine-level authentication, the domain will consult the Enterprise Policy Service to directly map a flow to its mission role.

The SSO service utilized is responsible for user 2502 and machine 2504 authentication. No changes to user machines may occur to facilitate the SSO service. A system administrator may modify the secondary credentials on the LDAP server, indicating to which applications the certificates apply. Example user policy records are shown below:

| Type | ID | Role | Flow type | Direction | Source Port | Destination Port | Priority |
|---|---|---|---|---|---|---|---|
| User | Certificate | Unit1 Commander | VOIP | Ingress | 6020 | * | 2 |
| User | Certificate | Unit2 Commander | VOIP | Egress | * | 7766 | 1 |

To enable MANTRA to function efficiently in a tactical environment, the communications protocol between the MANTRA manager and the MRE components may be built on top of UDP. The MANTRA manager may utilize a reliable transport protocol on top of UDP to send commands and inquiries to the routers. The protocol may include packet sequence numbers to guarantee order and reliable delivery of packets. The MRE components may send status messages to the MANTRA manager using best-effort UDP packets.

If UDP streaming is allowed by a cross-domain guard or a filter mechanism, the messages between the MANTRA manager and the routers will be exchanged directly; otherwise XML files will be used to exchange commands and information across the INE. In order to get messages across the INE, when UDP streaming is not allowed, the MANTRA Manager may convert its messages into a predefined XML format, which matches the XML Schema that has been approved for the INE filter. The MANTRA Manager will utilize a file transfer protocol (ftp) to transfer the XML files across the INE to its Manager agent. The Manager agent may translate the XML files to their corresponding messages and send them to their destination routers. Router messages may be translated by the Manager agent into XML files and passed to the MANTRA Manager via the INE.

Figure 27:
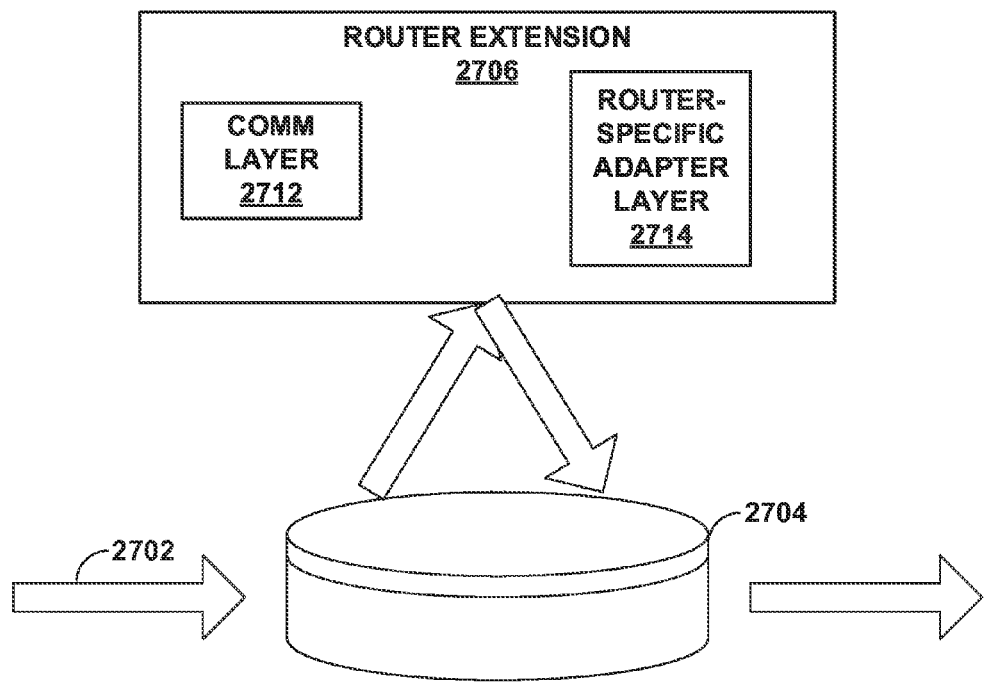
FIG. 27 is a system diagram illustrating a router extension for an INE-based network configured to conduct end-to-end address mapping according to one aspect of this disclosure.

FIG. 27 is a system diagram illustrating a router extension for an INE-based network configured to conduct end-to-end address mapping according to one aspect of this disclosure. MANTRA router extension (MRE) 2706 may add an additional level of intelligence to the MANTRA dynamic admission control by processing RSVP signaling messages 2702 ahead of router 2704. Router 2704 can be configured to forward RSVP messages 2702 to MRE component 2706 before processing them. MRE 2706 may process the messages then release them to router 2704, as depicted in FIG. 27. MRE 2706 may implement RSVP using Linux traffic control (tc) commands. The "tc" commands will enable MRE 2706 to allocate network resources to flows based on their priorities.

In utilizing techniques described herein, each router 2704 in an intermediate black network may be configured with MRE 2706. The MRE may include two software components: a communications layer 2712 and a router-specific adapter layer 2714. The communications layer 2712 may be responsible for receiving configuration and inquiry commands from the MANTRA manager and sending flows' information to the central graphical user interface. Adapter layer 2714 may translate the MANTRA manager commands into router-specific commands. This approach will enable the MANTRA manager to use router-agnostic commands that can easily be used and understood by network operators.

MRE 2706 may also enhance and refine a router's implementation of RSVP to match tactical environment requirements. In some routers, RSVP traffic is allocated to a single tunnel within router 2704, which may be shared equally among all classes of traffic (i.e., voice, video, and data). This approach may result is traffic starvation, where one traffic class might starve out other traffic competing for the RSVP tunnel resources. For example, excessive VoIP traffic could easily starve the other traffic classes and unacceptably degrade their mission applications. To prevent this, upper limits can be placed on the amount of bandwidth that can be used by each of the three traffic classes. For instance, the VoIP queue may be limited to no more that 30% of the capacity of the output link.

When MRE 2706 receives a Path message for a certain traffic class, MRE 2706 checks to see if the percentage allocated to the class can support the request. If so, the Path message is released to router 2704 for processing. If the percentage allocated to the class cannot meet the Path message bandwidth request, MRE 2706 may check to see if lower priority flows that belong to the same class can be removed to allow the Path message to be admitted. If so, MRE 2706 starts a process to remove the lower priority flows and releases the Path message to router 2704 for processing. Otherwise, MRE 2706 rejects the Path message.

Figure 28:
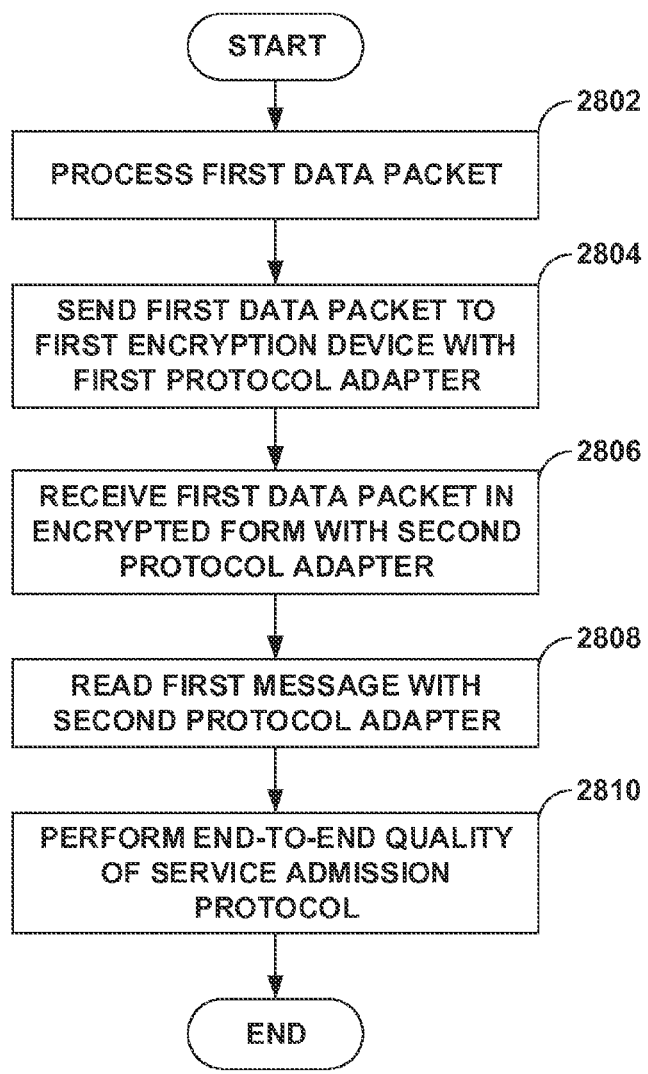
FIG. 28 is a flow diagram illustrating an end-to-end quality of service admission protocol according to one aspect of this disclosure.

FIG. 28 is a flow diagram illustrating an end-to-end quality of service admission protocol according to one aspect of this disclosure. For the purposes of illustration only, reference will be made to FIG. 22 in representing structures that may perform various acts described in the flow diagram of FIG. 28.

In accordance with techniques of the current disclosure, a first protocol adapter (e.g., protocol adapter 201) positioned within a first network (e.g., network 101) may process a first data packet to insert a first message within a set of one or more pass-through fields of the first packet (2802). Network 101 is separated from a second network (e.g., network 105) by a first encryption device (e.g., INE 102) and a second encryption device (e.g., INE 104) that securely communicate packets through an intermediate network (e.g., network 103) in encrypted form. The one or more pass-through fields may be located in a portion of the first data packet that remains unencrypted when the data packet is processed by INE 102.

In some examples, protocol adapter 201 may receive an indication of a path state from a client device in network 101. In such examples, protocol adapter 201 may determine an initial mission priority for the traffic flow originating from the client device based at least in part on the indication of the path state. In some examples, the first message may include the initial mission priority associated with the traffic flow originating from the client device in network 101.

Protocol adapter 201 may send the first data packet to INE 102 (2804). A second protocol adapter (e.g., protocol adapter 202) positioned within network 103 and between INE 102 and INE 104 may receive the first data packet in encrypted form (2806). Protocol adapter 202 may read the first message from the set of one or more pass-through fields (2808).

Protocol adapter 202 may perform, responsive to the first message, an end-to-end quality of service admission protocol (2810). In some examples, the end-to-end quality of service admission protocol may include protocol adapter 202 determining an available bandwidth in network 103 and a bandwidth of the traffic flow. Protocol adapter 202 may compare the available bandwidth in network 103 with the bandwidth of the traffic flow.

Responsive to the available bandwidth in network 103 being greater than or equal to the bandwidth of the traffic flow, protocol adapter 201 may determine whether to allow or deny the traffic flow from the client device to a subscriber device in network 105. Responsive to determining to allow the traffic flow, protocol adapter 201 may forward the traffic flow to the subscriber device. Alternatively, responsive to determining to deny the traffic flow, protocol adapter 201 may prohibit the forwarding of the traffic flow outside of protocol adapter 201. In some examples, determining whether to allow or deny the traffic flow from the client device to the subscriber device may be based at least in part on a configuration option of protocol adapter 201.

In some further instances, responsive to the available bandwidth in network 103 being greater than or equal to the bandwidth of the traffic flow, protocol adapter 202 may receive an indication of a bandwidth reservation from a transit router in network 103. In such instances, protocol adapter 202 may encapsulate a second data packet. A second message in a set of one or more pass-through fields of the second data packet may include a path state of the client device in network 101. Protocol adapter 202 may further set the second message of the encapsulated second data packet to further indicate a non-explicit-congestion-notification-capable transport status of the traffic flow. Protocol adapter 202 may send the encapsulated second data packet to a third protocol adapter (e.g., protocol adapter 203) in network 103. Protocol adapter 203 may decapsulate the encapsulated second data packet. Protocol adapter 203 may send the decapsulated second data packet to INE 104. A fourth protocol adapter (e.g., protocol adapter 204) in network 105 may receive the second data packet from INE 104. Protocol adapter 204 may further receive a third data packet from INE 104. The third data packet may include a third message within a set of one or more pass-through fields of the third data packet, with the third message including parameters of the traffic flow. Protocol adapter 204 may forward the third data packet to the subscriber device in network 105. Protocol adapter 201 may then receive an indication of successful admission of the traffic flow into network 105 from protocol adapter 204.

Alternatively, responsive to the available bandwidth in network 103 being less than the bandwidth of the traffic flow, protocol adapter 201 may prohibit the forwarding of the traffic flow outside of protocol adapter 201. Further, in some instances, protocol adapter 202 may receive a rejection message from the transit router. Protocol adapter 202 may encapsulate a second data packet. A second message in a set of one or more pass-through fields of the second data packet may include a path state of the client device in network 101. Protocol adapter 202 may further set the second message of the encapsulated second data packet to further indicate a non-explicit-congestion-notification-capable transport status of the traffic flow. Protocol adapter 202 may send the encapsulated second data packet to a protocol adapter 203 in network 103. Protocol adapter 203 may decapsulate the encapsulated second data packet. Protocol adapter 203 may send the decapsulated second data packet to INE 104. Protocol adapter 204 in network 105 may receive the second data packet from INE 104. Protocol adapter 204 may further receive a third data packet from INE 104. The third data packet may include a third message within a set of one or more pass-through fields of the third data packet, with the third message including parameters of the traffic flow. Protocol adapter 204 may forward the third data packet to the subscriber device in network 105. Protocol adapter 201 may then receive an indication of failed admission of the traffic flow into network 105 from protocol adapter 204.

In some instances, prior to determining the available bandwidth, protocol adapter 202 may forward the first data packet to INE 104. In such instances, protocol adapter 204 may receive the first data packet from INE 104. Protocol adapter 204 may use a local priority registry. Protocol adapter 204 may then process a second data packet to insert a second message within a set of one or more pass-through fields of the second data packet, with the second message including the local priority registry. Protocol adapter 204 may send the second data packet to protocol adapter 201 via INEs 104 and 102. Protocol adapter 201 may determine a final mission priority for the traffic flow based at least in part on the initial mission priority and the local priority registry contained in the second message.

In such instances, protocol adapter 201 may further process a third data packet to insert a third message within a set of one or more pass-through fields of the third data packet, wherein the third message includes a mapping to a reserved multicast address in protocol adapter 202. Protocol adapter 201 may also process, a fourth data packet to insert a fourth message within a set of one or more pass-through fields of the fourth data packet, wherein the fourth message includes a bandwidth for the traffic flow. Finally, protocol adapter 201 may process a fifth, data packet to insert a fifth message within a set of one or more pass-through fields of the fifth data packet, wherein the fifth message includes the path state of the client device in network 101. Once these data packets are processed, protocol adapter 201 may send the third, fourth, and fifth data packets to protocol adapter 202. Responsive to receiving these data packets, protocol adapter 202 may process a sixth data packet to insert a sixth message within a set of one or more pass-through fields of the sixth data packet, wherein the sixth message includes parameters of the traffic flow. The parameters of the traffic flow may include the information contained in the third, fourth, and fifth data packets. Protocol adapter 202 may send the sixth data packet to INE 104.

Figure 29:
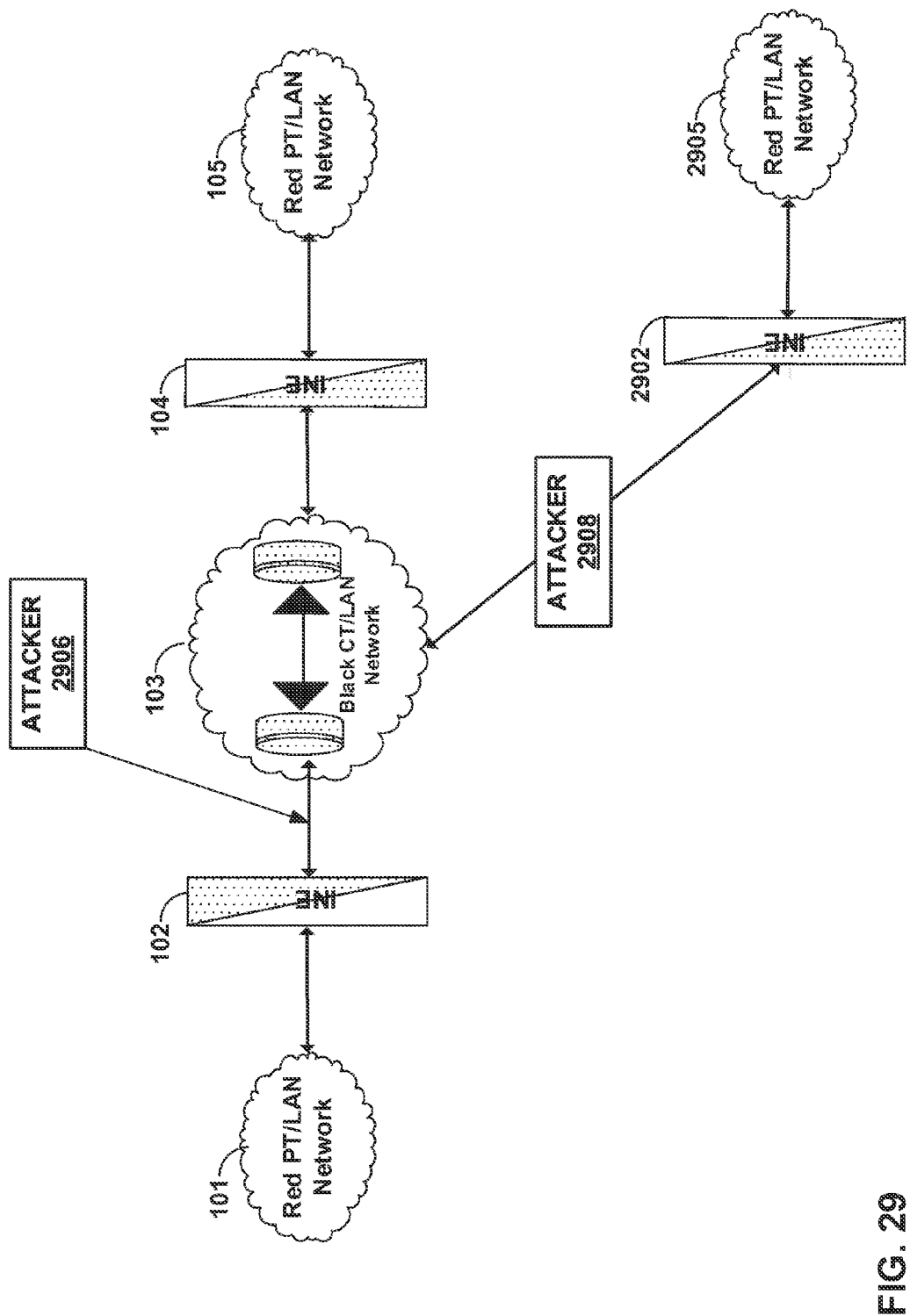
FIG. 29 is a system diagram illustrating an INE-based network with multiple domains receiving a multicast traffic flow that is subjected to a replay attack.

FIG. 29 is a system diagram illustrating an INE-based network with multiple domains receiving a multicast traffic flow that is subjected to a replay attack. INEs based on the HAIPE Interoperability Specification are widely used within tactical and strategic networks to protect classified information as it travels over an untrusted network (e.g., network 103) from a classified source enclave (e.g., network 101) to one or more destination enclaves (e.g., network 105). Employing Internet Protocol Security (IPSEC), these INEs implement secure point-to-point (unicast) and point-to-multipoint (multicast) VPNs interconnecting the classified enclaves over an unclassified (or lower classification level) network 103. HAIPE-protected classified network enclaves are susceptible to IP multicast packet replay attacks, a type of volumetric denial-of-service (DoS) attack that can evade traditional network intrusion detection systems to degrade and disrupt mission applications running within the victim enclaves. Furthermore, a software-based network appliance for rapidly detecting the onset of these DoS attacks and mitigating their impact on the mission may be described herein. Running on hardware connected to the red and black Ethernet interfaces of each INE 102 and 104, techniques of this disclosure may enable a transparent bridge designed to protect the enclave from multicast replay attacks. This will enable the DoD to promulgate a critical network defense mechanism for INEs to support the increasing use of IP multicast applications within military tactical networks.

In the example tactical network of FIG. 29, a cipher text (CT) (i.e., black) wide-area backbone network 103 interconnects three INE-fronted classified tactical enclaves or sites (i.e., networks 101, 105, and 2905). Each of these three classified plain-text (PT) networks 101, 105, and 2905 may be a tactical wideband IP radio network (e.g., soldier radio waveform (SRW), adaptive networking wideband waveform (ANW2), tactical targeting network technology (TTNT), wideband networking waveform (WNW)) employing link-layer encryption provided by the radios for COMSEC within the enclaves. Thus, INEs 102, 104, and 2902 fronting respective networks 101, 105, and 2905 implement IPSEC-based VPN tunnels interconnecting these sites over network 103. The capacity of network 103 may be an order of magnitude greater than that of networks 101, 105, and 2905, e.g., tens of megabits per second capacity for network 103 versus a few megabits per second for each of networks 101, 105, and 2905. Further, network 103 may use a multicast routing protocol, such as Protocol Independent Multicast (PIM), to route multicast IP packets from a sender INE and to subscriber INEs for a CT multicast group address.

Plain text unicast IP packets sent by a mission application in network 105 to a destination in network 101 may be encrypted by INE 104 using the IPSEC tunnel-mode Encapsulating Security Payload (ESP) mechanism. The resulting cipher text packets may then be routed over network 103 to INE 102. INE 102 decrypts the packets, verifying their integrity in the process. INE 102 may further use the packet sequence number embedded within the encrypted ESP payload of the packets to detect any replayed unicast packets received from network 103. Packets that fail the integrity check as well as replayed packets may be dropped by INE 102, while valid decrypted packets may be passed on to network 101.

Consider a many-to-many multicast mission application, such as video/audio conferencing or text chat, running on all three of networks 101, 105, and 2905 of FIG. 29. For plain text multicast IP packets sent by the application in network 105, subscribers to this multicast packet stream may reside in networks 101 and 2905. In this case, INE 104 encrypts the plain text multicast IP packets received on its red side Ethernet interface in network 105, and multicasts the encrypted packets over network 103 where they are routed to INE 102 and INE 2902, which are subscribed to the multicast group address for the application. Similar to the unicast case, INE 102 and INE 2902 may decrypt the received packets and pass on valid packets to their respective networks 101 and 2905. Cipher text packets received by INE 102 and INE 2905 that fail the integrity check may be similarly discarded by the INEs 102 and 2905. However, unlike the unicast case, replayed cipher text multicast packets received from network 103 by INEs 102 and 2902 are processed normally, decrypted, and passed on unimpeded to networks 101 and 2905 behind INEs 102 and 2902.

This security hole in IPSEC multicast can be exploited by outsider attacker 2906 sitting on the unprotected and untrusted network 103 to carry out a packet flooding DoS attack on multicast applications using replayed multicast packets that can infiltrate the classified red side network 101 behind INE 102. Some red side applications within network 101 may have built-in mechanisms to identify and discard duplicate packets (e.g., RTP based multimedia applications). Nevertheless, a volumetric flood of such attacks packets could clog the bandwidth-constrained network 101 and disrupt mission applications running on network 101. Furthermore, this packet flood would also clog the black side access link connecting network 101 to network 103. Finally, this attack vector could be particularly insidious for red side applications that process duplicate packets erroneously.

To launch a multicast replay attack successfully, attacker 2906 may be located somewhere on the multicast distribution tree from source network 105 to destination network 101. Referring to FIG. 29, attacker 2908 is situated directly on a portion of the CT-side multicast distribution tree connecting network 2905 to the other two networks 105 and 101. Thus, to launch a replay attack, attacker 2908 may snoop on the traffic flow between network 103 and INE 2902, capture IP multicast packets, and replay them multiple times. Thus, attacker 2908 may flood network 2905 with replayed multicast traffic sourced from networks 101 and 105. Attacker 2908 may flood networks 101 and 105 by replaying multicast traffic sourced by network 2905. In effect, attacker 2908 may disrupt and degrade mission operations of applications running on all three classified enclaves of the example tactical network of FIG. 29.

Routers within network 103 may be configured to perform reverse path forwarding (RPF) checks before forwarding multicast packets, as would be the case for any secure network. This may preclude an attacker not on the multicast distribution tree, such as attacker 2906, from subscribing to the multicast group and replaying the captured multicast packets. If attacker 2908 were to replay captured packets, the replayed packets would be filtered by the router immediately upstream of attacker 2908 in network 103, since these packets would fail the RPF check at the router. If attacker 2908 were to change the source address of the replayed packets to bypass the RPF check at the routers of network 103, these packets would ultimately be dropped by INEs 102, 104, or 2902, and will not be able to reach the classified enclaves behind them. INEs, such as INEs 102, 104, and 2902 of FIG. 20, silently drop unicast attack packets which fail authentication. There is no mechanism to notify network 103 of the attack.

The techniques of this disclosure address two major technical challenges. The first challenge addressed is the automatic, infrastructure-agnostic detection of multicast replay attacks, i.e., rapid detection of the onset of a multicast replay attack without requiring any modifications to the existing IP routers in the CT network and PT enclaves. The second challenge addressed is the surgical, infrastructure-agnostic filtering of attack traffic, i.e., dropping of attack traffic by the network close to the attacker without requiring any changes to the CT (or PT) routers.

Figure 30:
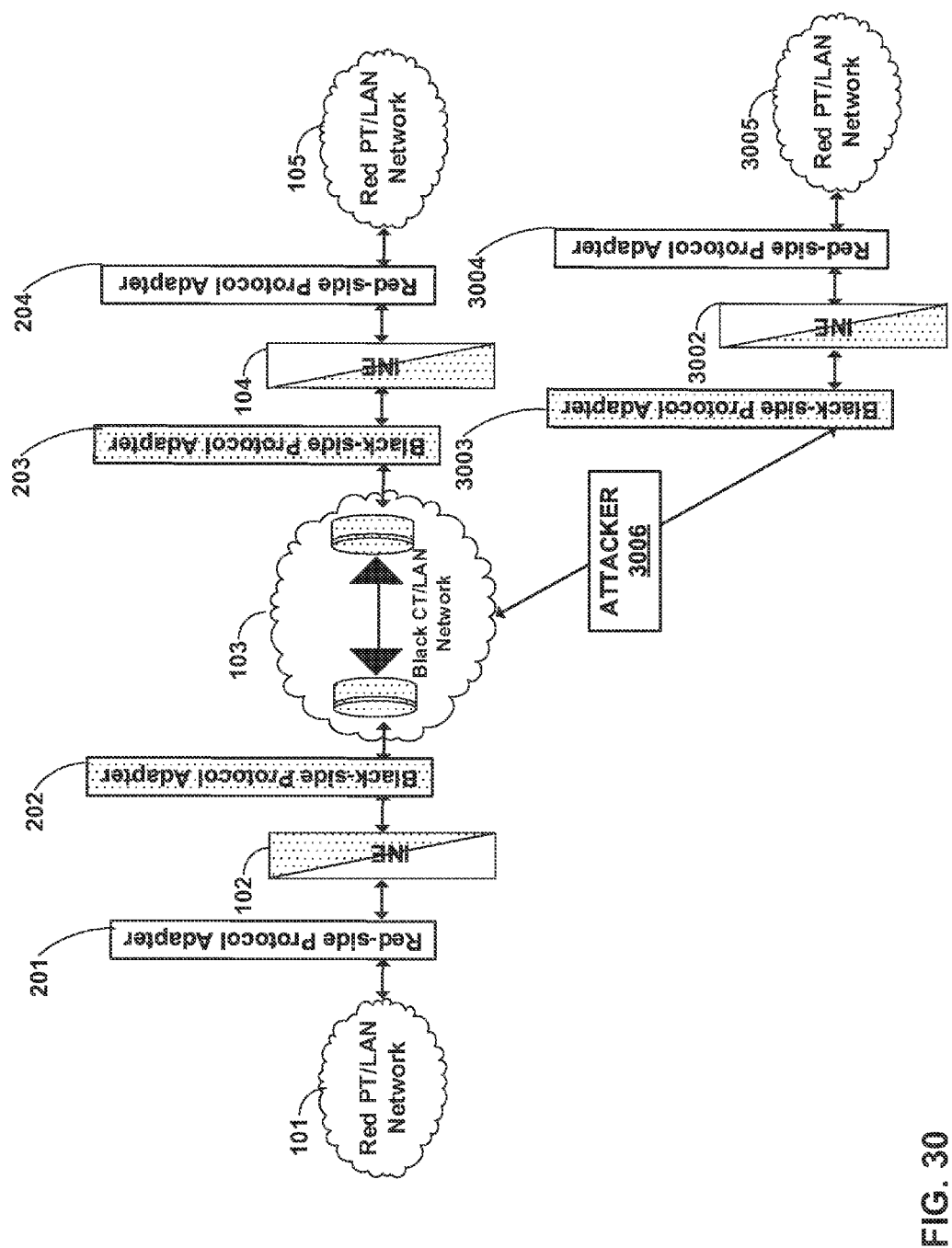
FIG. 30 is a system diagram illustrating an INE-based network with paired protocol adapters configured to implement an inline network encryptor security protocol according to one aspect of this disclosure.

Underlying the techniques of this disclosure for addressing these technical challenges are two innovative techniques which may be implemented in the software modules running on the two devices straddling each INE, i.e., protocol adapter 201 of FIG. 30 and protocol adapter 202 of FIG. 30. The first module may include a zero-packet-overhead multicast packet replay detection technique which harvests unused fields within the IP packet header to embed information enabling techniques of this disclosure to automatically detect the onset of multicast packet replay attacks without incurring any additional network traffic overhead. The second module may include a HAIPE-compliant multicast signaling technique which enables techniques of this disclosure to automatically filter out multicast attack traffic close to the origin of that traffic upon detection of a multicast replay attack.

FIG. 30 is a system diagram illustrating an INE-based network with paired protocol adapters configured to implement an inline network encryptor security protocol according to one aspect of this disclosure. When protocol adapter 3004 at network 3005 of FIG. 30, receives an any source IP multicast join request (via IGMP or PIM) for multicast address M from an application in network 3005, protocol adapter 3004 consults a multicast source discovery service to determine all the sources of M. Suppose the sources for M are located in network 101 and network 105. Protocol adapter 3004 at network 3005 then sends a source specific multicast (SSM) join request using PIM-SSM towards each of these two sources in network 101 and network 105. Using CAPTAIN, the protocol adapter 3004 and 3003 at network 3005 communicate using messages in one or more pass-through fields in a header of data packets to convert these red side PIM-SSM join messages to black side PIM-SSM join messages going from INE 3002 to each of INE 102 and INE 104 in the above example. This results in the creation of a set of black side multicast distribution trees for the group M which are rooted at the INEs 102 and 104 fronting each of the sources of M in respective networks 101 and 105, and which branch out to INE 3002 and any other subscribers that may join M later.

Such source-rooted multicast distribution drastically reduces the attack surface that can be exploited by attacker 3006 on network 103. Any attack packets (spurious or replayed) can only be successfully injected if attacker 3006 is directly situated on one of these source-rooted multicast distribution trees for M. Even if this were the case, the attack would only impact victim enclaves downstream of attacker 3006 on that particular distribution tree. For instance, if attacker 3006 were situated only on the path from network 101 to network 3005 in the multicast distribution forest for M, as shown in FIG. 30, only the multicast from network 101 to network 3005 would be impacted. Flows from network 105 to network 3003 would not be impacted.

In the example above, when protocol adapter 3004 at network 3005 detects a replay attack on the multicast flow from INE 102 to INE 3002 (using the novel zero-packet-overhead multicast packet replay detection technique described below), protocol adapter 3004 notifies its paired protocol adapter 3003 of this using the HAIPE-compliant CAPTAIN signaling protocol. Thereafter, protocol adapter 3004 at network 3005 sends a PIM-SSM "leave" message towards INE 101 filtering the attack traffic at a router in network 103. Valid multicast traffic from network 105 to network 3005 remains unaffected.

To detect multicast replay attacks, protocol adapters 201, 204, and 3004 at each respective network 101, 105, and 3005 employs a novel zero-network-overhead mechanism for inserting sequence numbers within multicast packets leaving networks 101, 105, and 3005 to enable protocol adapters 201, 204, and 3004 at the destination networks 101, 105, and 3005 to detect multicast packet replay attacks. This technique includes harvesting the 32-bit field within each IP packet used for handling packet fragmentation within networks 101, 105, and 3005 (i.e., the 16-bit identification field, the 13-bit fragment offset field, and the 3-bit flag field) to carry the sequence number of packets associated with each application multicast flow in pass-through fields of the respective packet, i.e., a multicast packet stream from a PT host to a specific multicast address. To enable the use of this 32-bit field, techniques of this disclosure prevent hosts from sending packets greater than the maximum transmission unit (MTU) for the PT-side enclaves. Should a host violate this stipulation, the protocol adapter at the source enclave will send an ICMP message to the host to reduce its packet size. With fragmentation disallowed in this fashion, this 32-bit field within the IP header (i.e. pass-through fields) of each data packet becomes available for use by techniques of this disclosure for embedding its sequence numbers.

In accordance with techniques of this disclosure, protocol adapter 3004 at the destination network 3005 maintains a per-source multicast anti-replay window for each multicast flow received by protocol adapter 3004. This window consists of the sequence numbers recently received multicast packets from each source address, such as the last 20 multicast packets received from each source address. Any received multicast packet whose sequence number either matches a sequence number in the anti-replay window for that flow or whose sequence number is less than the smallest sequence number in the window is flagged as a duplicate packet and is dropped by protocol adapter 3004. If the number of duplicate detections for a flow exceeds a specified threshold, the protocol adapter 3004 may initiate an inline network encryptor security protocol and mitigate the DoS actions described above for filtering out attack traffic within network 103 at a point close to the origin of the attack (i.e., attacker 3006).

The techniques of this disclosure for multicast replay detection described above assumes that the pre-placed keys (PPKs) associated with each multicast group will be changed before the 32-bit sequence number for a multicast flow wraps around. The techniques described herein could, however, be augmented to use existing PPKs, albeit with some additional packet overhead.

Techniques described herein automatically detect and filter out the replayed multicast traffic near the source (i.e., attacker 3006). However, in the process legitimate multicast traffic sent by the legitimate red side IP source of the traffic is also filtered out on the black network near the origin of the attack. To reconstitute legitimate traffic, the techniques of this disclosure may be extended to enable the legitimate traffic to be delivered over a unicast red-to-red IP tunnel established dynamically between protocol adapter 201 at the source network 101 and protocol adapter 3004 at the victim network 3005. The dynamic establishment of this IP tunnel may be initiated by protocol adapter 3004 at victim network 3005.

An alternative approach for implementing techniques of this disclosure is described below. This approach removes the need to have functionality in the black-side protocol adapters (i.e., protocol adapters 202, 203, and 3003). With this approach, when protocol adapter 3004 detects a multicast replay attack, protocol adapter 3004 may unsubscribe from the affected multicast group (i.e., protocol adapter 3004 may unsubscribe from all sources of the multicast group). To reconstitute legitimate traffic, protocol adapter 3004 may then dynamically establish a unicast IP tunnel between protocol adapter 3004 and protocol adapter 201 of the source network 101 over which multicasts packets are delivered to it. Periodically, protocol adapter 3004 re-subscribes to the affected multicast group to determine if the replay attack is still on-going and also to determine if new legitimate sources have joined the multicast tree. If the attack has still not abated, protocol adapter 3004 may unsubscribe from the multicast tree. If new multicast sources are detected, protocol adapter 3004 may then establish new IP tunnels with protocol adapter 201 as before.

Figure 31:
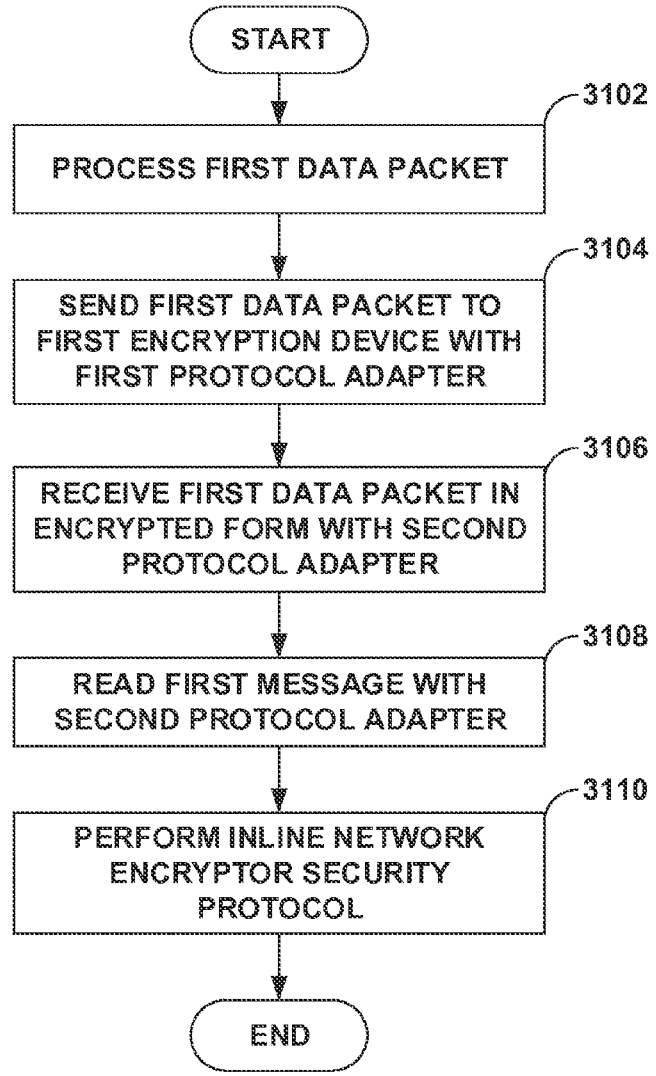
FIG. 31 is a flow diagram illustrating an inline network encryptor security protocol according to one aspect of this disclosure.

FIG. 31 is a flow diagram illustrating an inline network encryptor security protocol according to one aspect of this disclosure. For the purposes of illustration only, reference will be made to FIG. 29 in representing structures that may perform various acts described in the flow diagram of FIG. 31.

In accordance with techniques of the current disclosure, a first protocol adapter (e.g., protocol adapter 201) positioned within a first network (e.g., network 101) may process a first data packet to insert a first message within a set of one or more pass-through fields of the first packet (3102). Network 101 is separated from a second network (e.g., network 105) by a first encryption device (e.g., INE 102) and a second encryption device (e.g., INE 104) that securely communicate packets through an intermediate network (e.g., network 103) in encrypted form. The one or more pass-through fields may be located in a portion of the first data packet that remains unencrypted when the data packet is processed by INE 102. In some examples, the first message includes a source specific multicast leave request.

Protocol adapter 201 may send the first data packet to INE 102 (3104). A second protocol adapter (e.g., protocol adapter 202) positioned within network 103 and between INE 102 and INE 104 may receive the first data packet in encrypted form (3106). Protocol adapter 202 may read the first message from the set of one or more pass-through fields (3108). Protocol adapter 202 may perform, responsive to the first message, an inline network encryptor security protocol (3110).

Prior to processing the first data packet, protocol adapter 201 may receive a join request from a client device in network 101 for a multicast flow originating from a multicast address in network 105. Protocol adapter 201 may forward the join request to a third protocol adapter (e.g., protocol adapter 203) in network 105.

In accordance with techniques of this disclosure, protocol adapter 201 may detect a replay attack on the multicast flow. Processing the first data packet may only occur once protocol adapter 201 detects the replay attack on the multicast flow. In some examples, the inline network encryptor security protocol may include forwarding the first data packet with the source specific multicast leave request to protocol adapter 204 in network 105 and ceasing the receipt of the multicast flow with protocol adapter 201.

In detecting the replay attack, protocol adapter 201 may receive a plurality of data packets of the multicast flow from protocol adapter 203. Each respective data packet may include a respective message in a set of one or more pass-through fields of the respective data packet, wherein the respective message may include a respective sequence number for the respective data packet. In some examples, the respective sequence number of the respective data packet indicates an order in which the respective data packet is intended to be received by protocol adapter 201.

In some examples, protocol adapter 201 may first determine a first sequence number of a first data packet of the plurality of data packets. Protocol adapter 201 may write the first sequence number to a multicast anti-replay window associated with the multicast flow. The multicast anti-replay window may include a list of sequence numbers associated with previously received data packets of the multicast flow, such as in a queue or linked list.

In some examples, for each respective data packet of the plurality of data packets, protocol adapter 201 may determine the respective sequence number of the respective data packet using the information in the respective message. Protocol adapter 201 may then determine whether the respective data packet is one of a duplicate packet or an out of order data packet based at least in part on the respective sequence number.

In determining whether the respective data packet is one of a duplicate packet or an out of order data packet, protocol adapter 201 may compare the respective sequence number to one or more sequence numbers stored in the multicast anti-replay window of one or more previously received data packets. Responsive to the respective sequence number being greater than one of the one or more sequence numbers stored in the multicast anti-replay window, protocol adapter 201 may forward the respective data packet to the host in network 101, write the respective sequence number to the multicast anti-replay window, and process the next data packet.

Alternatively, responsive to the respective sequence number being less than or equal to the sequence number stored in the multicast anti-replay window of the previously received data packet, protocol adapter 201 may increase a replay attack detection counter by one. Protocol adapter 201 may then compare the replay attack detection counter to a replay attack detection threshold. Responsive to the replay attack detection counter being greater than or equal to the replay attack detection threshold, protocol adapter 201 may determine that a replay attack has occurred on the multicast flow. Alternatively, responsive to the replay attack detection counter being less than the replay attack detection threshold, protocol adapter 201 may forward the respective data packet to the host in network 101, write the respective sequence number to the multicast anti-replay window, and process the next data packet.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the disclosure have been described. These and other embodiments are within the scope of the following claims.

What is claimed is:

1. A method comprising:
processing, with a first protocol adapter positioned within a first network, a first data packet to insert a first message within a set of one or more pass-through fields of the first packet, wherein the first network is separated from a second network by a first encryption device and a second encryption device that securely communicate packets through an intermediate network in encrypted form, wherein the set of one or more pass-through fields are located in a portion of the first data packet that remains unencrypted when the first data packet is processed by the first encryption device;
processing, with the first protocol adapter, a second data packet to insert a second message within a set of one or more pass-through fields of the second data packet, wherein the set of one or more pass-through fields are located in a portion of the second data packet that remains unencrypted when the second data packet is processed by the first encryption device, and wherein the second message comprises a bandwidth of a traffic flow originating in the first network;
sending, with the first protocol adapter, the first data packet and the second data packet to the first encryption device for encryption;
receiving, with a second protocol adapter positioned within the intermediate network and between the first encryption device and the second encryption device, the first data packet in encrypted form and the second data packet in encrypted form;
reading, with the second protocol adapter, the first message from the set of one or more pass-through fields of the first data packet;
reading, with the second protocol adapter, the second message from the set of one or more pass-through fields of the second data packet; and
performing, with the second protocol adapter, responsive to the first message, and based on the bandwidth in the second message, an end-to-end quality of service admission protocol.

2. The method of claim 1, wherein the first message comprises an initial mission priority associated with a traffic flow originating from a client device in the first network.

3. The method of claim 2, further comprising:
receiving, with the first protocol adapter, an indication of a path state from the client device; and
determining, with the first protocol adapter, the initial mission priority for the traffic flow originating from the client device based at least in part on the indication of the path state.

4. The method of claim 1, wherein performing the end-to-end quality of service admission protocol comprises:
determining, with the second protocol adapter, an available bandwidth in the intermediate network;
determining, with the second protocol adapter and based on the second message, the bandwidth of the traffic flow; and
comparing, with the second protocol adapter, the available bandwidth in the intermediate network with the bandwidth of the traffic flow.

5. The method of claim 4, further comprising, responsive to the available bandwidth in the intermediate network being greater than or equal to the bandwidth of the traffic flow:
determining, with the first protocol adapter, whether to allow or deny the traffic flow from the client device to a subscriber device in the second network;
responsive to determining to allow the traffic flow, forwarding, with the first protocol adapter, the traffic flow to the subscriber device; and
responsive to determining to deny the traffic flow, prohibiting, with the first protocol adapter, the forwarding of the traffic flow outside of the first protocol adapter.

6. The method of claim 5, wherein determining whether to allow or deny the traffic flow comprises determining, with the first protocol adapter, whether to allow or deny the traffic flow from the client device to the subscriber device based at least in part on a configuration option of the first protocol adapter.

7. The method of claim 5, further comprising, responsive to the available bandwidth in the intermediate network being greater than or equal to the bandwidth of the traffic flow:

receiving, with the second protocol adapter, an indication of a bandwidth reservation from a transit router in the intermediate network;

encapsulating, with the second protocol adapter, a second data packet, wherein a second message in a set of one or more pass-through fields of the second data packet includes a path state of the client device in the first network;

setting, with the second protocol adapter, the second message of the encapsulated second data packet to further indicate a non-explicit-congestion-notification-capable transport status of the traffic flow;

sending, with the second protocol adapter, the encapsulated second data packet to a third protocol adapter in the intermediate network;

decapsulating, with the third protocol adapter, the encapsulated second data packet;

sending, with the third protocol adapter, the decapsulated second data packet to the second encryption device;

receiving, with a fourth protocol adapter in the second network, the second data packet from the second encryption device;

receiving, with the fourth protocol adapter, a third data packet from the second encryption device, wherein the third data packet includes a third message within a set of one or more pass-through fields of the third data packet, wherein the third message includes parameters of the traffic flow;

forwarding, with the fourth protocol adapter, the third data packet to the subscriber device in the second network; and receiving, with the first protocol adapter, an indication of successful admission of the traffic flow into the second network from the fourth protocol adapter.

8. The method of claim 4, further comprising, responsive to the available bandwidth in the intermediate network being less than the bandwidth of the traffic flow:

prohibiting, with the first protocol adapter, the forwarding of the traffic flow outside of the first protocol adapter.

9. The method of claim 8, further comprising, responsive to the available bandwidth in the intermediate network being less than the bandwidth of the traffic flow:

receiving, by the second protocol adapter, a rejection message from the transit router;

encapsulating, with the second protocol adapter, a second data packet, wherein a second message in a set of one or more pass-through fields of the second data packet includes a path state of the client device in the first network;

setting, with the second protocol adapter, the second message of the encapsulated second data packet to further indicate a congestion encountered status of the traffic flow;

sending, with the second protocol adapter, the encapsulated second data packet to a third protocol adapter in the intermediate network;

decapsulating, with the third protocol adapter, the encapsulated second data packet;

sending, with the third protocol adapter, the decapsulated second data packet to the second encryption device;

receiving, with a fourth protocol adapter in the second network, a third data packet with a third message within a set of one or more pass-through fields of the third data packet, wherein the third message includes a congestion encountered status of the traffic flow;

receiving, with the first protocol adapter, an indication of failed admission of the traffic flow into the second network from the fourth protocol adapter.

10. The method of claim 1, further comprising:

forwarding, with the second protocol adapter, the first data packet to the second encryption device;

receiving, with a third protocol adapter positioned within the second network, the first data packet;

determining, with the third protocol adapter, a local priority registry;

processing, with the third protocol adapter, a third data packet to insert a third message within a set of one or more pass-through fields of the third data packet, wherein the third message includes the local priority registry;

sending, with the third protocol adapter via the second encryption device and the first encryption device, the third data packet to the first protocol adapter;

determining, with the first protocol adapter, a final mission priority for the traffic flow based at least in part on an initial mission priority and the local priority registry contained in the third message;

processing, with the first protocol adapter, a fourth data packet to insert a fourth message within a set of one or more pass-through fields of the fourth data packet, wherein the fourth message includes a mapping to a reserved multicast address in the second protocol adapter;

processing, with the first protocol adapter, a fifth data packet to insert a fifth message within a set of one or more pass-through fields of the fifth data packet, wherein the fifth message includes a bandwidth for the traffic flow;

processing, with the first protocol adapter, a sixth data packet to insert a sixth message within a set of one or more pass-through fields of the sixth data packet, wherein the sixth message includes the path state of the client device in the first network;

sending, with the first protocol adapter and via the first encryption device, the fourth data packet, the fifth data packet, and the sixth data packet to the second protocol adapter;

processing, with the second protocol adapter, a seventh data packet to insert a seventh message within a set of one or more pass-through fields of the seventh data packet, wherein the seventh message includes parameters of the traffic flow;

sending, with the second protocol adapter, the seventh data packet to the second encryption device.

11. A method comprising:

receiving, with a first protocol adapter positioned within a first network, a join request from a client device in the first network for a multicast flow originating from a multicast address in a second network, wherein the first network is separated from the second network by a first encryption device and a second encryption device that securely communicate packets through an intermediate network in encrypted form;

forwarding, with the first protocol adapter, the join request to a third protocol adapter in the second network;

detecting, with the first protocol adapter, a replay attack on the multicast flow;

responsive to detecting the replay attack on the multicast flow, processing, with the first protocol adapter, a first data packet to insert a first message within a set of one or more pass-through fields of the first packet, wherein the set of one or more pass-through fields are located in a portion of the first data packet that remains unencrypted when the first data packet is processed by the first encryption device, wherein the first message comprises a source specific multicast leave request;

sending, with the first protocol adapter, the first data packet to the first encryption device for encryption;

receiving, with a second protocol adapter positioned within the intermediate network and between the first encryption device and the second encryption device, the first data packet in encrypted form;

reading, with the second protocol adapter, the first message from the set of one or more pass-through fields; and performing, with the second protocol adapter and responsive to the first message, an inline network encryptor security protocol.

12. The method of claim 11, wherein detecting the replay attack comprises:

receiving, with the first protocol adapter, a plurality of data packets of the multicast flow from the third protocol adapter, wherein each respective data packet includes a respective message in a set of one or more pass-through fields of the respective data packet, wherein the respective message includes a respective sequence number for the respective data packet; and for each respective data packet of the plurality of data packets:
determining, with the first protocol adapter, the respective sequence number of the respective data packet; and
determining, with the first protocol adapter, whether the respective data packet is one of a duplicate packet or an out of order data packet based at least in part on the respective sequence number.

13. The method of claim 12, wherein the respective sequence number of the respective data packet indicates an order in which the respective data packet is intended to be received by the first protocol adapter.

14. The method of claim 12, wherein detecting the replay attack further comprises:

determining, with the first protocol adapter, a first sequence number of a first data packet of the plurality of data packets; and writing, with the first protocol adapter, the first sequence number to a multicast anti-replay window associated with the multicast flow, wherein the multicast anti-replay window comprises a list of sequence numbers associated with previously received data packets of the multicast flow.

15. The method of claim 14, wherein determining whether the respective data packet is one of a duplicate packet or an out of order data packet comprises:

comparing, with the first protocol adapter, the respective sequence number to one or more sequence numbers stored in the multicast anti-replay window of one or more previously received data packets;

responsive to the respective sequence number being less than or equal to one of the one or more sequence numbers stored in the multicast anti-replay window:
increasing, with the first protocol adapter, a replay attack detection counter by one;

comparing, with the first protocol adapter, the replay attack detection counter to a replay attack detection threshold;

responsive to the replay attack detection counter being greater than or equal to the replay attack detection threshold, determining, with the first protocol adapter, that a replay attack has occurred on the multicast flow; and responsive to the replay attack detection counter being less than the replay attack detection threshold:
writing, with the first protocol adapter, the respective sequence number to the multicast anti-replay window; and
processing, with the first protocol adapter, a next data packet in the plurality of data packets.

16. The method of claim 11, wherein the inline network encryptor security protocol comprises:

responsive to receiving the first data packet, forwarding, with the second protocol adapter, the first data packet to the third protocol adapter; and ceasing, with the first protocol adapter, receipt of the multicast flow.

17. A system configured to communicate between devices in a network, the system comprising:

a first protocol adapter positioned within a first network configured to:
process a first data packet to insert a first message within a set of one or more pass-through fields of the first packet, wherein the first network is separated from a second network by a first encryption device and a second encryption device that securely communicate packets through an intermediate network in encrypted form, wherein the set of one or more pass-through fields are located in a portion of the first data packet that remains unencrypted when the first data packet is processed by the first encryption device;

process a second data packet to insert a second message within a set of one or more pass-through fields of the second data packet, wherein the set of one or more pass-through fields are located in a portion of the second data packet that remains unencrypted when the data packet is processed by the first encryption device, and wherein the second message comprises a bandwidth of a traffic flow originating in the first network; and sending, with the first protocol adapter, the first data packet and the second data packet to the first encryption device for encryption; and a second protocol adapter positioned within the intermediate network and between the first encryption device and the second encryption device configured to:
receive the first data packet in encrypted form and the second data packet in encrypted form;
read the first message from the set of one or more pass-through fields of the first data packet;
reading, with the second protocol adapter, the second message from the set of one or more pass-through fields of the second data packet; and
perform, responsive to the first message, and based on the bandwidth in the second message, an end-to-end quality of service admission protocol.

* * * * *